(12) United States Patent
Weill

(10) Patent No.: US 8,331,422 B2
(45) Date of Patent: Dec. 11, 2012

(54) METHOD AND APPARATUS FOR ACQUISITION, TRACKING, AND TRANSFER USING SUB-MICROSECOND TIME TRANSFER USING WEAK GPS/GNSS SIGNALS

(75) Inventor: Lawrence R. Weill, Seal Beach, CA (US)

(73) Assignee: Magellan Systems Japan, Inc., Amagasaki, Hyogo (JP)

( * ) Notice: Subject to any disclaimer, the term of this patent is extended or adjusted under 35 U.S.C. 154(b) by 218 days.

(21) Appl. No.: 12/919,317

(22) PCT Filed: Mar. 1, 2009

(86) PCT No.: PCT/US2009/035627
§ 371 (c)(1),
(2), (4) Date: Aug. 25, 2010

(87) PCT Pub. No.: WO2009/108915
PCT Pub. Date: Sep. 3, 2009

(65) Prior Publication Data
US 2011/0007783 A1    Jan. 13, 2011

Related U.S. Application Data

(60) Provisional application No. 61/067,314, filed on Feb. 28, 2008.

(51) Int. Cl.
*H04B 1/00* (2006.01)
(52) U.S. Cl. .................. 375/150; 342/357.64
(58) Field of Classification Search .......... 342/357.02, 342/357.04, 357.06, 357.12; 375/149, 150, 375/343
See application file for complete search history.

(56) References Cited

U.S. PATENT DOCUMENTS

| 6,329,946 B1 | 12/2001 | Hirata et al. |
| 6,725,157 B1 | 4/2004 | Yu |
| 7,042,930 B2 * | 5/2006 | Dafesh ................. 375/149 |

(Continued)

FOREIGN PATENT DOCUMENTS

EP    1 538 454    6/2005

(Continued)

OTHER PUBLICATIONS

International Search Report dated Jul. 27, 2009 from International Application No. PCT/US2008/086613.

(Continued)

*Primary Examiner* — Leon-Viet Nguyen
(74) *Attorney, Agent, or Firm* — Beyer Law Group LLP

(57) ABSTRACT

A method and apparatus provide high-sensitivity GPS/GNSS signal acquisition in a stationary GPS/GNSS receiver. The uncertainty in frequency due to apparent Doppler shift is partitioned into a plurality of contiguous frequency bins, and the uncertainty in location of navigation data bit boundaries is partitioned into equally spaced trial bit boundary locations. For each combination of the trial bit boundary location and the frequency bin, a signal block of captured complex baseband signal is Doppler-compensated using a phase rotator, and then synchronously summed with a periodicity of one period of C/A code so as to produce a compressed sample block having N samples. Each compressed sample block is cross-correlated with one period of reference C/A code to produce an N-value correlation function. A predetermined number of magnitudes of the N-value correlation functions are stack-accumulated into an array with precession compensation so as to find a correlation peak having the largest value.

55 Claims, 23 Drawing Sheets

U.S. PATENT DOCUMENTS

| | | | |
|---|---|---|---|
| 7,408,504 | B2 | 8/2008 | Kishimoto et al. |
| 2005/0116860 | A1 | 6/2005 | Kishimoto et al. |
| 2006/0031696 | A1 | 2/2006 | King et al. |
| 2007/0008217 | A1 | 1/2007 | Yang et al. |
| 2007/0183486 | A1* | 8/2007 | Cheng et al. ............ 375/150 |
| 2007/0248152 | A1 | 10/2007 | Wang et al. |
| 2008/0088505 | A1 | 4/2008 | Brant et al. |
| 2008/0180318 | A1 | 7/2008 | Glennon et al. |
| 2009/0289841 | A1 | 11/2009 | Nakamoto et al. |

FOREIGN PATENT DOCUMENTS

| | | |
|---|---|---|
| JP | 6-186317 | 7/1994 |
| JP | 7-140224 | 6/1995 |
| JP | 2001-349935 | 12/2001 |
| JP | 2004-340855 | 12/2004 |
| JP | 2005-55375 | 3/2005 |
| JP | 2005-69764 | 3/2005 |
| JP | 2005-148005 | 6/2005 |
| JP | 2005-321298 | 11/2005 |
| JP | 2006-58199 | 3/2006 |
| JP | 2006-189320 | 7/2006 |
| JP | 2006-220532 | 8/2006 |
| JP | 2006-284452 | 10/2006 |
| JP | 2006-337260 | 12/2006 |
| KR | 2002-0063026 | 8/2002 |
| KR | 1020060005573 | 8/2006 |
| WO | WO 00/14560 | 3/2000 |
| WO | WO 01/75470 | 10/2001 |
| WO | WO 2004/034077 | 4/2004 |

OTHER PUBLICATIONS

Written Opinion dated Jul. 27, 2009 from International Application No. PCT/US2008/086613.

Supplementary Search Report dated Mar. 16, 2011 from European Application No. 08861219.7.

Bullock et al., "Test results and analysis of a low cost core GPS receiver for time transfer applications", Frequency Control Symposium, Proceedings of the 1997 IEEE International. Orlando FL, USA May 28-30, 1997, New York, NY USA, IEEE, May 28, 1997, p. 314-322.

Syrjarinne, "Possibilities for GPS Time Recovery with GSM Network Assistance", Proceedings of the Institute of Navigation (ION) GPS, Sep. 19, 2000, p. 955-965.

Djemouai et al., "Short locking time FLL and PLL based on a DLL technique", Proc. $43^{rd}$ IEEE Midwest Symp. on Circuits and Systems, vol. 2, Aug. 8, 2000, p. 952-955.

Supplementary Search Report dated Aug. 5, 2011 from European Application No. 09716140.0.

Search Report dated Sep. 1, 2009 from International Application No. PCT/US2009/035627.

Written Opinion dated Sep. 1, 2009 from International Application No. PCT/US2009/035627.

* cited by examiner

METHOD AND APPARATUS FOR ACQUISITION, TRACKING, AND TRANSFER USING SUB-MICROSECOND TIME TRANSFER USING WEAK GPS/GNSS SIGNALS

BACKGROUND OF THE INVENTION

The present invention relates to GPS/GNSS receivers. More specifically, the present invention relates to acquisition, tracking, and sub-microsecond time transfer in GPS/GNSS receivers using weak GPS/GNSS signals.

The use of GPS/GNSS signals for time transfer at the sub-microsecond level is a well-established art. However, most conventional methods depend on the ability of a GPS/GNSS receiver to accurately demodulate timing information from the received GPS/GNSS signal. This implies that the signal must be strong enough to keep the demodulated bit error rate acceptably small (for example, less than about $10^{-5}$), which can be guaranteed only if the received signal power is above approximately −148 dBm. Accordingly, it is difficult to establish sub-microsecond time transfer using very weak GPS/GNSS signals suffering severe attenuation, such as those received indoors or in urban canyons.

BRIEF DESCRIPTION OF THE INVENTION

The embodiments of the invention provide a method for high-sensitivity GPS/GNSS signal acquisition in a stationary GPS/GNSS receiver including a front end section and a signal processing section. The front end section receives GPS/GNSS signals from satellite and produces a digitized complex baseband signal.

A range of uncertainty in frequency of the received signal due to apparent Doppler shift is partitioned into a plurality (P) of contiguous frequency bins having a center frequency $f_{0P}$. A range of uncertainty in location of navigation data bit boundaries of the received signal is partitioned into equally spaced trial bit boundary locations $t_{0s}$. For each combination of the trial bit boundary location and the frequency bin, a search process is performed. The search process includes (a) capturing a segment of the baseband signal including navigation data using start time corresponding to the selected trial bit boundary location, (b) Doppler-compensating the captured baseband signal segment using a phase rotator, (c) partitioning the segment of the baseband signal into successive sub-segments, each having a length of one navigation data bit, (d) synchronously summing samples of each sub-segment with a periodicity of one period of C/A code, so as to produce a compressed sample block having N samples, each compressed sample block having the length of one period of C/A code, (e) cross-correlating each compressed sample block with one period of reference C/A code for a selected satellite to produce an N-value correlation function per compressed sample block, (f) calculating a magnitude of each value of the N-value correlation function to produce a correlation magnitude function for each N-value correlation function, the correlation magnitude function having N values, and (g) stack-accumulating a number of the N-value correlation magnitude functions into an array with precession compensation so as to determine a correlation peak having a largest value in the array.

Prior to stack-accumulating, precession in the N-value correlation magnitude function due to the apparent Doppler shift may be compensated by cyclically shifting positions of the N values in the N-value correlation magnitude function.

Doppler-compensating the captured baseband signal segment may include calculating a rate of change in the frequency of the received signal based on approximate receiver location, approximate time, and satellite ephemeris data obtained from an external source. A phase rotation in the phase rotator may be calculated as a function of time based on the center frequency of the frequency bin and the rate of change in the frequency.

Cross-correlating each compressed sample block with one period of reference C/A code may include (e1) fast-Fourier transforming N samples of each compressed sample block to produce N complex outputs, (e2) obtaining N reference outputs by calculating complex-conjugate of fast-Fourier transformed N samples of the one period of reference C/A code, (e3) pointwise-multiplying the N complex outputs with the N reference outputs to produce N complex values, and (e4) inverse fast-Fourier transforming the N complex values to generate the N-point correlation function.

Doppler-compensating, synchronously summing, cross-correlating, and stack-accumulating may be performed as real time processing, without storing the captures signal in a memory.

After the search process is performed for all of the combination of the frequency bins and the trial bit boundary locations, the largest correlation peak is determined, which has the largest value among all of the correlation peaks, so as to obtain signal acquisition parameters from the center frequency of the frequency bin, the trial bit boundary location, the calculated rate of change in the frequency, and the location in the array associated with the largest correlation peak.

Stack-accumulating the N-value correlation magnitude functions may include (g1) stack-accumulating a predetermined number (R) of the correlation magnitude functions in the N-accumulator array, (g2) creating a plurality (M) of arrays of the accumulated correlation magnitude functions in software memory by transferring contents of the N-accumulator array to the software memory and resetting the N-accumulator array, each time R correlation magnitude functions are accumulated in the N-accumulator array, (g3) stack-accumulating the M arrays of the accumulated correlation magnitude functions into a final array with precession compensation by cyclically shifting the accumulated values in each of the M arrays, and (g4) determining the correlation peak having the largest value in the final array. In accordance with one embodiment of the present invention, the number R of the correlation magnitude functions to be accumulated is 1500, and the number M of the arrays is 6.

In one aspect of the invention, the search process is performed in parallel for the plurality (P) of frequency bins so as to create P×M arrays. In stack-accumulating the M arrays, the P×M arrays are arranged into a P by M matrix, where an array in the matrix is denoted by $A_k^n$, where k runs from 1 to M in time sequence, and frequency bin index n runs from 1 to P. A plurality of frequency trajectories are calculated, where each frequency trajectory varies linearly with time according to an expression f(t)=a+bt, where a is a frequency at the time where the arrays $A_1^n$ are halfway through the accumulation, and b is the rate of change of frequency. Then, M arrays $A_1^{n_1}$, $A_2^{n_2}$, $A_3^{n_3}$, ..., $A_M^{n_M}$ from the array matrix are stack-accumulated, along each of the plurality of frequency trajectories, to form an array B, where a superscript $n_k$ identifies the frequency bin intercepted by the frequency trajectory at the time of midpoint of the accumulation in the corresponding arrays having a subscript value k. In all arrays $A_k^n$ having the same subscript, the accumulated values are cyclically shifted by a same amount to compensate for time precession of the received signal. The array B for each frequency trajectory corresponds to the final array, and the largest correlation peak having the largest value among all of the correlation peaks in the B arrays obtained for the plurality of frequency trajectories is determined.

The signal acquisition parameters for acquiring the satellite signal are obtained from the frequency trajectory, the center frequency of the frequency bin, the trial bit boundary location, the calculated rate of change in the frequency, and the location in the array B which are associated with the largest correlation peak.

The present invention may preferably be applied to specific cases where each navigation data bit spans 20 milliseconds, each sub-segment is 20-millisecond long and contains 20×N samples, one period of C/A code is 1 millisecond, and each compressed sample block is 1 millisecond in length. The number N is preferably 1024.

The embodiments of the present invention also provide a method for high-sensitivity GPS/GNSS signal acquisition and tracking in a stationary GPS/GNSS receiver including a front end section and a signal processing section. The front end section receives GPS/GNSS signals from satellite and produces a digitized complex baseband signal. A known B-bit sequence is selected from a selected subframe of navigation data. The known B-bit sequence contains an entire M-bit sequence to be captured as part thereof, preferably as a center part thereof. A range of uncertainty in frequency of the received signal due to apparent Doppler shift is partitioned into a plurality (P) of contiguous frequency bins having a center frequency $f_{Op}$. A range of uncertainty in location of navigation data bit boundaries of the received signal is partitioned into equally spaced trial bit boundary locations $t_{Os}$. For each combination of the trial bit boundary location and the frequency bin, a search process is performed. The search process includes (a) capturing an M-bit block of the baseband signal ("signal block") from the selected subframe of the received signal using start time corresponding to the selected trial bit boundary location, the signal block including M bits of the navigation data, (b) Doppler-compensating the captured signal block using a phase rotator, (c) partitioning the signal block into M successive sub-blocks having a length of one navigation data bit, (d) synchronously summing the samples of each sub-block with a periodicity of one period of C/A code, so as to produce a compressed sample block having N-samples, each compressed sample block having a length of one period of C/A code, (e) cross-correlating each compressed sample block with N cyclic shifts of one period of reference C/A code for a selected satellite to produce an N-value correlation function per compressed sample block so as to produce M N-value correlation functions for M compressed sample blocks, forming an N-by-M correlation matrix, $k^{th}$ column of the correlation matrix consisting of the N complex values of the N-value correlation function of the $k^{th}$ compressed sample block, and (f) data-shift correlating each row of the correlation matrix with a selected M-bit sequence of the known B-bit sequence by shifting the selected M-bit sequence from one end to the other within the known B-bit sequence so as to produce M data-shift correlation values for each of row/shift combinations, and finding a maximum data-shift correlation value and associated parameters. The associate parameters includes (i) the center frequency $f_{Op}$ of the selected frequency bin, (ii) the selected trial bit boundary location $t_{Os}$, (iii) an index $I_{MAX}$ of the maximum-magnitude data-shift correlation value within the M data-shift correlation values per row/shift combination, (iv) a row index $K_{MAX}$ of the correlation matrix producing the maximum data-shift correlation value, corresponding to the $K^{th}$ cyclic shift in the reference C/A code samples, indicating a location of a code epoch of the received signal, and (v) an amount of shift $J_{MAX}$ of the selected contiguous M-bit sequence within the known B-bit sequence, corresponding to a location of a start bit of the contiguous M-bit sequence in the known B-bit sequence.

Doppler-compensating the captured signal block may include calculating a rate of change in the frequency of the received signal based on approximate receiver location, approximate time, and satellite ephemeris data obtained from an external source. A phase rotation in the phase rotator may be calculated as a function of time based on the center frequency of the frequency bin and the rate of change in the frequency.

Cross-correlating each compressed sample block with N cyclic shifts of one period of reference C/A code may include (e1) obtaining N real-value samples of the one period of reference C/A code, (e2) pointwise-multiplying the N real-value samples of the reference C/A code with the N samples of the compressed sample block to produce N complex values, (e3) summing the N complex values into a correlation function value, (e4) cyclically shifting the N real-value samples of the reference C/A code by one sample, and (e5) repeating said pointwise-multiplying, said summing, and said cyclic shifting for N times so as to produce N correlation function values for the N-value correlation function of the compressed sample block.

Cross-correlating each compressed sample block with N cyclic shifts of one period of reference C/A code may also include cyclically pre-shifting the N real-value samples of the one period of reference C/A code as time progresses so as to compensate for signal time precession due to apparent Doppler shift corresponding to the selected frequency bin.

Data-shift correlating each row of the correlation matrix with a selected M-bit sequence may include (f1) selecting the contiguous M-bit sequence from the known B-bit sequence, (f2) pointwise-multiplying a selected row of the correlation matrix with the selected contiguous M-bit sequence to produce M complex values, (f3) performing M-point FFT on the M complex values to produce M FFT outputs, the M-FFT outputs being the M data-shift correlation values, (f4) calculating magnitude of each of the M FFT outputs to determine a current maximum FFT output value, (f5) updating the current maximum FFT value and associated parameters by retaining the current maximum FFT value and associated parameters if there is no previous maximum FFT value retained, or by replacing previous maximum FFT value and associated parameters with the current maximum FFT value and associated parameters if the current maximum FFT value is greater than the previous maximum FFT value retained, (f6) shifting the selected contiguous M-bit sequence by one bit within the known B-bit sequence, (f7) repeating said pointwise multiplying, said performing M-point FFT, said updating, and said shifting for B−M+1 times until the selected contiguous M-bit sequence moves from one end of the known B-bit sequence to another end thereof, and (f8) obtaining a greatest maximum FFT value and associated parameters by repeating said pointwise multiplying, said performing M-point FFT, said updating, said shifting, and said repeating for all rows of the correlation matrix, The search process is performed for all of the frequency bin/trial bit boundary location combinations so as to find the greatest maximum data-shift correlation value and final parameters associated with the greatest maximum data-shift correlation value. Then, a C/A code phase of the received signal, accurate apparent Doppler shift in the received signal, and time to within a few milliseconds are determined based on the final parameters and known GPS time of transmission of the known B-bit sequence.

The present invention may preferably be applied to specific cases where each navigation data bit spans 20 milliseconds, each sub-block is 20-millisecond long and contains 20×N samples, one period of C/A code is 1 millisecond, and each compressed sample block is 1 millisecond in length. Preferably, the number N is 1024, the number of bits B is 228, and the number of bits M is 128.

Doppler-compensating, synchronously summing, cross-correlating, and stack-accumulating may be performed as real time processing, without storing the captures signal in a memory. Alternatively, the captured signal may be stored in a memory and repeatedly accessed to perform the search process.

The embodiments of the invention further provide a method for obtaining bit synchronization after acquisition of GPS/GNSS signals in a stationary GPS/GNSS receiver. The GPS/GNSS receiver includes a front end section and a signal processing section. The front end section receives GPS/GNSS signals from satellite and produces a digitized complex baseband signal of acquired GPS/GNSS signals. (a) An M-bit block of the baseband signal ("signal block"), which includes a known M-bit sequence of the navigation data, is captured from a predetermined subframe of the acquired signal, using an estimated bit boundary location obtained in signal acquisition, where the estimated bit boundary corresponding to start time of the known M-bit sequence. (b) The captured signal block is Doppler-compensated using a phase rotator. A phase rotation in the phase rotator is calculated as a function of time based on the center frequency of an estimated frequency bin, measured residual Doppler, and a calculated rate of change in the frequency obtained in the signal acquisition. (c) The signal block is partitioned into M successive sub-blocks having a length of one navigation data bit, using the estimated bit boundary location and Q−1 offset bit boundary locations, so as to create Q sets of M successive sub-blocks. The estimated bit boundary location and the offset bit boundary locations are apart from each other by one period of C/A code with the estimated bit boundary as a center. (d) The samples within each sub-block are synchronously summed with a periodicity of one period of C/A code, so as to produce Q sets of M compressed sample blocks each having N-samples. Each of the compressed sample blocks has the length of one period of C/A code. (e) Each of the compressed sample blocks are cross-correlated with one period of reference C/A code for a selected satellite to produce M correlation values per set of M compressed sample blocks so as to produce Q×M correlation values. The Q×M correlation values form a Q-by-M bit synchronization correlation matrix, where $j^{th}$ row of the bit synchronization correlation matrix consists of M complex correlation values obtained from the $j^{th}$ of the Q sets of M compressed sample values. (f) A selected row of the bit synchronization correlation matrix is pointwise-multiplied with the known M-bit sequence to produce M complex values. (g) M-point FFT is performed on the M complex values to produce M FFT outputs. (h) The magnitude of each of the M FFT outputs are calculated to determine a current maximum FFT output value. (i) The current maximum FFT value and associated parameters are upstaged by retaining the current maximum FFT value and associated parameters if there is no previous maximum FFT value retained, or by replacing previous maximum FFT value and associated parameters with the current maximum FFT value and associated parameters if the current maximum FFT value is greater than the previous maximum FFT value retained. (j) The greatest maximum FFT value and associated parameters are obtained by repeating the pointwise-multiplication, the M-point FFT, and the update for all rows of the bit synchronization correlation matrix, so as to find a row index $K_{MAX}$ of the correlation matrix producing the greatest maximum FFT value as an offset of a nearest bit boundary to the starting time of signal capture.

Based on the obtained parameters, time may be determined within approximately 3.3 microseconds per kilometer of position uncertainty.

The cross-correlation of each compressed sample block with one period of reference C/A code may include (e1) obtaining N real-value samples of the one period of reference C/A code, (e2) pointwise-multiplying the N real-value samples of the reference C/A code with the N samples of the compressed sample block to produce N complex values, and (e3) summing the N complex values into a bit synchronization correlation value, Cross-correlating each compressed sample block with one period of reference C/A code may also include cyclically shifting the N real-value samples of the one period of reference C/A code as time progresses so as to compensate for signal time precession due to apparent Doppler shift corresponding to the selected frequency bin.

The present invention may preferably be applied to specific cases where each navigation data bit spans 20 milliseconds, each sub-segment is 20-millisecond long and contains 20×N samples, one period of C/A code is 1 millisecond, and each compressed sample block is 1 millisecond in length. Preferably, the number N is 1024, the number of bits M is 128, and number Q of sets is 7.

Following the bit synchronization, the satellites are tracked by continually updating GPS code phase, accurate apparent signal Doppler shift, and time to within approximately 3.3 microseconds per kilometer of receiver position uncertainty.

Sub-microsecond time transfer is also obtained using pseudorange measurements from a plurality of satellites acquired by the method described above, so as to obtain position within approximately 100 meters, thereby reducing the time uncertainty to the sub-microsecond level.

In one aspect of the invention, a GPS/GNSS receiver circuit for high-sensitivity GPS/GNSS signal acquisition is provided. The GPS/GNSS receiver circuit includes a front end section and a signal processing section. The front end section receives GPS/GNSS signals from satellite and produces a digitized complex baseband signal. The signal processing section includes (a) an input terminal for receiving a segment of the baseband signal including navigation data, (b) a process controller, (c) a phase rotator, (d) a synchronous summer, (e) a cross correlator, (f) a magnitude calculator, (g) a stack accumulator, and (h) a correlation peak determiner. The process controller includes a frequency bin selector and a bit boundary selector. The frequency bin selector sets a plurality (P) of contiguous frequency bins by partitioning a range of uncertainty in frequency of the received signal due to apparent Doppler shift the plurality, and selects one of the frequency bins to be searched. Each frequency bin has a center frequency $f_{0p}$. The bit boundary selector sets a plurality of equally spaced trial bit boundary locations $t_{0s}$ by partitioning a range of uncertainty in location of navigation data bit boundaries of the received signal, and selects one of the trial bit boundary locations as start time for capturing the received signal. The phase rotator Doppler-compensates the baseband signal segment based on a phase rotation function calculated from the center frequency of the frequency bin and a rate of change in the frequency. The synchronous summer partitions the segment of the baseband signal into successive sub-segments, and synchronously sums the samples within each sub-segment with a periodicity of one period of C/A code, so as to produce a compressed sample block having N samples. Each of the compressed sample blocks has a length of one period of C/A code. The cross correlator cross-correlates each of the compressed sample blocks with one period of reference C/A code for a selected satellite to produce an N-value correlation function per compressed sample block. The magnitude calculator calculates a magnitude of each value of the N-value correlation function to produce a correlation magnitude function for each N-value correlation function, where the correlation magnitude function has N values. The stack accumulator stack-accumulates a predetermined number (R) of the N-value correlation magnitude functions so as to create a plurality (M) of arrays of the accumulated magnitudes, and then stack-accumulates the M arrays of the accumulated magnitudes into a final array with precession compensation by cyclically shifting the accumulated values in each of the M arrays. The correlation peak determiner determines a correlation peak having a largest value in the final array.

The signal processing section may further include a coarse precession compensator coupled to said magnitude calculator. The coarse precession compensator compensates precession in the N-value correlation magnitude function due to the apparent Doppler shift by cyclically shifting positions of the N values in the N-value correlation magnitude function, and sends the precession-compensated correlation magnitude functions to the stack accumulator.

The process controller may further include a rate change calculator for calculating the rate of change in the frequency of the received signal based on approximate receiver location, approximate time, and satellite ephemeris data obtained from an external source.

The correlation peak determiner may include a memory for storing information of the correlation peak and a location thereof in the final array for each combination of the frequency bins and the trial bit boundary location. The correlation peak determiner determines a largest correlation peak having a largest value among all of the correlation peaks, so as to obtain signal acquisition parameters from the center frequency of the frequency bin, the trial bit boundary location, the calculated rate of change in the frequency, and the location in the final array associated with the largest correlation peak.

The stack accumulator may include an N-accumulator array (hardware) and a software accumulator. The N-accumulator array stack-accumulates the magnitude of each N-value correlation function, and outputs contents thereof each time R magnitudes are accumulated. The software accumulator holds the contents of the N-accumulator arrays so as to stack-accumulate the M arrays of the accumulated magnitudes into the final array with precession compensation by cyclically shifting the accumulated values in each of the M arrays.

In one aspect of the invention, the GPS/GNSS receiver circuit is capable of parallel processing, and may include a plurality of phase rotators, a plurality of synchronous summers, a plurality of cross correlators, a plurality of magnitude calculators, and a plurality of N-accumulator arrays, such that a plurality (P) of frequency bins are searched in parallel. Each phase rotator, each synchronous summer, each cross correlator, and each magnitude calculator may be capable of processing signals in a plurality of frequency bins by time sharing, respectively. Each frequency bin may be provided with a respective N-accumulator array.

To accommodate possible frequency drift of the receiver reference clock while receiving the signal, the stack accumulator creates P×M arrays in the software accumulator, arranges the P×M arrays into a P by M matrix, an array in the matrix being denoted by $A_k^n$, where k runs from 1 to M in time sequence, and frequency bin index n runs from 1 to P, calculates a plurality of frequency trajectories each of which varies linearly with time according to an expression f(t)=a+bt, where a is a frequency at the time where the arrays $A_1^n$ are halfway through the accumulation, and b is the rate of change of frequency, and stack-accumulates, along each of the plurality of frequency trajectories, M arrays $A_1^{n_1}$, $A_2^{n_2}$, $A_3^{n_3}$, ..., $A_M^{n_M}$ from the array matrix to form an array B, where a superscript $n_k$ identifies the frequency bin intercepted by the frequency trajectory at the time of midpoint of the accumulation in the corresponding arrays having a subscript value k. The stack accumulator cyclically shifts, in all arrays $A_k^n$ having the same subscript, the accumulated values by a same amount to compensate for time precession of the received signal. The correlation peak determiner determines a largest correlation peak having a largest value among all of the correlation peaks in the B arrays obtained for the plurality of frequency trajectories, signal acquisition parameters being obtained from the frequency trajectory, the enter frequency of the frequency bin, the trial bit boundary location, the calculated rate of change in the frequency, and the location in the array B which are associated with the largest correlation peak.

The cross-correlator may include (e1) a first fast-Fourier transformer for transforming N samples of each compressed sample block to produce N complex outputs, (e2) a second fast-Fourier transformer for fast-Fourier transforming N samples of the one period of reference C/A code, (e3) a complex-conjugator for obtaining N reference outputs by calculating complex-conjugate of the fast-Fourier transformed N samples of the one period of reference C/A code, (e4) a pointwise multiplier for pointwise-multiplying the N complex outputs with the N reference outputs to produce N complex values, and (e5) an inverse fast-Fourier transformer for inverse fast-Fourier transforming the N complex values to generate the N-point correlation function.

The GPS/GNSS receiver circuit may be applied to specific signals where each navigation data bit spans 20 milliseconds and one period of C/A code is 1 millisecond. The signal processing section of the GPS/GNSS receiver may be configured such that each sub-segment is 20-millisecond long and contains 20×N samples, and each compressed sample block is 1 millisecond in length. Preferably, the number N is 1024. The number M of arrays may be 6, and the number R of correlation magnitude functions may be 1500.

The embodiments of the invention also provide a GPS/GNSS receiver circuit for high-sensitivity GPS/GNSS signal acquisition and tracking. The GPS/GNSS receiver circuit includes a front end section and a signal processing section. The front end section receives GPS/GNSS signals from satellite and produces a digitized complex baseband signal. The signal processing section includes (a) an input terminal, (b) a process controller, (c) a phase rotator, (d) a synchronous summer, (e) a cross correlator, (f) a correlator memory, (g) a data-shift correlator, (h) a magnitude calculator, and (j) a maximum value determiner.

The input terminal of the signal processing section receives an M-bit block of the baseband signal ("signal block") from the selected subframe of the received signal is received at the input terminal of the signal processing section. The signal block includes M bits of the navigation data. The process controller includes a frequency bin selector and a bit boundary selector. The process controller may further include a rate change calculator for calculating the rate of change in the frequency of the received signal based on approximate receiver location, approximate time, and satellite ephemeris data obtained from an external source. The frequency bin selector partitions a range of uncertainty in frequency of the received signal due to apparent Doppler shift into a plurality (P) of contiguous frequency bins having a center frequency $f_{Op}$, and selects a frequency bin to be searched. The bit boundary selector partitions a range of uncertainty in location of navigation data bit boundaries of the received signal to obtain equally spaced trial bit boundary locations $t_{Os}$, and selects a trial bit boundary location as start time for capturing the received signal. The phase rotator Doppler-compensates the captured signal block based on a phase rotation function calculated from the center frequency of the frequency bin and the rate of change in the frequency. The synchronous summer partitions the signal block into M successive sub-blocks, and synchronously sums the samples within each sub-block with a periodicity of one period of C/A code, so as to produce a compressed sample block having N-samples. Each of the compressed sample blocks has a length of one period of C/A code. The cross correlator cross-correlates each of the compressed sample blocks with N cyclic shifts of one period of reference C/A code for a selected satellite to produce an N-value correlation function per compressed sample block so as to produce M N-value correlation functions for M compressed sample blocks. The correlator memory holds an N-by-M correlation matrix, where $k^{th}$ column of the correlation matrix consists of the N complex values of the N-value correlation function of the $k^{th}$ compressed sample block.

The data-shift correlator is coupled to the correlator memory, and data-shift correlates each row of the correlation matrix with a selected M-bit sequence of the known B-bit sequence by shifting the selected M-bit sequence from one end to the other within the known B-bit sequence so as to produce M data-shift correlation values for each row/shift combination. The magnitude calculator calculates the magnitude of each of the M data-shift correlation values and outputs a current maximum data-shift correlation value. The maximum value determiner retains the current maximum data-shift correlation value and associated parameters, and determines the greatest maximum data-shift correlation value from among maximum data-shift correlation values output from the magnitude calculator for all row/shift combinations and all frequency bin/trial bit boundary location combinations so as to obtain final parameters associated with the greatest maximum data-shift correlation value. The final parameters include (i) the center frequency $f_{Op}$ of the selected frequency bin, (ii) the selected trial bit boundary location $t_{Os}$, (iii) an index $I_{MAX}$ of the greatest maximum data-shift correlation value within the M data-shift correlation values per row/shift combination, (iv) a row index $K_{MAX}$ of the correlation matrix producing the maximum FFT value, corresponding to the $K^{th}$ cyclic shift in the reference C/A code samples, indicating a location of a code epoch of the received signal, and (v) an amount of shift $J_{MAX}$ of the selected contiguous M-bit sequence within the known B-bit sequence, corresponding to a location of a start bit of the contiguous M-bit sequence in the known B-bit sequence.

The process controller may further include a signal acquisition parameter determiner for calculating, based on the final parameters and known GPS time of transmission of the known B-bit sequence, a C/A code phase of the received signal, accurate apparent Doppler shift in the received signal, and time to within a few milliseconds.

The cross-correlator may include (e1) a pointwise multiplier for pointwise-multiplying N real-value samples of the one period of the reference C/A code with the N samples of the compressed sample block to produce N complex values, (e2) a summer for summing the N complex values into a correlation function value, and (e3) a cyclic shifter for cyclically shifting the N real-value samples of the reference C/A code by one sample for each pointwise multiplication.

The cross-correlator may further include a cyclic pre-shifter for cyclically shifting the N real-value samples of the one period of reference C/A code as time progresses so as to compensate for signal time precession due to apparent Doppler shift corresponding to the selected frequency bin.

The data-shift correlator may include (g1) a row selector for selecting one of the rows of the correlation matrix for each pointwise multiplication, (g2) a segment selector for selecting a contiguous M-bit sequence from a known B-bit sequence and shifting the selected contiguous M-bit sequence by one bit within the known B-bit sequence for each pointwise multiplication, the known B-bit sequence being selected from a predetermined subframe of navigation data, the known B-bit sequence containing the entire M-bit sequence therein, (g3) a pointwise multiplier for pointwise-multiplying the selected row of the correlation matrix with the selected contiguous M-bit sequence to produce M complex values, and (g4) a fast-Fourier transformer for performing M-point FFT on the M complex values to produce M FFT outputs, the M-FFT outputs being the M data-shift correlation values.

The maximum value determiner may include an acquisition parameter memory coupled with said magnitude calculator. The acquisition parameter memory holds the current maximum data-shift correlation value and associated parameters, where the current maximum data-shift correlation value corresponds to the current maximum FFT value. The maximum value determiner updates the current maximum FFT value and associated parameters in the acquisition parameter memory by storing the current maximum FFT value and associated parameters if there is no previous maximum FFT value retained, and by replacing previous maximum FFT value and associated parameters with the current maximum FFT value and associated parameters if the current maximum FFT value is greater than the previous maximum FFT value retained. The maximum value determiner obtains the greatest maximum FFT value and associated parameters after searching through all rows of the correlation matrix and all of the frequency bin/trial bit boundary location combinations so as to obtain the final parameters associated with the greatest maximum FFT value.

The GPS/GNSS receiver circuit may be applied to specific signals where each navigation data bit spans 20 milliseconds and one period of C/A code is 1 millisecond. The signal processing section of the GPS/GNSS receiver may be configured such that each sub-block is 20-millisecond long and contains 20×N samples, and each compressed sample block is 1 millisecond in length. Preferably, the number N is 1024, the number of bits B is 228, and the number of bits M is 128.

The embodiments of the invention further provides a GPS/GNSS receiver circuit for high-sensitivity GPS/GNSS signal acquisition and bit synchronization after acquisition of GPS/GNSS signals. The GPS/GNSS receiver includes a front end section and a signal processing section. The front end section receives GPS/GNSS signals from satellite and produces a digitized complex baseband signal of acquired GPS/GNSS signals. The signal processing section includes (a) an input terminal, (b) a phase rotator, (c) an offset sub-block generator, (d) a synchronous summer, (e) a cross correlator, (f) a correlator memory, (g) a bit sync correlator, (h) a magnitude calculator, (j) an acquisition parameter memory, and (k) a bit sync correlation peak determiner.

The input terminal receives an M-bit block of the baseband signal ("signal block"), which includes a known M-bit sequence of the navigation data, from a predetermined subframe of the acquired signal, using an estimated bit boundary location obtained in signal acquisition, the estimated bit boundary corresponding to start time of the known M-bit sequence. The phase rotator Doppler-compensates the captured signal block. A phase rotation by the phase rotator is calculated as a function of time based on the center frequency of an estimated frequency bin, measured residual Doppler, and a calculated rate of change in the frequency obtained in the signal acquisition. The offset sub-block generator partitions the signal block into M successive sub-blocks using the estimated bit boundary location and Q–1 offset bit boundary locations, so as to create Q sets of M successive sub-blocks. The estimated bit boundary and the offset bit boundary locations are apart from each other by one period of C/A code with the estimated bit boundary as a center. The synchronous summer synchronously sums the samples within each sub-block with a periodicity of one period of C/A code, so as to produce Q sets of M compressed sample blocks. Each of the compressed sample blocks has N-samples and a length of one period of C/A code. The a cross correlator cross-correlates each of the compressed sample blocks with one period of reference C/A code for a selected satellite to produce Q correlation values per compressed sample block so as to produce Q×M correlation values for Q×M compressed sample blocks. The correlator memory holds a Q-by-M bit synchronization correlation matrix, the $j^{th}$ row of the bit synchronization correlation matrix consisting of the M complex correlation values obtained from the $j^{th}$ of the Q sets of M compressed sample blocks.

The bit sync correlator is coupled to the correlator memory. The bit sync correlator includes (g1) a row selector for selecting one of the rows of the bit synchronization correlation matrix for each pointwise multiplication, (g2) a pointwise multiplier for pointwise-multiplying the selected row of the bit synchronization correlation matrix with the known M-bit sequence to produce M complex values, and (g3) a fast-Fourier transformer for performing M-point FFT on the M complex values to produce M FFT outputs. The magnitude calculator calculates magnitude of each of the M FFT outputs to determine a current maximum FFT output value. The acquisition parameter memory holds the current maximum FFT output value and associated parameters. The bit sync correlation peak determiner updates the current maximum FFT output value and associated parameters by retaining the current maximum FFT output value and associated parameters if there is no previous maximum FFT output value retained, and by replacing previous maximum FFT output value and associated parameters with the current maximum FFT output value and associated parameters if the current maximum FFT output value is greater than the previous maximum FFT output value retained, so as to obtain a greatest maximum FFT output value and associated parameters after searching through all rows of the bit synchronization correlation matrix, and find a row index $K_{MAX}$ of the correlation matrix producing the greatest maximum FFT value as an offset of a nearest bit boundary to the starting time of signal capture.

The GPS/GNSS receiver circuit may further includes a time transfer circuit coupled to said bit sync correlation peak determiner, for determining time within approximately 3.3 microseconds per kilometer of position uncertainty. The time transfer circuit may be part of the process controller.

The cross correlator may include (e1) a pointwise multiplier for pointwise-multiplying, for each of the Q×M compressed sample blocks, N real-value samples of the one period of the reference C/A code with the N samples of the compressed sample block to produce N complex values, and (e2) a summer for summing the N complex values into a bit synchronization correlation value for each of the Q×M compressed sample blocks, so as to produce Q×M correlation values.

The cross correlator may further include a cyclic shifter for cyclically shifting the N real-value samples of the one period of reference C/A code as time progresses so as to compensate for signal time precession due to apparent Doppler shift corresponding to the selected frequency bin.

The GPS/GNSS receiver circuit may be applied to specific signals where each navigation data bit spans 20 milliseconds and one period of C/A code is 1 millisecond. The signal processing section of the GPS/GNSS receiver may be configured such that each sub-block is 20-millisecond long and contains 20×N samples, and each compressed sample block is 1 millisecond in length. Preferably, the number N is 1024, the number of bits M is 128, and number Q of sets is 7.

BRIEF DESCRIPTION OF THE DRAWINGS

The present invention is illustrated by way of example, and not by way of limitation, in the FIG.s of the accompanying drawings and in which like reference numerals refer to similar elements and in which.

GNSS signal acquisition in a GPS/GNSS receiver in accordance with one embodiment of the present invention.

Figure 11:
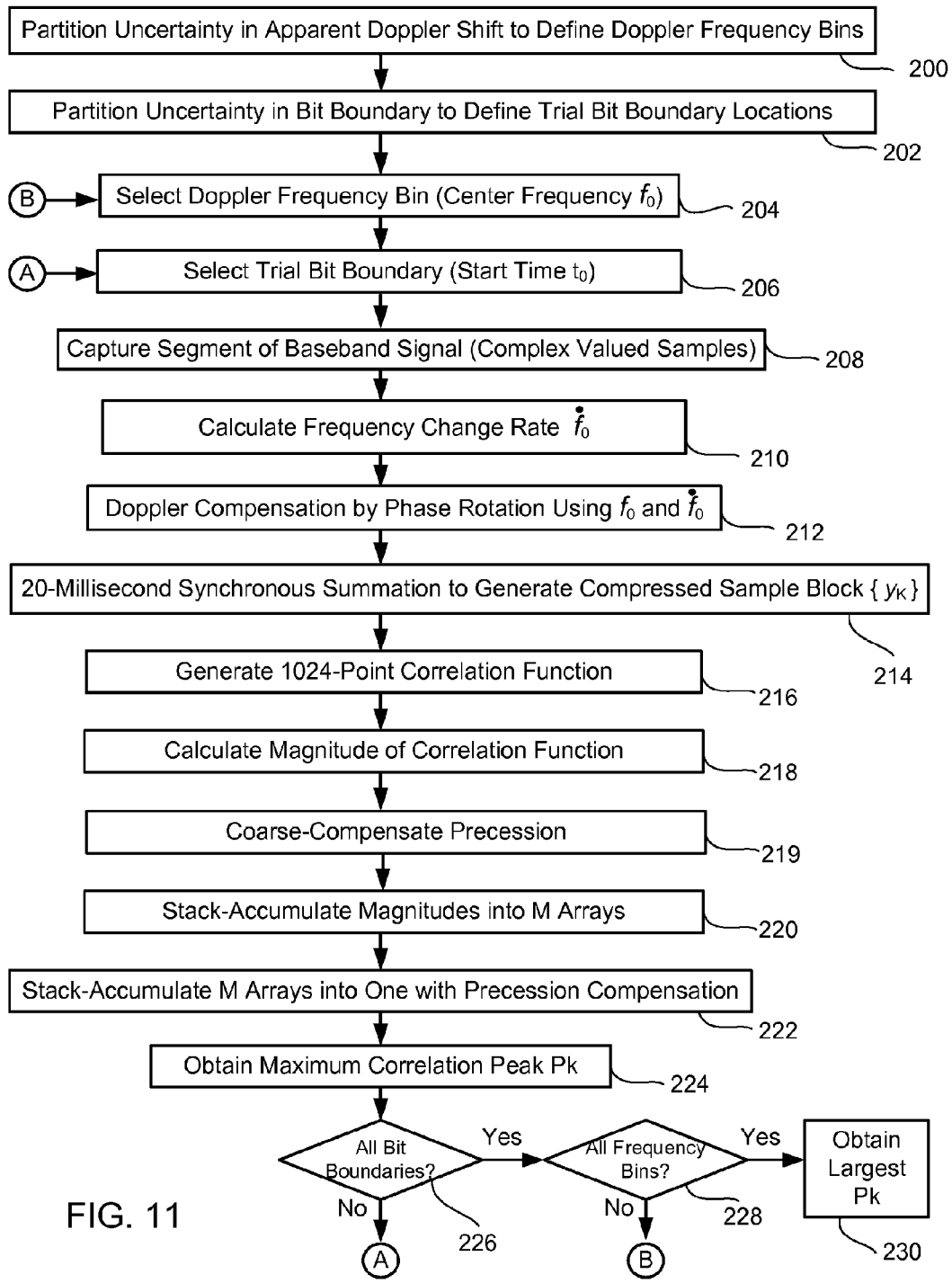

FIG. 11 is a process flow diagram schematically illustrating a method for high-sensitivity GPS/GNSS signal acquisition in accordance with this embodiment of the present invention.

Figure 12:
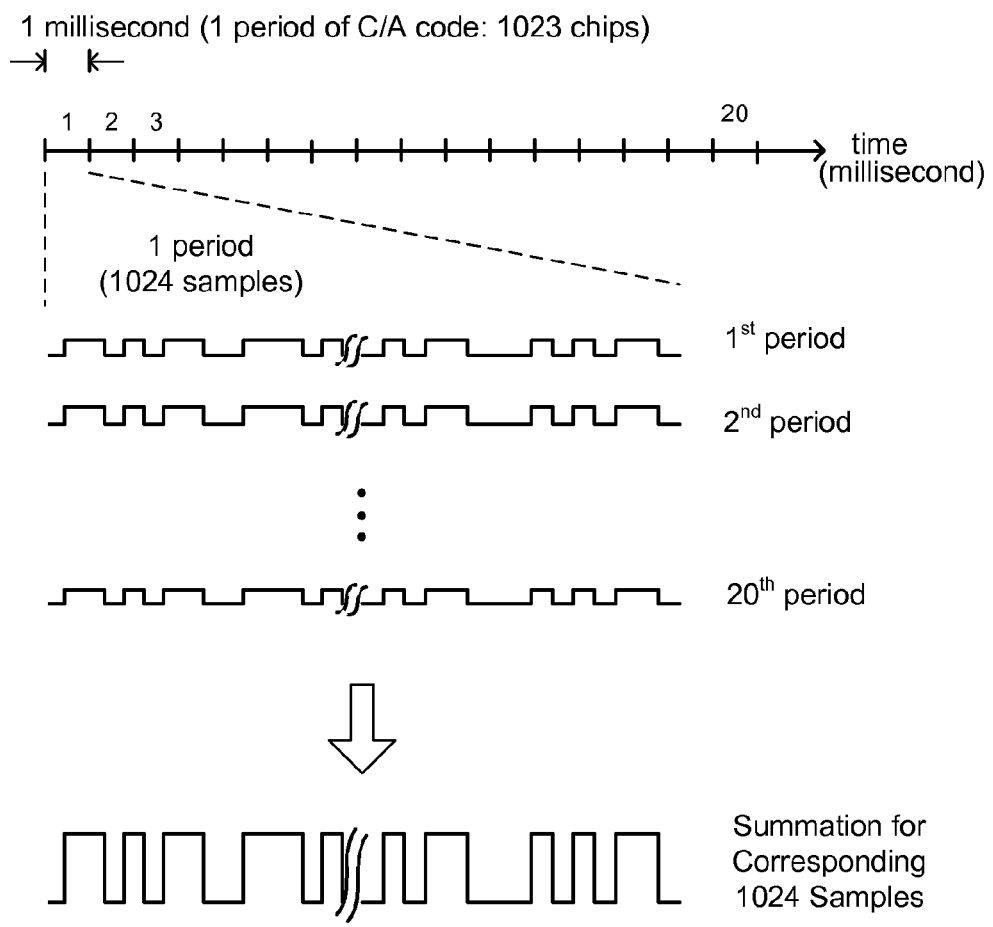

FIG. 12 is a diagram schematically and conceptually illustrating an example of the synchronous summation for 20 milliseconds with aligned bit boundaries without noise, in accordance with one embodiment of the present invention.

Figure 13:
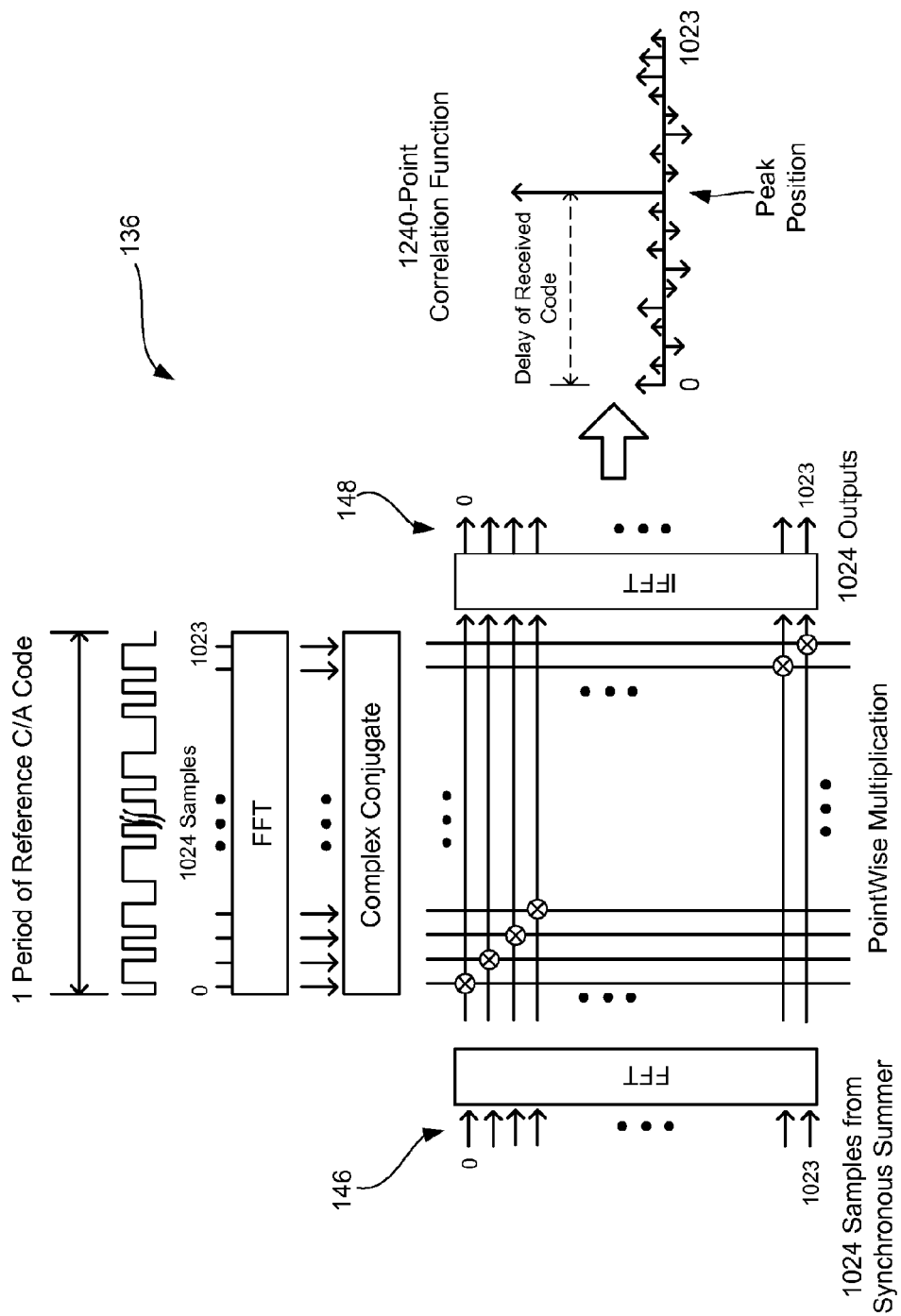

FIG. 13 is a diagram schematically and conceptually illustrating the 1024-point correlation operation to generate correlation functions in accordance with one embodiment of the present invention.

Figure 14:
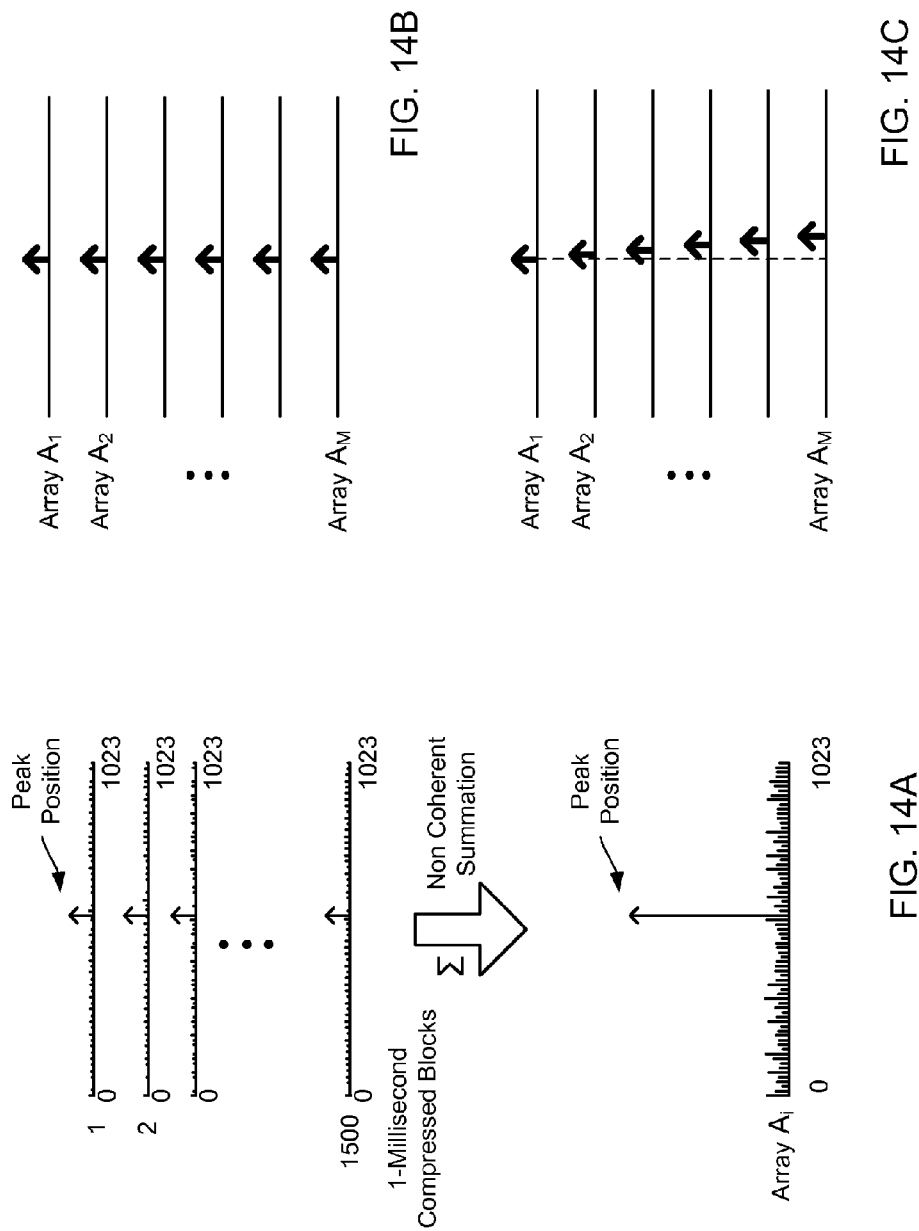

FIGS. 14A-14C are diagrams explaining noncoherent summation and signal precession across the arrays stack-accumulating correlation magnitudes.

Figure 15:
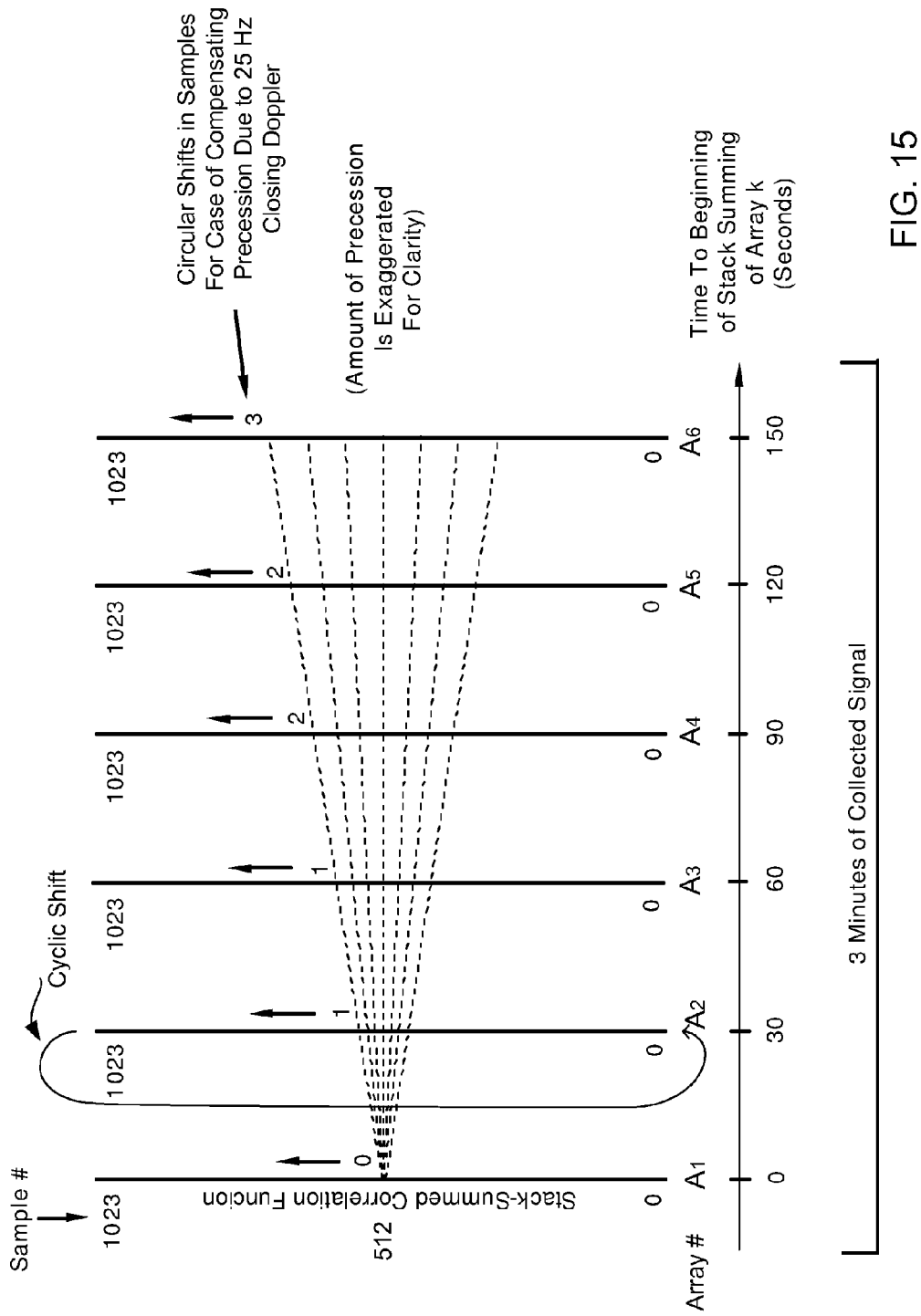

FIG. 15 is a diagram schematically illustrating the precession compensation by performing circular shifts on the arrays stack-accumulating correlation magnitudes, in accordance with one embodiment of the present invention.

Figure 16A:
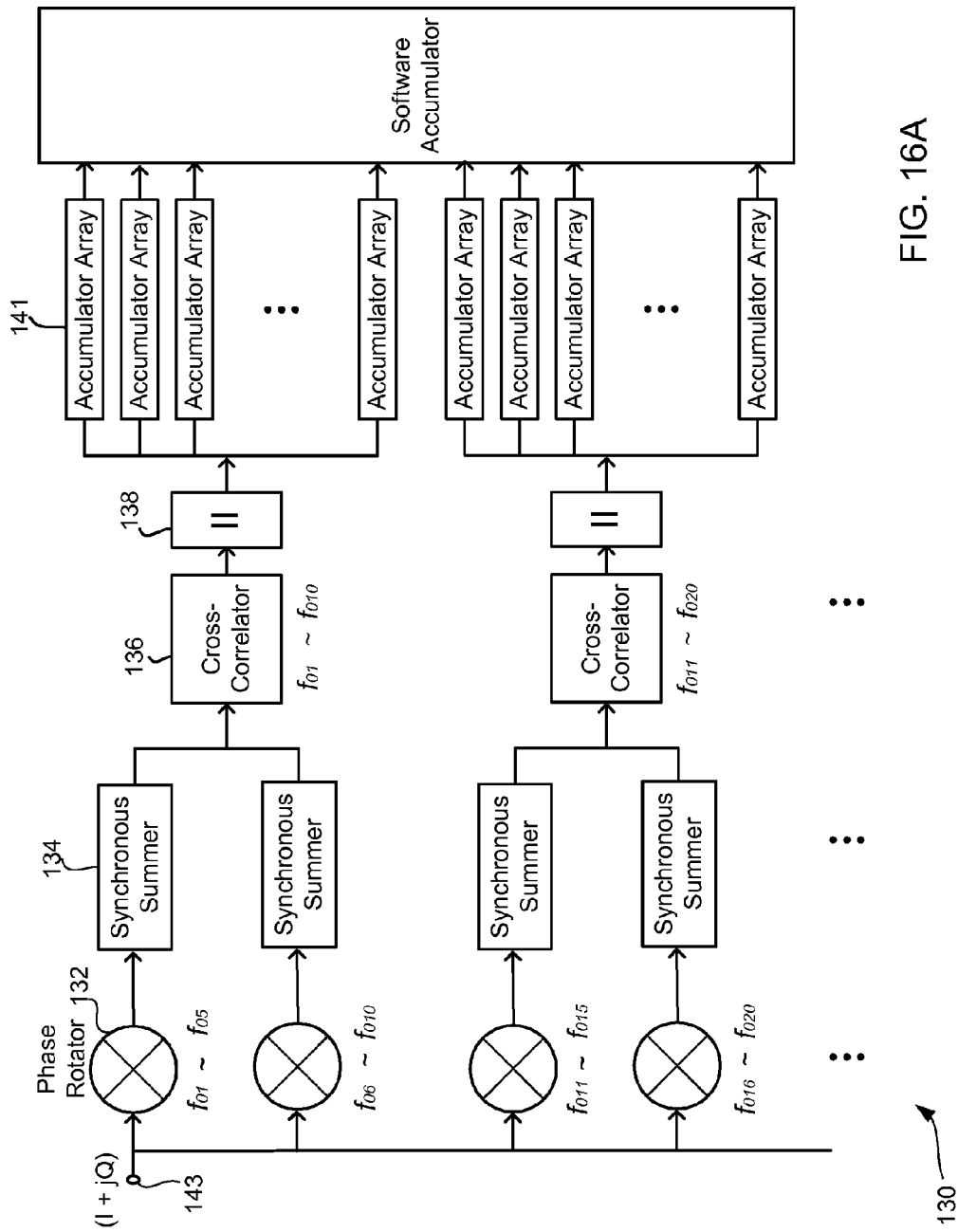

FIG. 16A is a block diagram schematically illustrating a signal processing section that processes a plurality of Doppler frequency bins in parallel, in accordance with one embodiment of the present invention.

Figure 16B:
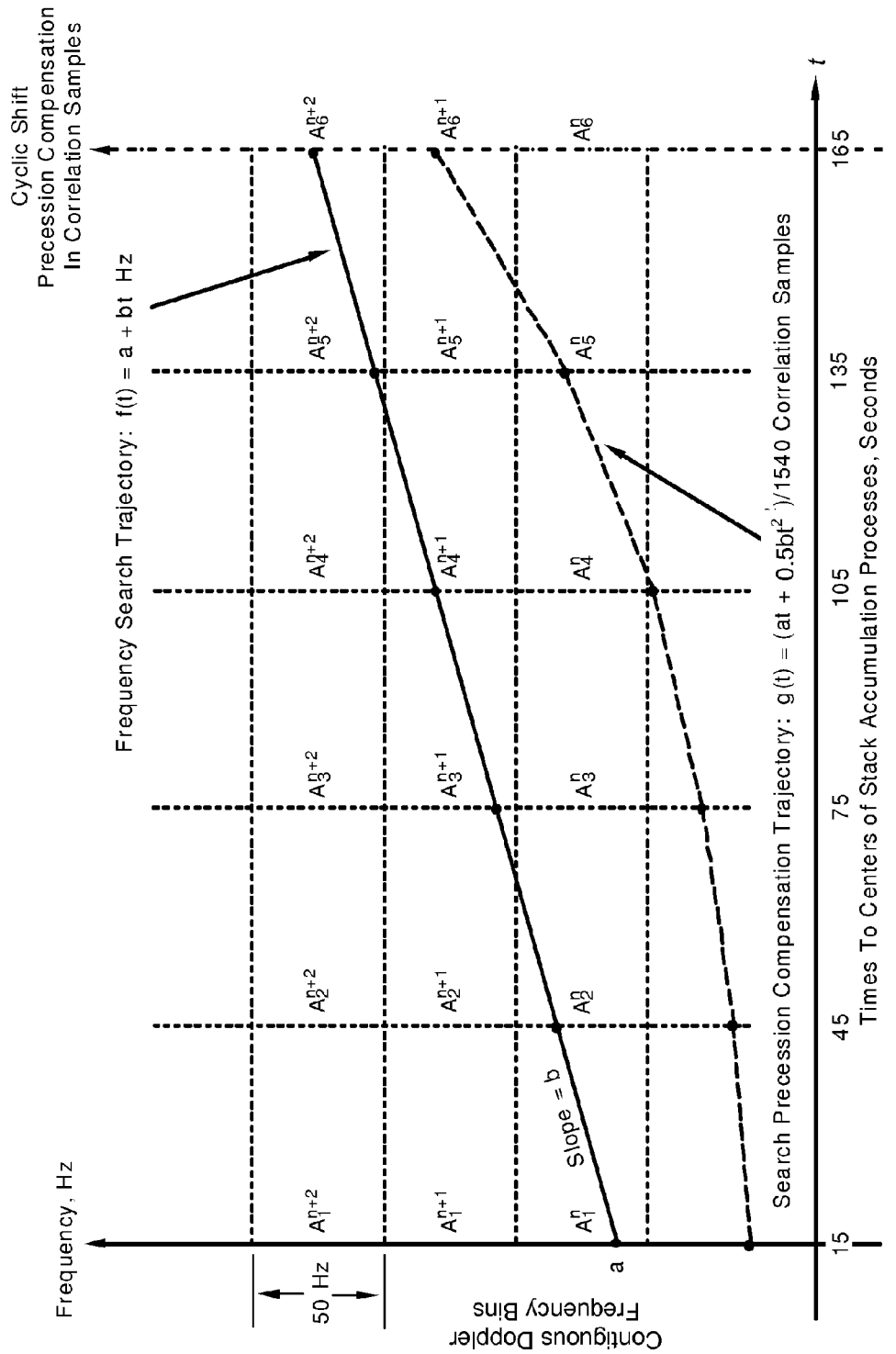

FIG. 16B is a diagram schematically illustrating a method for searching in frequency, which accommodates TCXO frequency drift, in accordance with one embodiment of the present invention.

Figure 17:
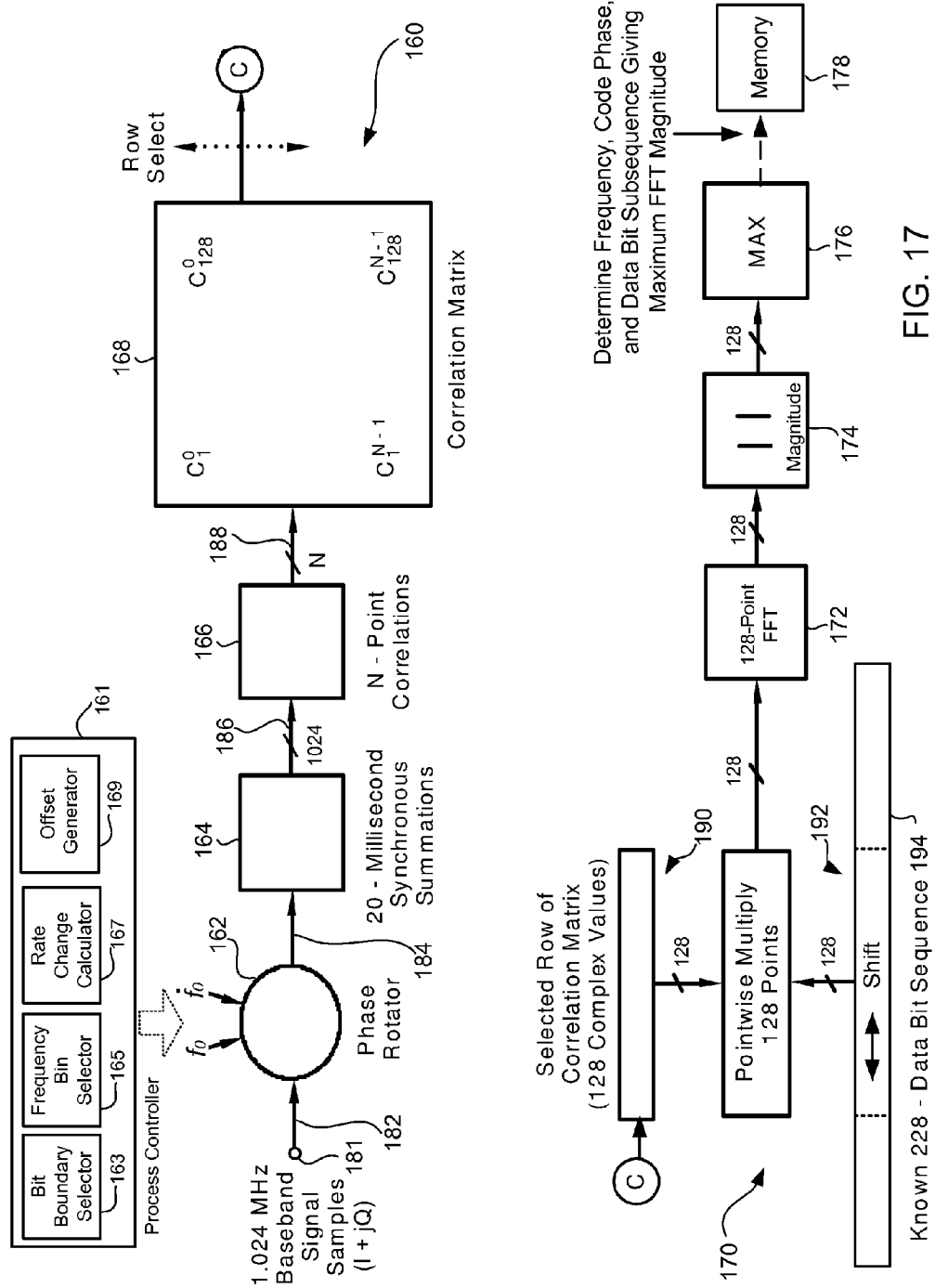

FIG. 17 is a diagram schematically illustrating a method and corresponding circuitry for high-sensitivity acquisition and tracking of weak GPS/GNSS signals in a GPS/GNSS receiver, in accordance with one embodiment of the present invention.

Figure 18A:
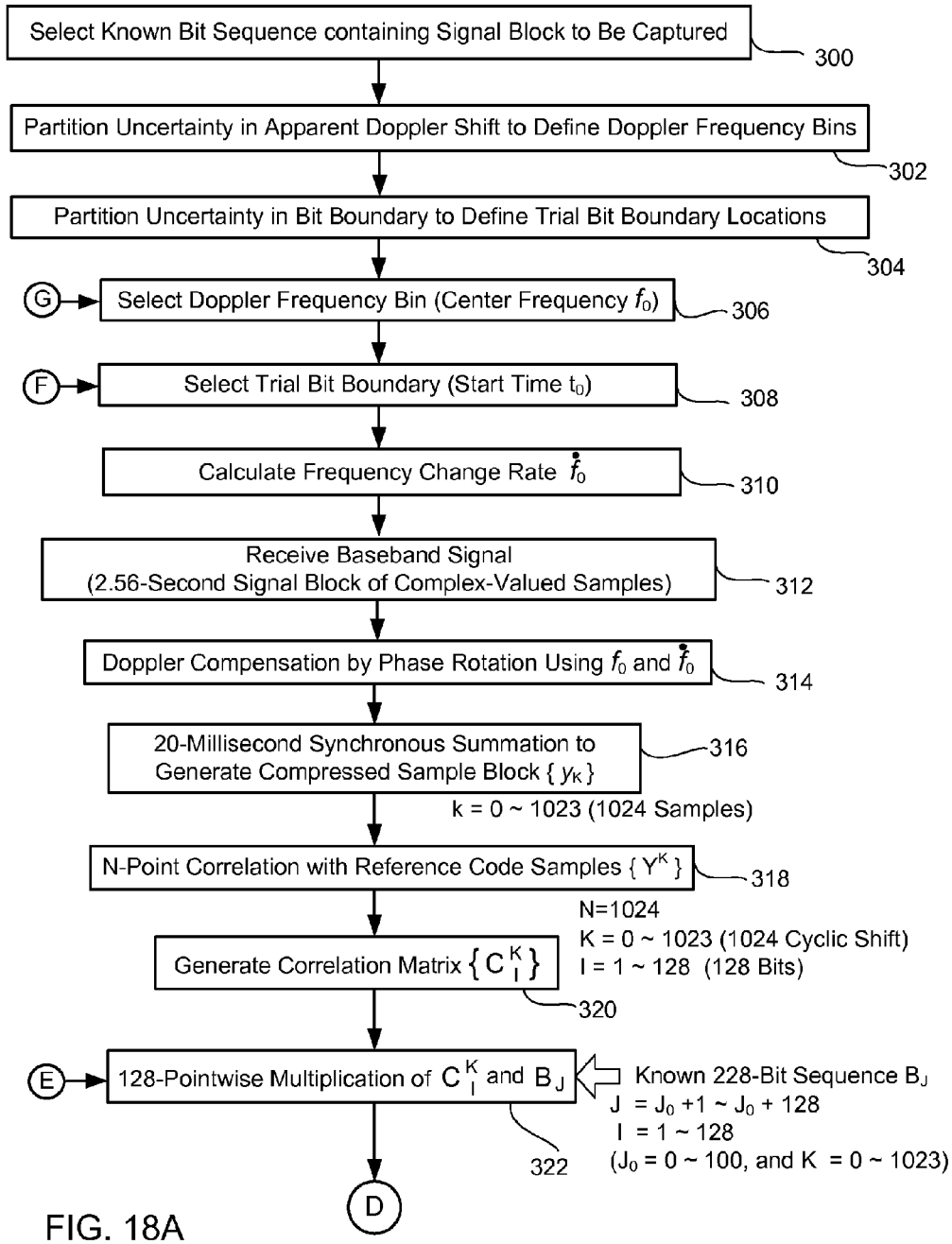
Figure 18B:
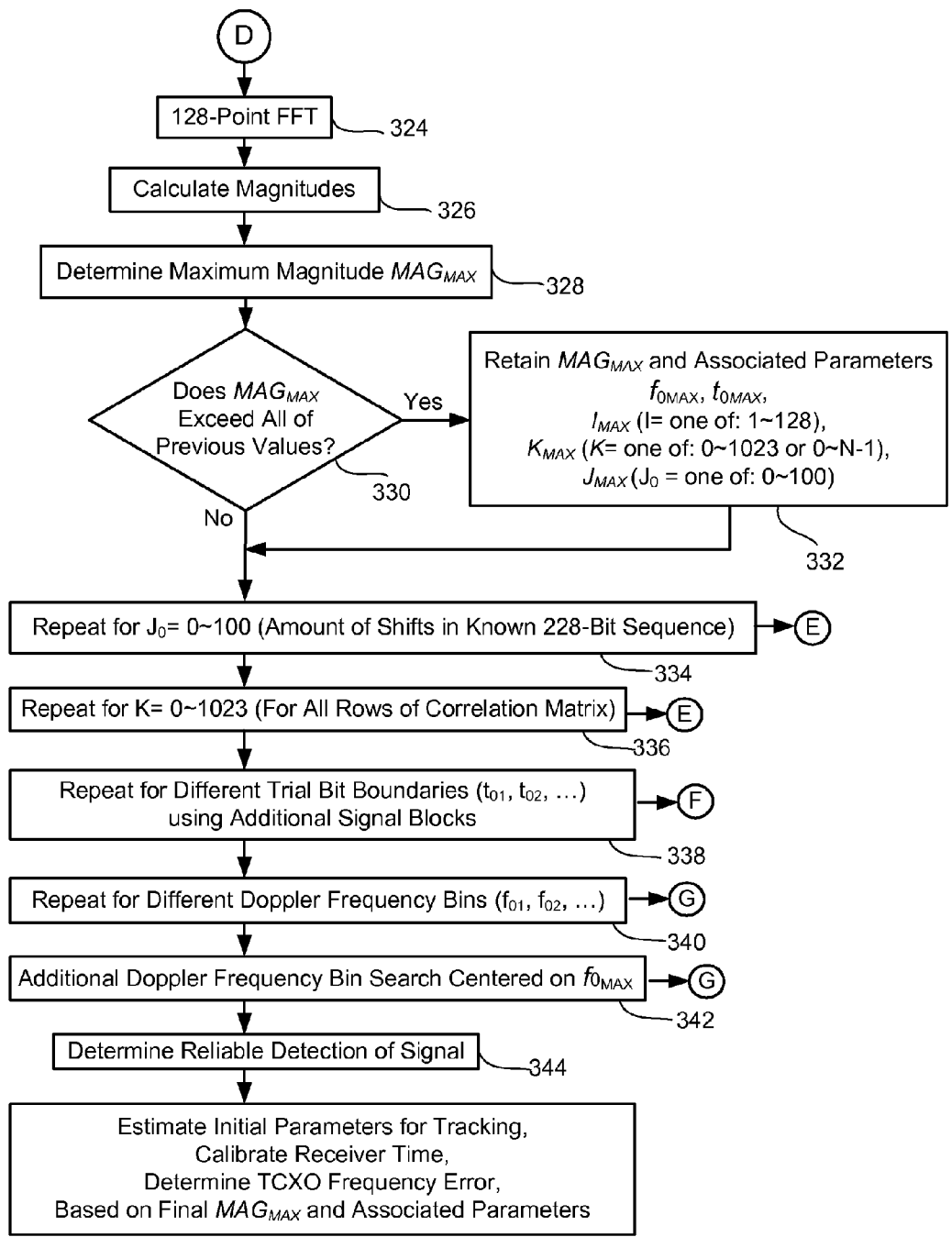

FIGS. 18A and 18B schematically illustrate a process flow of a method for high-sensitivity GPS/GNSS signal acquisition and tracking of weak GPS/GNSS signals in a GPS/GNSS receiver, in accordance with this embodiment of the present invention.

Figure 19:
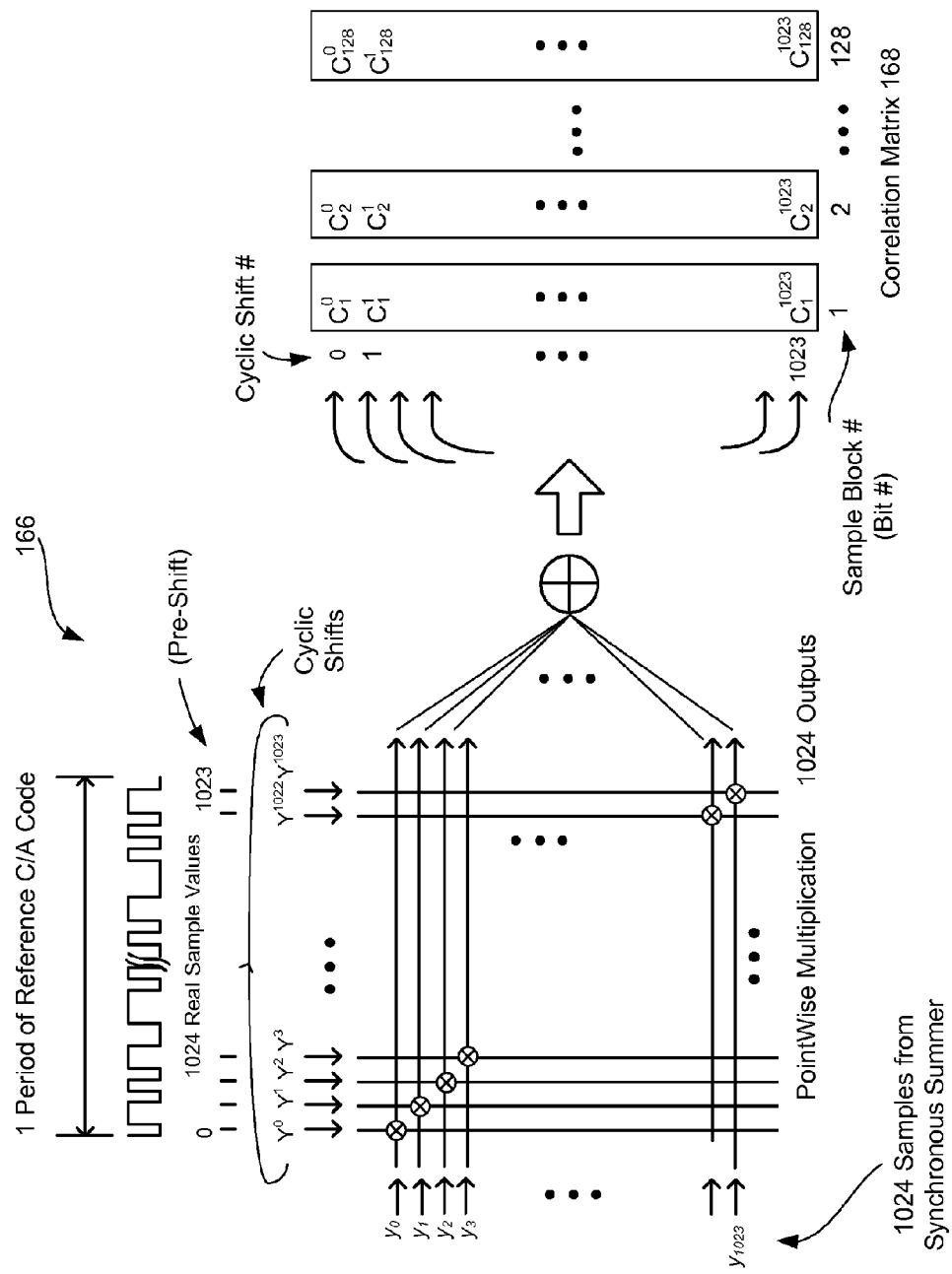

FIG. 19 is a diagram schematically and conceptually illustrating the N-point correlation process to produce a correlation matrix in accordance with one embodiment of the present invention.

Figure 20:
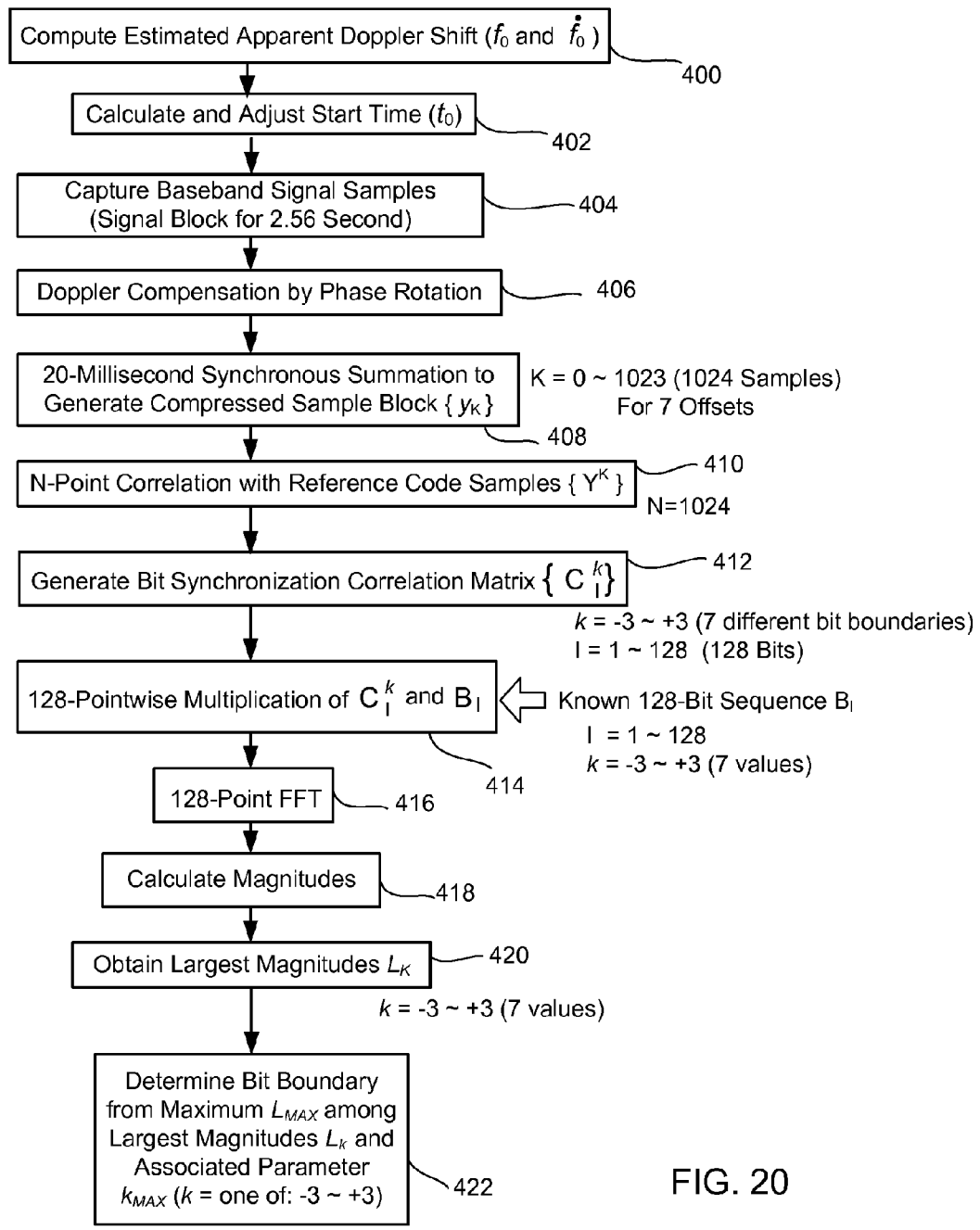

FIG. 20 is a process flow diagram schematically illustrating a method for bit synchronization after acquisition of GPS/GNSS signals, in accordance with one embodiment of the present invention.

Figure 21:
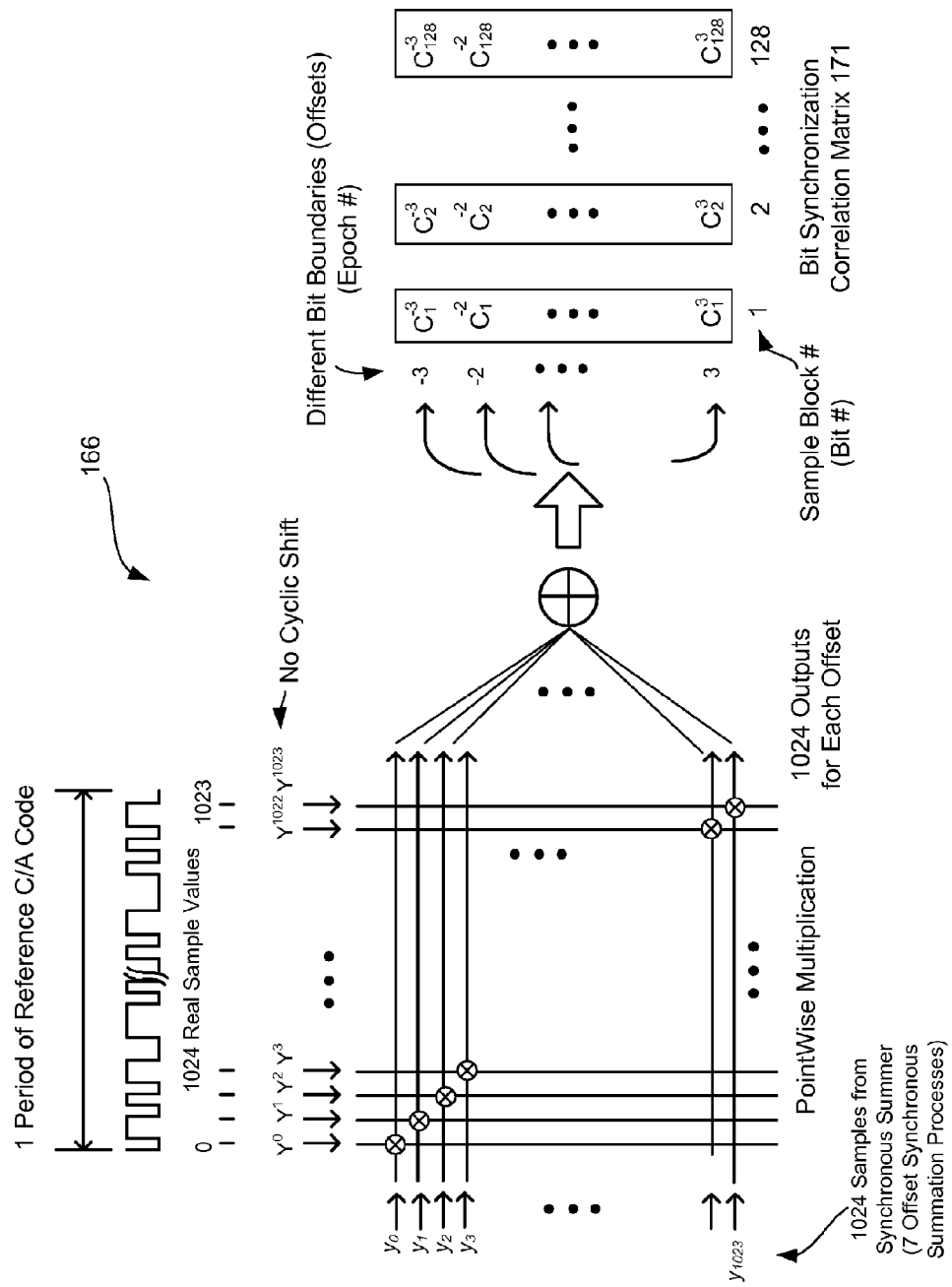

FIG. 21 is a diagram schematically and conceptually illustrating the correlation operation for bit synchronization in accordance with one embodiment of the present invention.

DETAILED DESCRIPTION OF EMBODIMENTS OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention provides a new method and apparatus which permit acquisition, tracking, and sub-microsecond time transfer using very weak GPS/GNSS signals suffering severe attenuation, such as those received indoors or in urban canyons. Depending on several factors, signals as weak as −160 to −170 dBm can be used. Once time transfer has been initiated, it can be maintained using only one GPS/GNSS satellite at any given moment, and handovers from one satellite to another are made possible. Methods will also be described for maintaining time accuracy when all satellite signals drop below the tracking threshold.

For concreteness, the embodiments of the present invention are described using $L_1$ C/A (Coarse Acquisition)-coded GPS signals. However, it is well understood by those of ordinary skill in the art that the present invention is not limited to the use of specific GPS signal, but can be applied to other GNSS signals as well. Similarly, a GPS receiver in the following description may be a GNSS receiver.

In the description, it is assumed that the following conditions are satisfied: (1) the GPS receiver is stationary; (2) The position of the GPS receiver is established by any of various methods; (3) Data such as satellite ephemeris data, satellite clock correction data, almanac data, and other data, such as Time of Week (TOW), in the navigation message is available from an external source, such as the internet or an asymmetric data subscriber link (ADSL); (4) Once initiated, the time transfer is continuously available, but relatively long time intervals are permitted for its initiation. Intervals on the order of 10 minutes to tens of hours might be acceptable for this purpose. In addition, the GPS receiver and its time transfer hardware/software should be low-cost. Also, low power consumption is not necessary.

Figure 1:
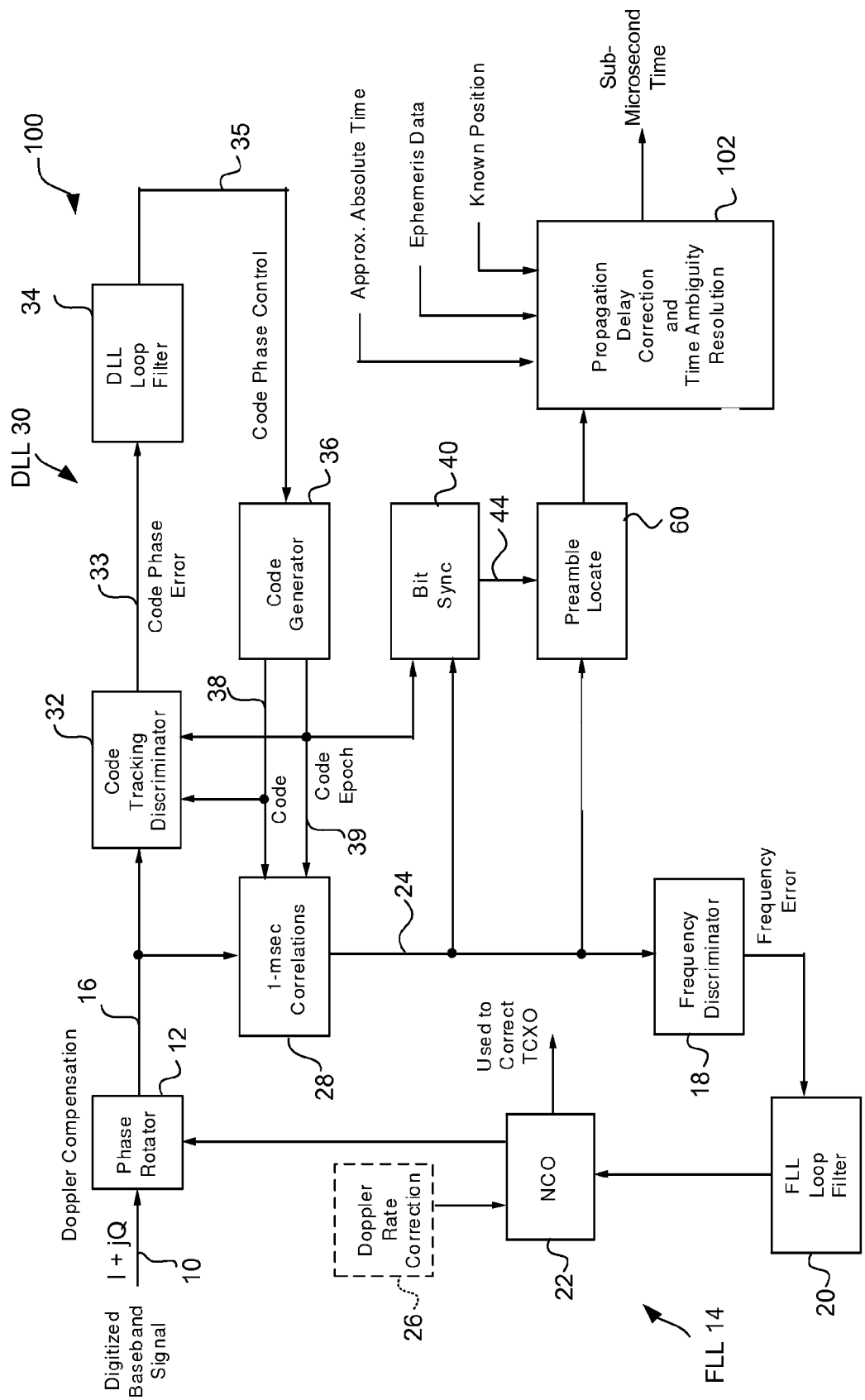
FIG. 1 is a block diagram schematically illustrating a method and corresponding circuitry for sub-microsecond time transfer in accordance with one embodiment of the present invention.

Embodiment 1: Accurate Tracking of Previously-Acquired Satellite and Sub-Microsecond Time Transfer FIG. 1 is a block diagram schematically illustrating a method and corresponding circuitry 100 for accurate tracking of a previously-acquired satellite and sub-microsecond time transfer using a known receiver position, in accordance with one embodiment of the present invention. If more satellite signals are available, all elements in the figure are replicated for each satellite tracked. FIG. 1 only shows part of a GPS receiver which is able to track a satellite and obtain very accurate time, i.e., sub-microsecond time from a very weak GPS signal. It is assumed that the position of the receiver is known within approximately 100 meters for sub-microsecond accuracy, and that a satellite signal has already been acquired and code and carrier frequency tracking has been initiated. That is, as shown in FIG. 1, the input signal to the circuitry 100 is a digitized baseband signal 10 which is received by a radio frequency (RF) front end portion (not shown) of the GPS receiver and has been converted into the baseband frequency.

In this embodiment, the signal acquisition may be performed using any conventional processes well known to those of ordinary skill in the art. It should be noted that the digitized baseband signal 10 is a complex signal and may be expressed as I+jQ (I: real or cosine component, Q: imaginary or sine component). The signal processing is thus carried out in two channels, although figures do not explicitly show two channels for simplicity.

Frequency-Locked Loop

In order to track very weak signals, carrier tracking is accomplished by means of a frequency-locked loop (FLL) with very narrow bandwidth (on the order of 0.01 Hz), which is much narrower than conventional FLL for GPS signals. It should be noted that traditional Costas phase-locked loops (PLL's) are not suitable for tracking very weak signals (below about −151 dBm), because they suffer too much SNR loss due to the signal squaring that is necessary to eliminate data-bit-caused noncoherence. It might be thought that the SNR loss could be regained by using an extremely small PLL loop bandwidth (perhaps as small as 0.01 Hz). However, at such small loop bandwidths, the PLL can have difficulty tracking the signal phase instability after frequency conversion to baseband. The phase instability is caused by the phase instability of the typical low-cost receiver temperature-compensated crystal reference oscillator (TCXO) that serves as a frequency reference in the receiver.

Referring to FIG. 1, the complex (I+jQ) digitized baseband GPS signal 10 is Doppler compensated by a phase rotator 12 which is controlled by the FLL 14 to drive the signal frequency nominally to zero frequency at the phase rotator output 16. The FLL 14 includes a frequency discriminator 18, an FLL loop lowpass filter 20, and a numerically-controlled oscillator (NCO) 22. The input signal 24 to the frequency discriminator 18 consists of the complex outputs (I+jQ) of 1-millisecond signal correlations (correlator) 28, which is to be described below in more detail. The frequency discriminator 18 is designed to minimize the effect of polarity transitions in the received 50 bit/sec navigation data so that it will pull in even when the timing of the data bit boundaries is unknown.

Because the receiver is stationary, is at a known location (approximate location), and ephemeris data is available, a known Doppler rate correction 26 is applied to the phase rotator 12 via the NCO 22 as shown in FIG. 1. The Doppler rate correction may be no greater than 1 Hz/sec, and is not sensitive to moderate errors in the known receiver position. This removes essentially all frequency change on the signal due to satellite motion and enhances the operation of the FLL 14 which detects and removes the residual Doppler error by controlling the NCO 22 via the FLL loop filter 20.

Simulations show that the FLL can track a signal as weak as −165 dBm with a maximum frequency tracking error of about ±10 Hz, and a pull-in time constant on the order of several minutes. This high level of performance is made possible by the stationary position of the receiver and the Doppler rate correction of the NCO 22, both of which keep the signal frequency essentially constant, except for TCXO drift. The frequency tracking error is small enough to permit proper operation of the time extraction to be described later.

Code Tracking Delay-Locked Loop (DLL)

FIG. 1 also shows a code tracking delay-lock loop (DLL) 30 which includes a code tracking discriminator 32, a DLL lowpass loop filter 34, and a code generator 36 which produces a locally generated replica 38 of the received C/A-PN (Pseudorandom Noise) code. The code tracking discriminator (correlator) 32 correlates the generated PN code 38 and the received PN code (in the Doppler compensated baseband signal 16) and outputs a code phase error signal 33 if the generated PN code 38 and the received PN code 16 are not aligned. The DLL loop filter 34 removes noise in the code phase error signal 33 and applies the signal as a code phase control signal 35 to the code generator 36. The code generator 36 outputs the generated PN code 38 thus aligned. That is, the DLL 30 controls the code generator 36 to keep the replica PN code 38 time-aligned with the received PN code 16 appearing at the output of the phase rotator 12. The code generator 36 also outputs a code epoch signal (timing signal) 39 at each epoch of the locally generated PN code 38, where an epoch occurs every millisecond.

During a normal operation when sub-microsecond time is available, the sensitivity of the DLL tracking loop 30 can be significantly enhanced because the receiver's known location, the ephemeris data, and accurate knowledge of time permit the Doppler trajectory of the satellite to be predicted very accurately. It is expected that the DLL 30 will be able to track signals as low as −170 dBm using a very narrow loop bandwidth (about 0.01 Hz or less).

Millisecond Correlations

As shown in FIG. 1, the 1-msec correlations (correlator) 28 cross-correlates the signal 16 (received PN code) at the phase rotator output with the PN code 38 coming from the code generator 36 to produce a continuing sequence of complex-valued (I+jQ) 1-millisecond correlation outputs (complex correlation values) 24. The output of each correlation and the beginning of the next correlation occur at each epoch of the locally generated code, where an epoch occurs every millisecond. That is, controlled by the code epoch signal (timing signal) 39, the 1-msec correlator 28 cross-correlates the baseband signal 16 and the generated PN code 38 for each code period (i.e., 1 millisecond or 1023 chips) and outputs the complex correlation value at each code epoch. The sequence of the complex correlation values (I+jQ) forms a data stream representing the navigation message.

Figure 2A:
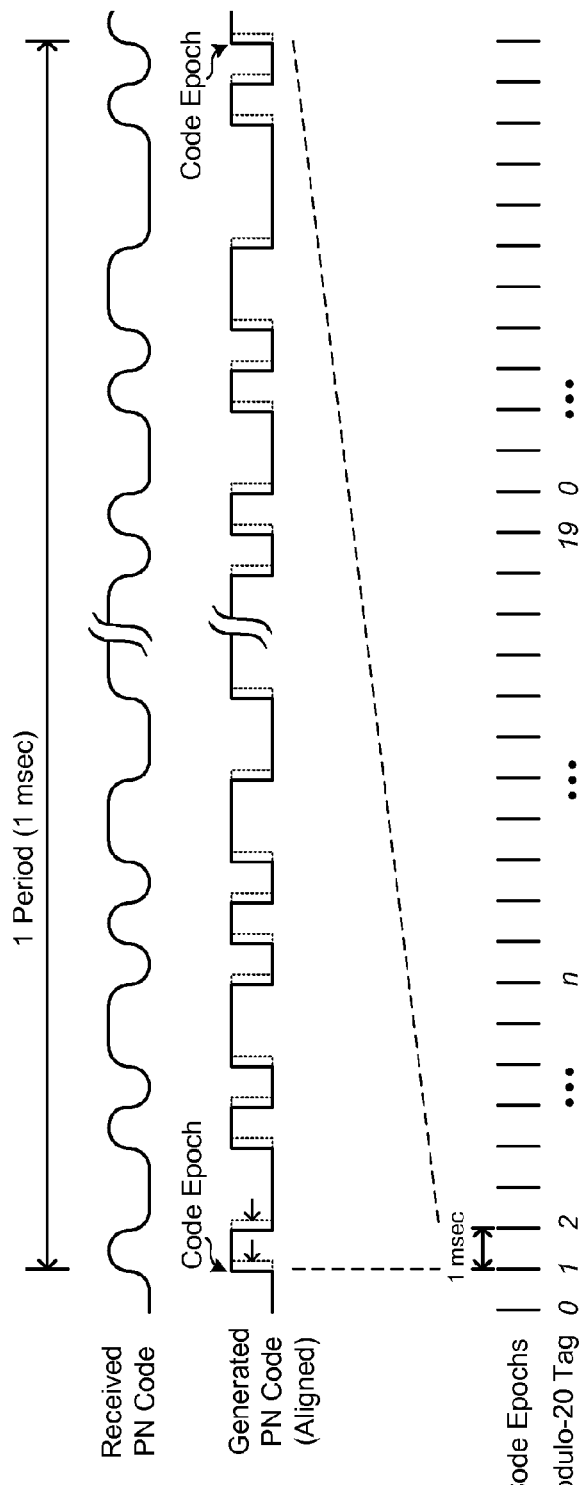
FIG. 2A is a schematic timing diagram illustrating the received PN code, the generated PN code, and the corresponding code epochs in accordance with one embodiment of the present invention.

Because the DLL 30 keeps the locally generated PN code 38 aligned with the received PN code 16, the output of each correlation is near the peak of the correlation function, thereby giving enough processing gain to enable the ensuing FLL, bit synchronization, and time transfer operations. FIG. 2A schematically illustrates the received PN code, the aligned generated PN code, and the corresponding code epochs.

Bit Synchronization

As is well known to those of ordinary skill in the art, the 50-bps (bit per second) data stream of the GPS signal conveys the navigation message. The 50-bps data bit boundaries always occur at an epoch of the PN code. The PN code epochs mark the beginning of each period (1 millisecond, 1023 chips) of the PN code, and there are precisely 20 code epochs per data bit (20 milliseconds, 20,460 chips). In order to operate at extremely low signal levels where phase cannot be reliably tracked, a long-term partially coherent method of bit synchronization is performed at a bit synchronizer 40. The bit synchronizer 40 locates bit boundaries in the GPS data stream and generates numbered (tagged) bit sync pulses at the bit boundaries in accordance with one embodiment of the present invention.

Figure 3:
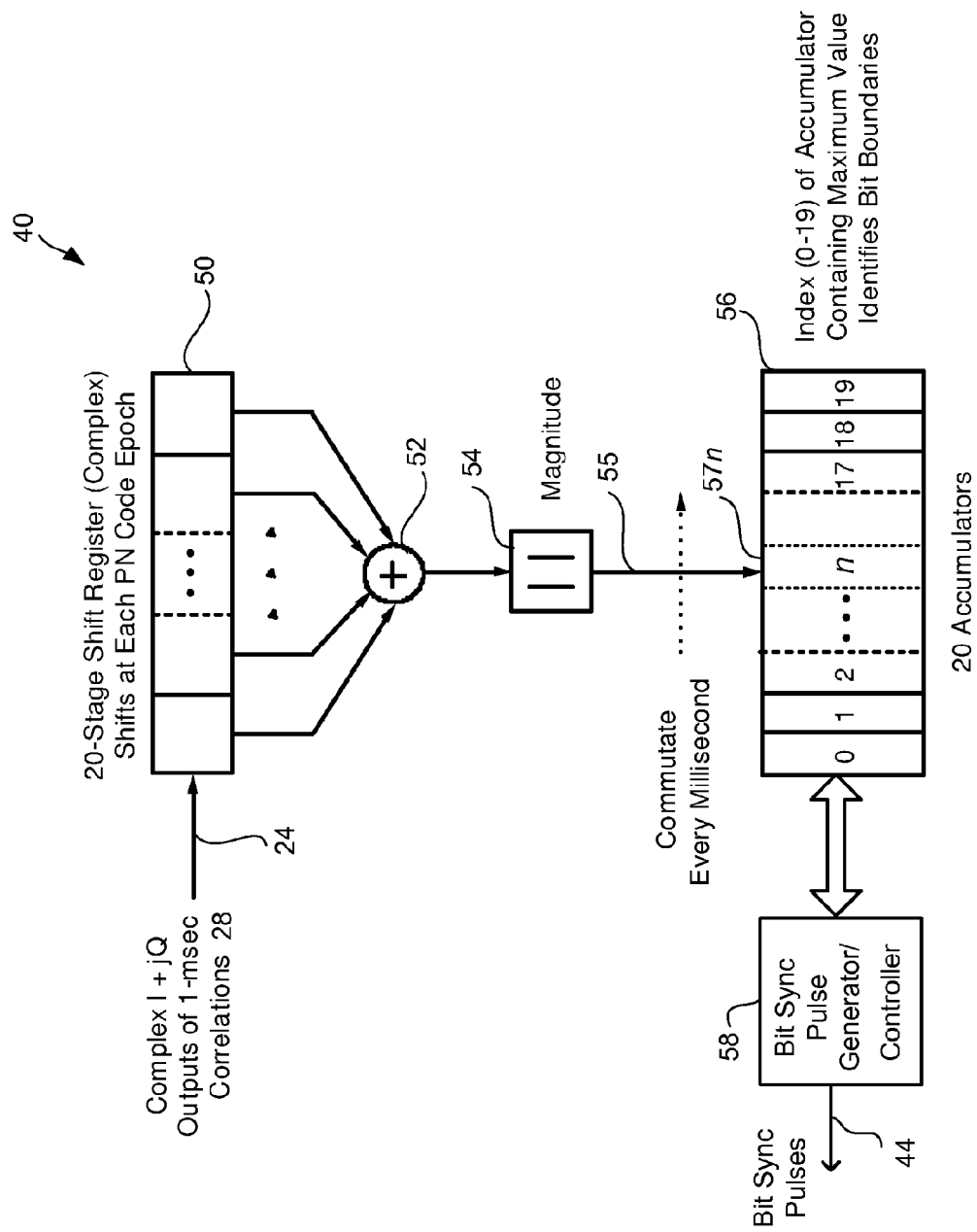
FIG. 3 is a diagram schematically illustrating an example of the bit synchronizer and corresponding bit synchronization process, in accordance with one embodiment of the present invention.

FIG. 3 schematically illustrates an example of the bit synchronizer 40 and corresponding bit synchronization process, in accordance with one embodiment of the present invention. As shown in FIG. 3, the bit synchronizer 40 includes a 20-stage complex shift register 50, an adder 52, and 20 accumulators 56. The complex (I+jQ) correlation values 24 output from the 1-millisecond correlator 28 (shown in FIG. 1) enter the 20-stage shift register 50 at each occurrence of an epoch of the locally generated PN code 38, so that the shift rate is nominally 1000 shifts/second. The epochs provided by the code epoch signal 39 also continuously drive a modulo-20 counter (not shown), which tags each epoch with a modulo-20 number (0-19), as shown in FIG. 2A. Referring back to FIG. 3, for each shift the complex correlation values in the 20 stages of the shift register 50 are summed by the adder 52, and the magnitude of the sum is taken by the magnitude calculator 54. The magnitude value 55 of the sum is placed into one of the 20 accumulators 56, where the specific accumulator 57$n$ ($0 \leq n \leq 19$) has the same index n as the modulo-20 tag of the latest PN code epoch.

Figure 2B:
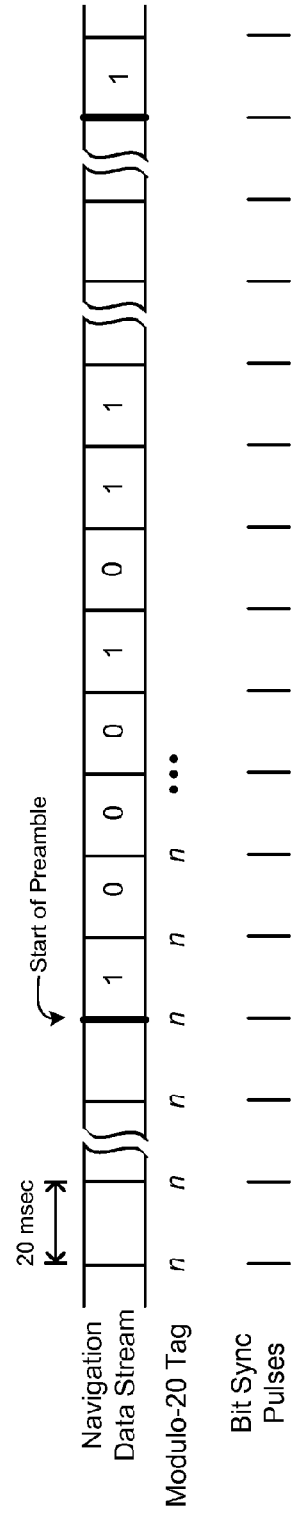
FIG. 2B is a schematic diagram illustrating the navigation data stream and the corresponding bit sync pulses in accordance with one embodiment of the present invention.

The magnitude values 55 summed into the accumulators 56 will tend to be largest when a full bit of the signal data resides in the shift register 50, since the bit values (correlation values) remain the nearly the same (except for noise) within the same bit. This condition, which is repeated every 20 milliseconds, always occurs at the same modulo-20 tag of the PN code epochs. At other epochs, data bit polarity transitions will frequently appear within the shift register 50, tending to reduce the magnitude values 55. Thus, after a sufficiently long time (repeating the accumulating process), the index n of the accumulator containing the largest accumulated value 57n will be the modulo-20 tag n of the code epochs where the data bit transitions occur (i.e. the bit boundary). The bit sync pulse generator 58 of the bit synchronizer 40 can now produce a bit sync pulse 44 each time these specific code epochs occur. Data bits end and start at the bit sync pulse 44. FIG. 2B schematically illustrates an example of the navigation data stream and corresponding bit sync pulses. The bit synchronizer 40 may also include a controller (not shown) which determines one of the accumulators 56 containing the largest accumulated value and identifies the specific code epoch associated with that accumulator as the bit boundary of the data stream. The controller may be part of the bit sync pulse generator 58.

Simulations show that this method of bit sync is very reliable at −160 dBm when allowed to run for 1 minute, at −168 dBm when run for 10 minutes, and at −170 dBm when run for 30 minutes, even when the FLL frequency tracking error is as great as ±10 Hz.

Obtaining Signal Transmission Time

The key to obtaining sub-microsecond time is the ability to determine the Space Vehicle (SV) time at which any given point on the received signal was transmitted. The transmission times of certain parts of the signal are known a-priori, but initially the reception time has ambiguity which can be resolved by various methods to be described. If the occurrence of those parts of the signal can be detected and ambiguity removed, it is then possible to determine the SV time when any part of the signal was transmitted. Clock correction data from an external source can then convert the SV time to very accurate GPS time. As is well known to those of ordinary skill in the art, time defined by the clocks in the satellite is commonly referred to as SV time, and the time after corrections have been applied is referred to as GPS time. Thus, even though individual satellites may not have perfectly synchronized SV times, they share a common GPS time.

EXAMPLE 1

Detecting Occurrence of the Subframe Preamble

Figure 4:
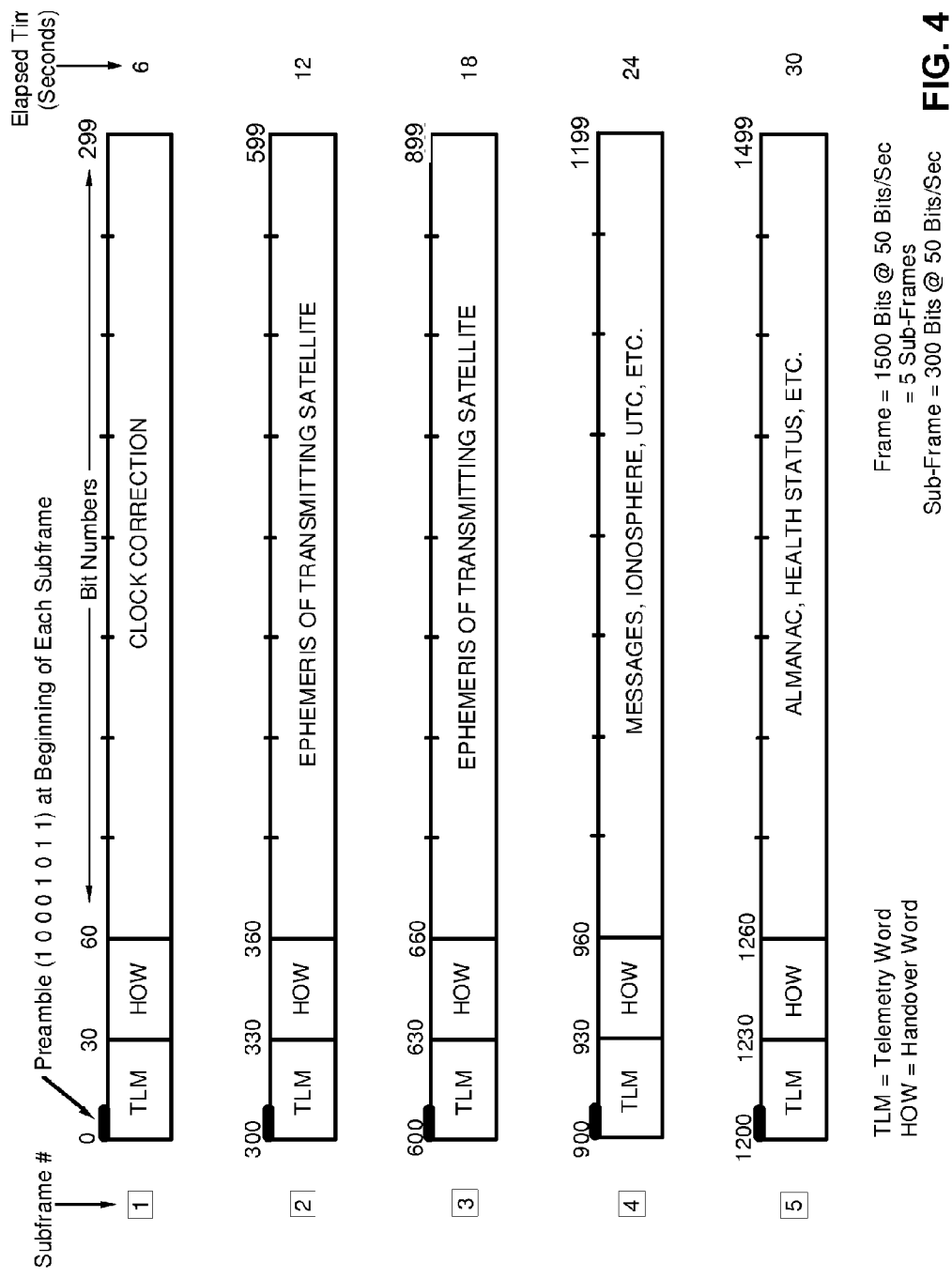
FIG. 4 is a diagram schematically illustrating an example of the frame and subframe structure of the GPS navigation data stream.

FIG. 4 schematically illustrates the frame and subframe structure of the GPS navigation data stream. A complete navigation data message consists of 25 frames, each containing 1500 bits transmitted at a 50 bit/sec rate. Each frame is subdivided into five 300-bit subframes (#1 through #5 in FIG. 4), each subframe consisting of 10 words of 30-bits each, with the most significant bit (MSB) transmitted first. Thus, at the 50 bits/sec rate, it takes 6 seconds to transmit a subframe, and 30 seconds to complete one frame. Transmission of the complete 25-frame navigation message requires 750 seconds, or 12.5 minutes. Except for occasional updating, subframes #1, #2, and #3 are mostly constant (i.e., repeat) with each frame at the 30 second frame repetition rate. On the other hand, subframes #4 and #5 are each subcommutated 25 times. The 25 versions of subframes #4 and #5 are referred to as pages 1-25. Hence, except for occasional updating, each of these pages repeats every 750 seconds, or 12.5 minutes.

The first 8 bits of each subframe is a fixed 8-bit sequence (1 0 0 0 1 0 1 1) called the preamble, which can be used to locate the beginning of each subframe. The SV transmission time of the first bit in each preamble is a known time, except for a 6-second ambiguity if the subframe number is not known. Thus, the transmission time of the first bit modulo 6 seconds can be established if the occurrence of the preamble can be detected within the navigation data bit stream.

Figure 5:
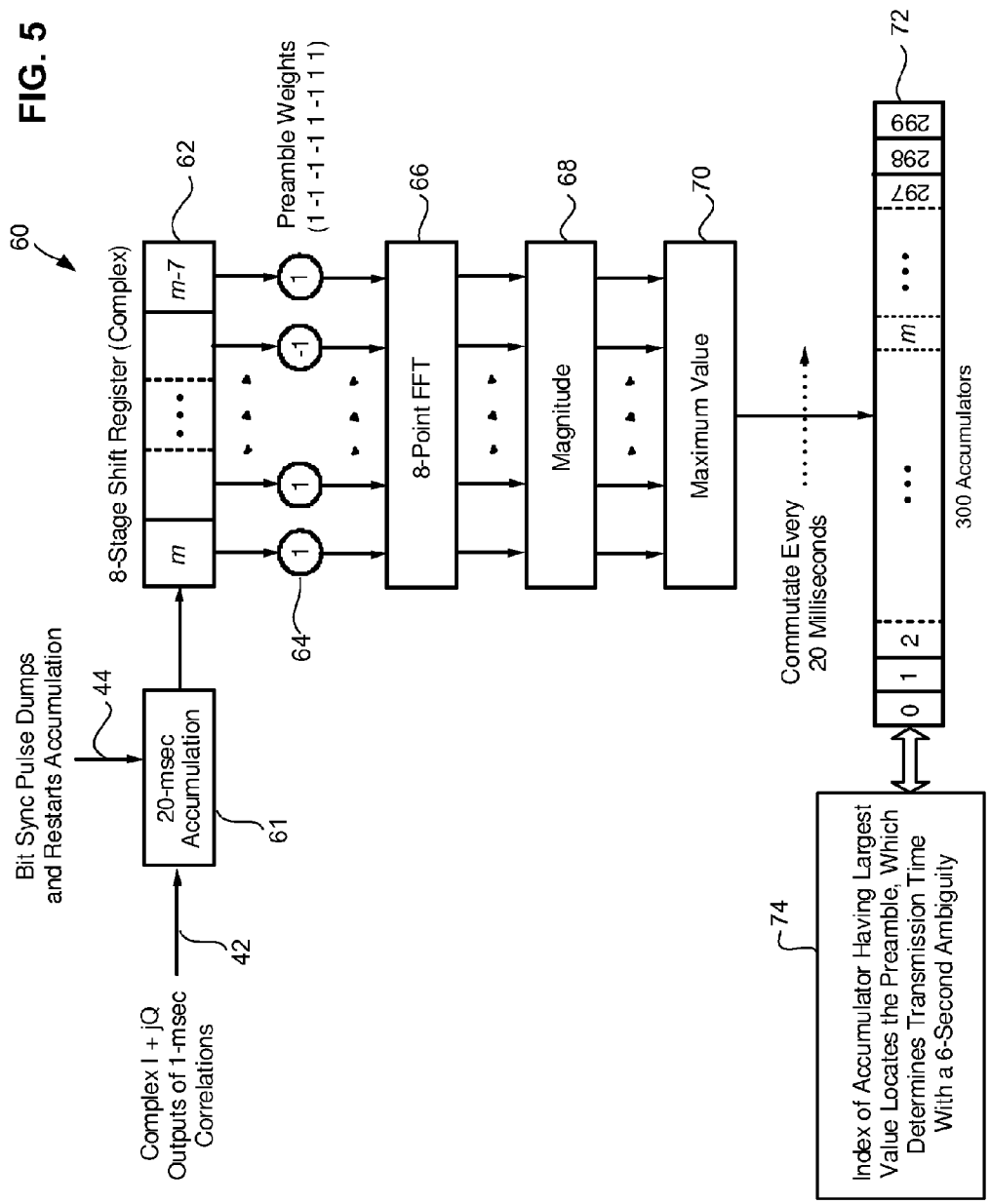
FIG. 5 is a diagram schematically illustrating an example of the preamble locator and a corresponding method for locating the preamble, in accordance with one embodiment of the present invention.

The occurrence of the preamble is detected by a preamble locator 60 (shown in FIG. 1). FIG. 5 schematically illustrates an example of the preamble locator 60 and the corresponding method for locating the preamble, in accordance with one embodiment of the present invention. The preamble locator includes a 20 millisecond accumulator 61, an 8-stage complex shift register 62, a weight multiplier 64, an optional 8-point fast Fourier transformer (FFT) 66, a magnitude calculator 68, a maximum value selector 70, and a bank of three hundred (300) accumulators 72. The weight multiplier 64, the optional 8-point fast Fourier transformer (FFT) 66, the magnitude calculator 68, and the maximum value selector 70 may together be referred to as a weighted multiplexer. As shown in FIG. 5, the complex correlation values 42 output from the millisecond correlations 28 of FIG. 1 are accumulated in the 20 millisecond accumulator 61.

Figure 6A:
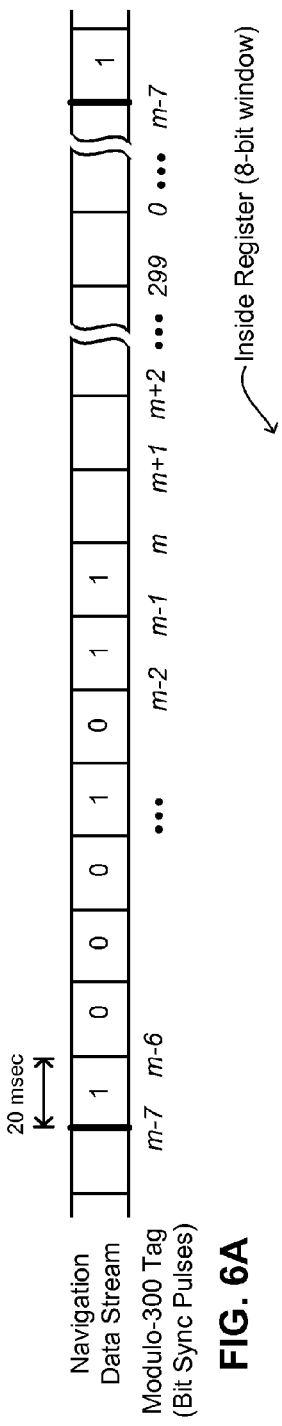
FIG. 6A is a diagram schematically illustrating the navigation data stream and the modulo-300 tags.

Assuming that the bit synchronization has been established, as discussed above, each 20 millisecond accumulation represents the sum of the complex values within the same data bit, which corresponds to the complex value representing bit 1 or 0. The 20-millisecond accumulations (i.e., corresponding to complex bit values) are passed through the 8-stage shift register 62 at the timing of the bit sync pulse 44. That is, each occurrence of the bit sync pulse 44 dumps the 20-millisecond accumulation into the shift register 62 and simultaneously resets and restarts the accumulation process at the 20 millisecond accumulator 61. Thus, the contents of the shift register 62 are shifted every 20 milliseconds, i.e., bit by bit. The bit sync pulses 44 also drive a modulo-300 counter (not shown), which tags each bit sync pulse with a modulo-300 number (0-299) as shown in FIG. 6A. Each complex bit value is also identified by the corresponding modulo-300 tag of the bit sync pulse 44 at which the complex bit value is shifted into the shift register 62 from the 20-millisecond accumulator 61. The 8-stage shift register 62 holds complex bit values corresponding to 8 data bits, serving as an 8-bit window for searching the known bit sequence of the preamble. As shown in FIG. 5, for example, at the time when the bit sync pulse 44 has a modulo-300 tag m, the shift register 62 holds complex bit values corresponding to the modulo-300 tags from m−7 to m.

The output taps (complex values) of the 8-stage shift register 62 are weighted by the known preamble bit sequence (with a weight of −1 replacing the binary 0) at the weight multiplier 64, as shown in FIG. 5. It should be noted that, when the data bit value changes, a complex vector representing the bit value flips in the complex plane. Thus, when the preamble fully occupies the shift register 62, the weighting by the known bit sequence of 1 and −1 (except noise) make all of the vectors for 8 bits identical (except for noise). If there is no Doppler error, the weighted complex values (i.e., aligned vectors) may be simply summed (operation of the 8-point FTT may be inhibited), and the magnitude of the sum tends to be largest when the 8-stage shift register 62 contains the preamble. However, the FLL 14 (shown in FIG. 1) may not perfectly compensate the Doppler effects, and Doppler compensation at the phase rotator 12 may not be perfect due to noise, so the complex vector may still be slowly rotating. Accordingly, as shown in FIG. 5, immediately after each shift, an 8-point FFT (66) is performed on the weighted outputs, the magnitudes of the 8-point FFT outputs are computed (68), and the maximum value of the magnitudes of the 8-point FFT outputs is selected (70). The maximum value is placed into one of the 300 accumulators 72. The specific accumulator 72m has the same index m as the modulo-300 tag of the latest bit sync pulse ($0 \leq m \leq 299$), as shown in FIG. 5.

Figure 6B:
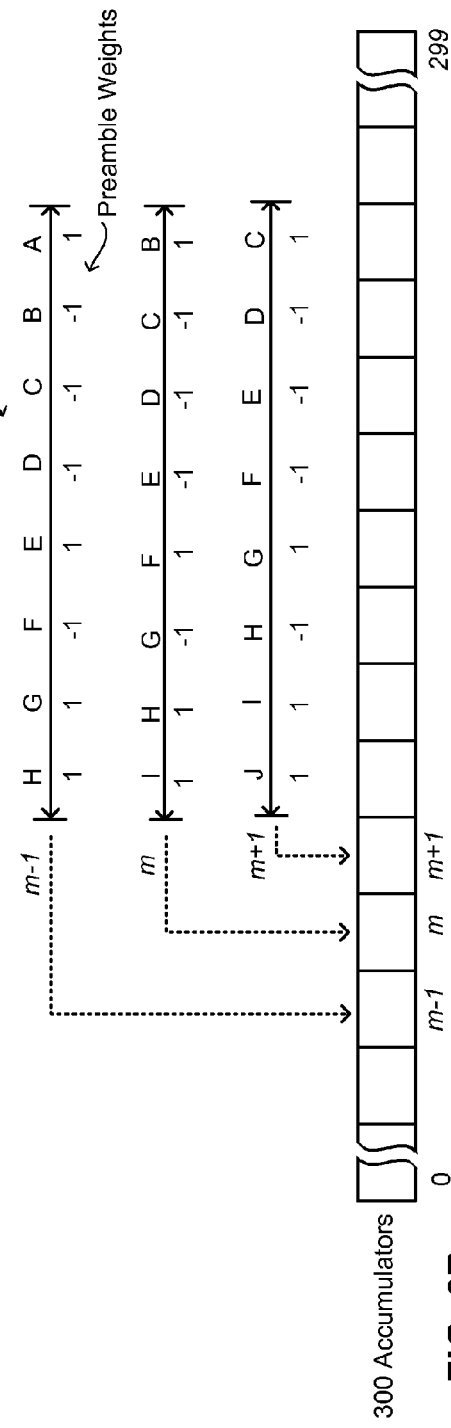
FIG. 6B is a diagram schematically illustrating the 8-stage shift register and 300 accumulator operations in accordance with one embodiment of the present invention.

FIG. 6B schematically illustrates an example of the operation of placing the magnitude of the weighted sum (the maximum value thereof after the 8-point FFT) of eight complex bit values to the accumulators. In FIGS. 6B, A, B, C ... represent complex bit values (i.e., the 20-milisecond accumulation corresponding to bit 1 or 0) held in the shift register. In this example, as shown in FIGS. 2C and 2D, the shift register contains the full preamble at the sync pulse with the modulo-300 tag m, where the complex bit value B having the modulo-300 tag m−7 corresponds to the first (start) bit of the preamble. This process may be repeated a number of times in order to average out the noise.

Figure 6C:
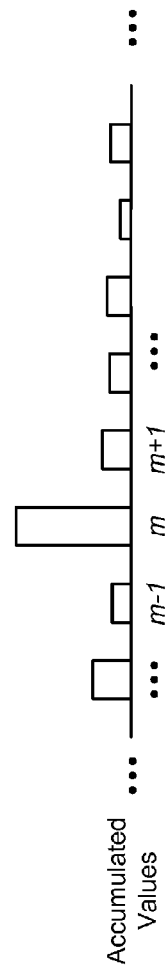
FIG. 6C is a schematic diagram illustrating the accumulated values in the 300 accumulators.

When the preamble fully occupies the shift register 62 (which happens every 300 bits of the navigation message), the maximum magnitude of the 8-point FFT outputs tends to be largest, and over time the corresponding accumulator 72$m$ (FIG. 5) will build up a value larger than that of the other accumulators. Thus, after a sufficiently long time, the index m of the accumulator 72 containing the largest accumulated value will be the modulo-300 tag m of the bit sync pulses 44 at which times the preamble becomes fully within the shift register 62, as shown in FIG. 6C.

The preamble locator 60 also includes a controller 74 to determine a specific accumulator 72$m$ of the bank of the 300 accumulators which contains the largest value, and to identify the bit sync pulse having the index m−7 as the location of the first bit of the preamble. The controller 74 may include a transmission time determiner (not shown) for determining transmission time of the target segment with a certain time ambiguity, based on the bit location of the target segment and known transmission time of a particular bit (i.e., the first bit of the subframe) in the navigation message. In this way the transmission time of the first bit of the preamble, which is also the first bit in the subframe, can be determined with a 6-second ambiguity.

If the FLL 14 could maintain a zero frequency error, as mentioned above, the 8-point FFT 66 would not be necessary, because the maximum magnitude of the 8-point FFT outputs would tend to occur in the zero-frequency FFT output bin (the output of this frequency bin is just the sum of the weighted outputs of the shift register taps). However, because noise causes a nonzero frequency error in the FLL tracking by the FLL 14, there can be a signal loss due to reduced coherence in summing the weighted outputs. The FFT regains the coherence by neutralizing the frequency error in forming one of its outputs.

Since the preamble contains only 8 bits, there is the possibility that the same sequence of bits will appear in other parts of the navigation message. However, it is very unlikely this will happen at the same spot in every subframe. Since the preamble appears in every subframe, its occurrence will be dominant.

Computer simulations show that the preamble can be reliably detected at −160 dBm by observing only 5 frames (150 seconds or 2.5 minutes of data), and at −170 dBm by observing 25 frames (750 seconds or 12.5 minutes of data).

The requirement of 300 accumulators 72 to locate the preamble can be mitigated in various ways. One method is to search smaller portions of the 300 bit subframe period, one portion at a time. For example, if each portion contains 50 bits, the same 50 bit positions of each subframe could be searched using 50 accumulators, and the maximum accumulator value retained. This process would be repeated 6 times to cover the full 300-bit subframe period, after which the maximum of the 6 maxima would locate the preamble. Of course, this would increase the search time by a factor of 6.

Another method could be used if approximate time is available from an outside source. For example, if time is known to within ±0.5 seconds, only about 50 bits of data need to be searched every 6 seconds, and only 50 accumulators would be required. Both methods could be used to further reduce the number of accumulators. For example, the 50 bits of data could be divided into 5 portions of 10 bits each, reducing the number of accumulators to 10.

EXAMPLE 2

Detecting the Occurrence of a Larger Segments of Bits

Figure 7:
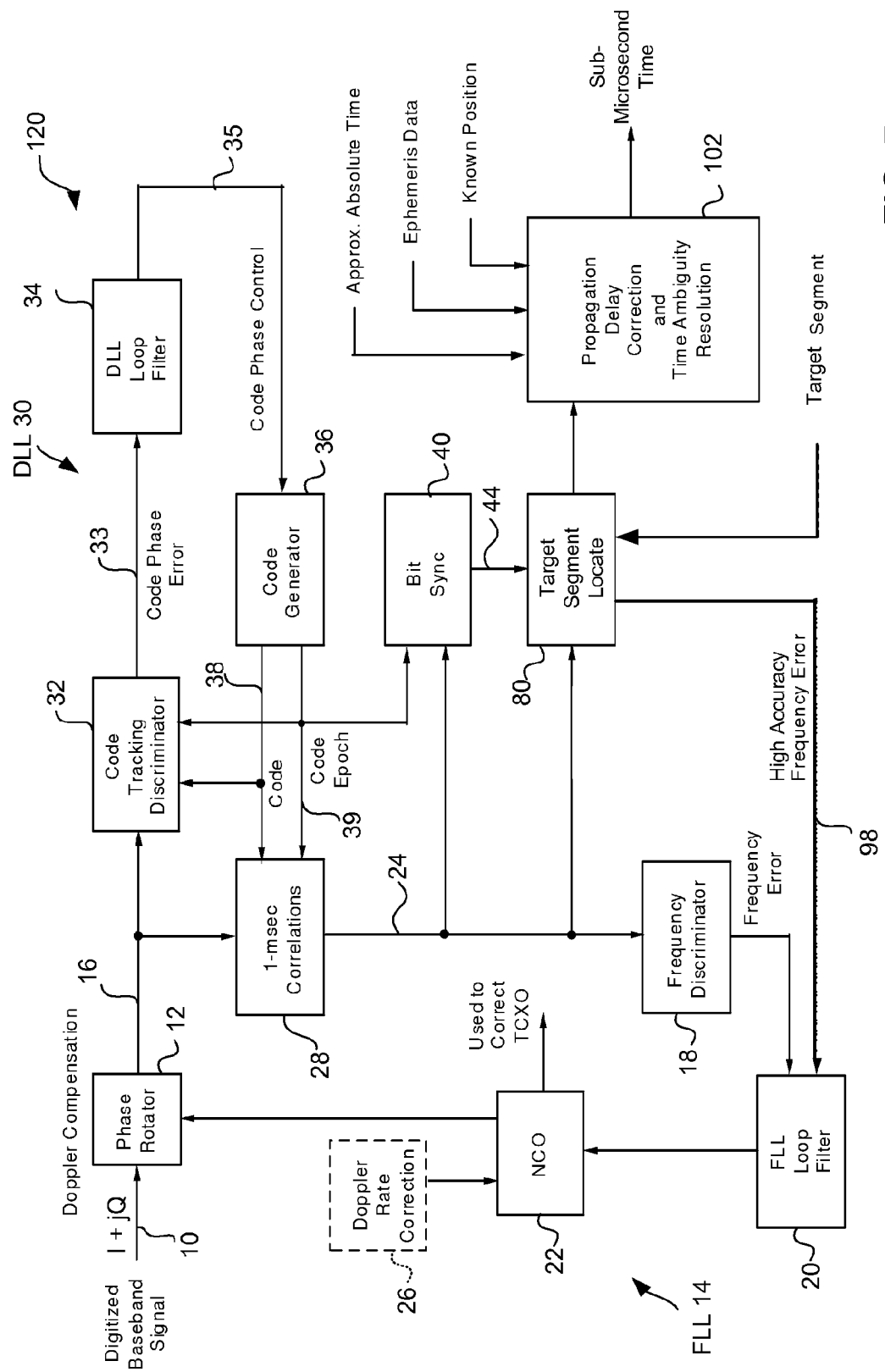
FIG. 7 is a block diagram schematically illustrating a method and the corresponding circuitry for obtaining sub-microsecond time, in accordance with another embodiment of the present invention.

FIG. 7 schematically illustrates an alternative way of obtaining signal transmission time, in accordance with another embodiment of the present invention, which detects the occurrence of larger segments of data bits in the navigation message. In FIG. 7, the like elements bear the like reference numerals as those in FIG. 1. As shown in FIG. 7, the circuitry 120 includes a target segment locator 80 in place of the preamble locator 60 in FIG. 1. Since it is assumed that satellite ephemeris data, satellite clock correction data, almanac data, and perhaps other data, such as Time of Week (TOW), in the navigation message is available from an external source, this information can be used to determine the bit sequences that are used to transmit it. Since the position of these known bit sequences relative to the start of a frame is known, the occurrence of the first bit at the start of a frame can also be determined from the detected known bit sequence. Since the transmission time of the start-of-frame bit is known with an ambiguity of 30 seconds (the length of a frame), the ambiguity can easily be removed by independent knowledge of time to within ±15 seconds.

Figure 8:
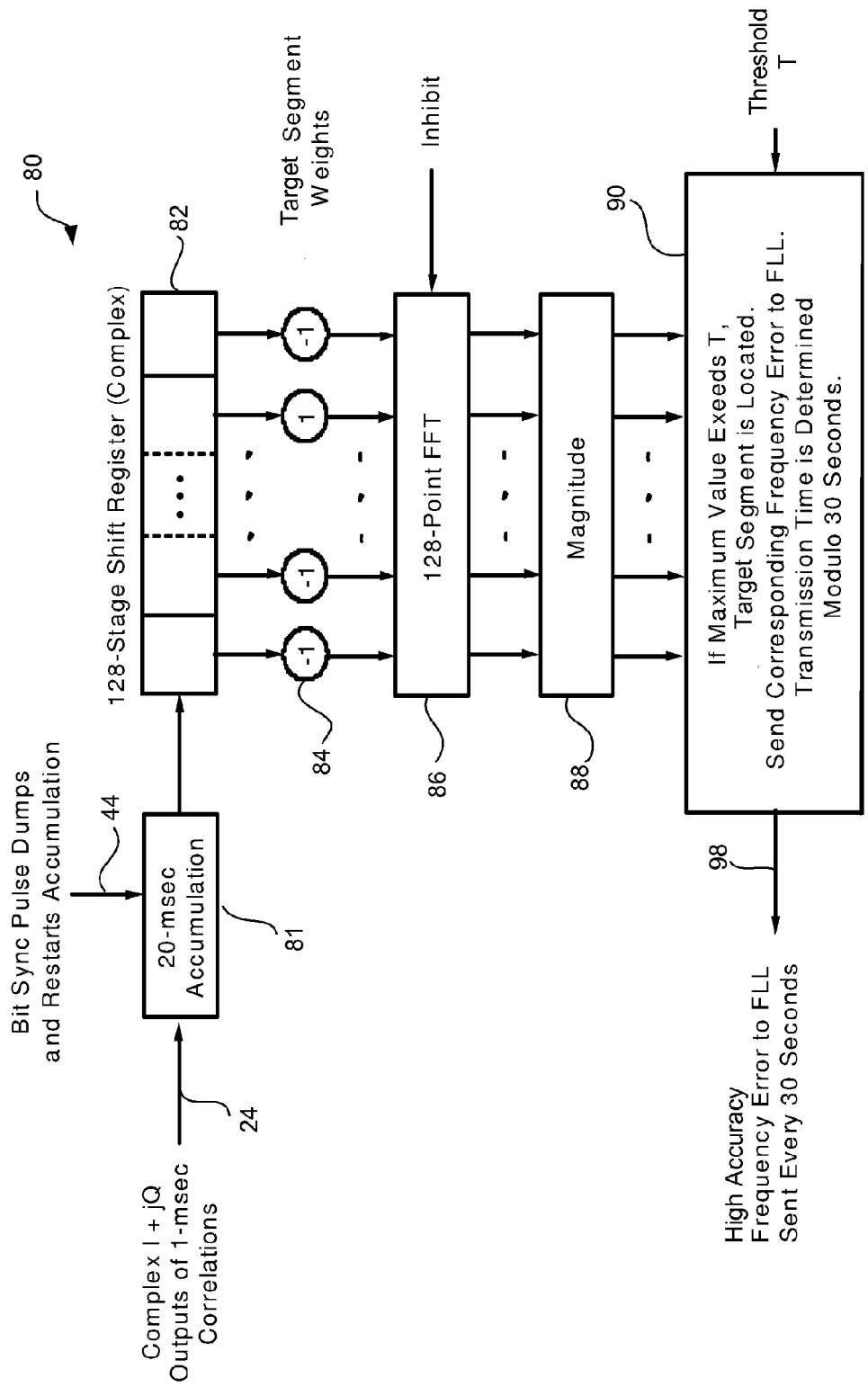
FIG. 8 is a diagram schematically illustrating an example of the target segment locator 80 and the corresponding method for detecting the occurrence of a known bit sequence in accordance with one embodiment of the present invention.
Figure 9:
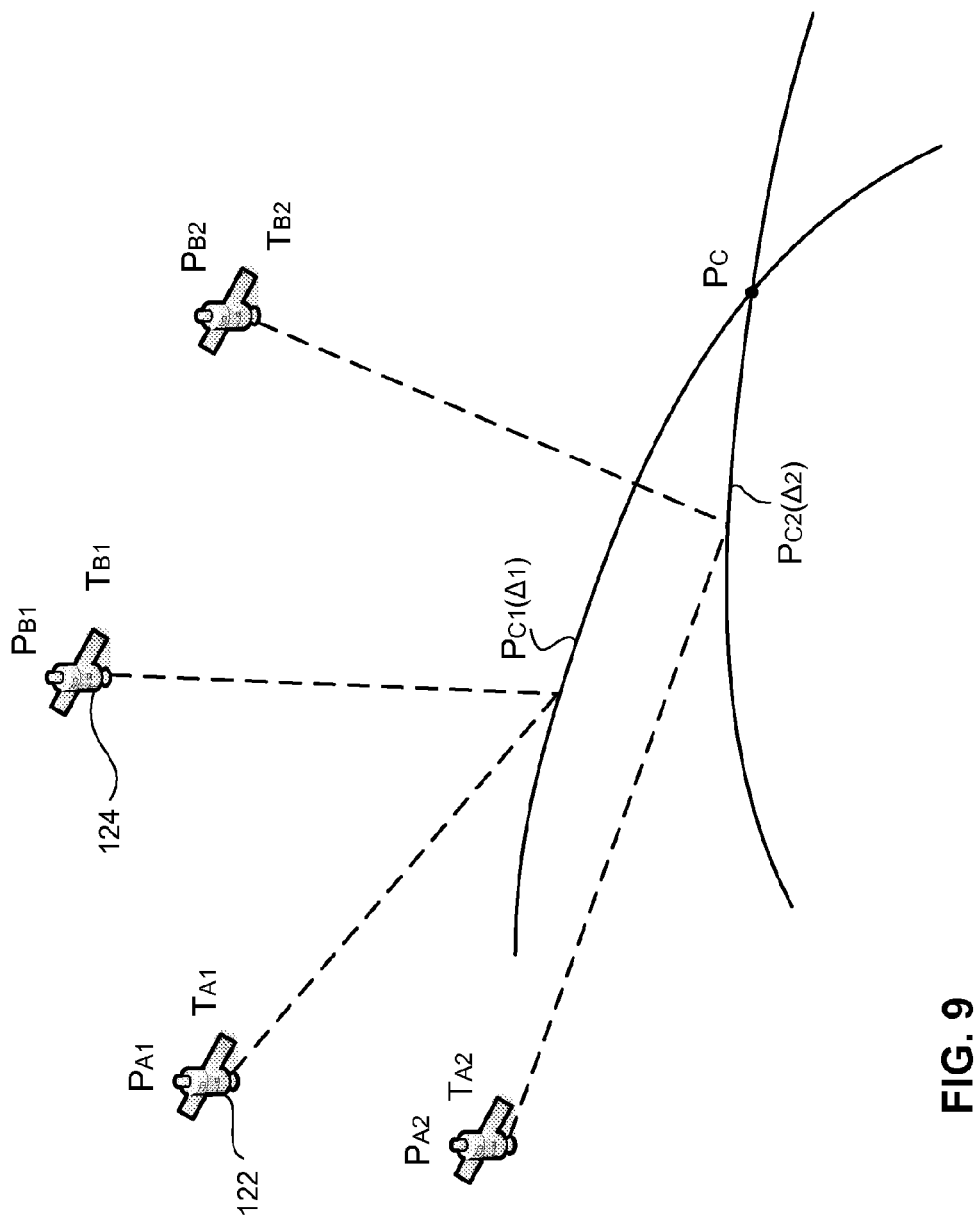
FIG. 9 is schematic diagram illustrating a method for obtaining the receiver's position from two GPS signals, in accordance with one embodiment of the present invention.

FIG. 8 schematically illustrates an example of the target segment locator 80 and the corresponding method for detecting the occurrence of known bit sequence in accordance with one embodiment of the present invention. For concreteness, it is assumed that a 128-bit sequence with known position relative to the start of the frame has been determined from externally supplied navigation data. A certain number of data bits having a known sequence at a known position within a frame is referred to as a target segment. Thus, the preamble in the previous embodiment may also be a target segment. In this example, the target segment is a 128-bit sequence of the ephemeris data. The number of bits assumed is not limiting but illustrative, and a smaller or larger number can be used. However, in this example, a relatively large number has been chosen to illustrate the large processing gain that can be achieved. As shown in FIG. 8, the target segment locator 80 includes a 20 millisecond accumulator 81, a 128-stage complex shift register 82, a weight multiplier 84, an optional 128-point fast Fourier transformer (FFT) 86, and a magnitude calculator 88. The weight multiplier 84, the optional 128-point fast Fourier transformer (FFT) 86, and the magnitude calculator 88 may together be referred to as a weighted multiplexer. The target segment locator 80 also includes a controller 90 having a maximum value comparer.

The complex outputs 24 of the 1-millisecond correlations 28 (shown in FIG. 7) are accumulated in the 20 millisecond accumulator 81, and the outputs of the millisecond accumulator 81, which occur every 20 milliseconds, are passed through the 128-stage shift register 82. Each occurrence of the bit sync pulse 44 dumps the 20-millisecond accumulation into the shift register 82, and simultaneously resets and restarts the accumulation process in the 20 millisecond accumulator 81, in a similar manner as the previous example shown in FIG. 5. Thus, the contents of the shift register 82 are shifted every 20 milliseconds. The bit sync pulses 44 also drive a modulo-1500 counter (not shown), which tags each bit sync pulse 44 with a modulo-1500 number (0-1499).

The output taps of the 128-stage shift register 82 are weighted by the known bit sequence from the externally supplied navigation data at the weight multiplexer 84. Similarly to the previous example, data bit 0 is replaced with −1 in the weighting. Immediately after each shift, a 128-point FFT 86 is performed on the weighted outputs, and the magnitude of each of the 128 FFT outputs is computed (88). The maximum magnitude of the 128 FFT outputs is compared with a predetermined threshold T at the maximum value comparer in the controller 90. Since the target segment has a sufficiently large number of bits in a particular sequence (which tends to be random or non-repetitive), the wholly contained segment in the 128-stage shift register 82 would produce a significantly greater value than any other cases. Thus, the threshold T may be set, for example, based on the data length of the target segment and expected noise level.

If the threshold T is exceeded, it is determined that the known bit sequence of the target segment (ephemeris data in this example) is wholly contained in the shift register 82, and the modulo-1500 tag of the latest bit sync pulse 44 is recorded. Since the location of the known bit sequence relative to the first bit of the frame is known, the modulo-1500 tag of the bit sync pulses at the beginning of the first bit of the frames is also now known, and the transmission times of these first bits are known with a 30 second ambiguity. In this way, the controller 90 identifies, if the maximum value (the weighted sum) exceeds the predetermined threshold T, the bit location of the target segment from the recorded bit sync pulse.

The specific target sequence only occurs once in every frame (i.e., in every 30 seconds), while the preamble in the previous example occurs once in every subframe (i.e., in every 6 seconds). Thus, if the approximate time is known within 30 seconds (±15 seconds) from an external source, the accurate transmission time can be determined. In addition, as soon as the maximum magnitude exceeds the threshold T, the target segment location can be declared, without searching through the remaining frame.

This method is very reliable because of the large processing gain (about 21 dB) inherent in the cross-correlation of the known bit sequence with the signal, since a relatively large number of bits (compared to 8 bits of the preamble) are summed. Furthermore, the probability is very small that the same bit sequence will appear in other places within the frame. Additionally, no accumulator banks are required, substantially reducing cost of the receiver.

The 128-point FFT 86 serves the same purpose as the 8-point FFT 66 used to locate the preamble, as described previously. However, because of the large processing gain, the 128-point FFT 86 can serve another valuable purpose. When the threshold T is exceeded, the frequency bin at which this occurs provides a very accurate indication of the FLL frequency error, because the frequency resolution of the 128-point FFT is $1/(128 \times 0.02) = 0.39$ Hz. This error can be sent as a high accuracy frequency error signal 98 to the NCO 22 at 30-second intervals, as shown in FIG. 6, to substantially enhance the operation of the FLL 14, in fact, enabling tracking of the signal at −170 dBm. Thus, the controller 90 may also include a frequency error signal generator to output the high accuracy frequency error signal 98.

Satellite clock correction data present in subframe #1, which also occurs once in every frame, can be used in the same way as ephemeris data, again resulting in determination of transmission time with a 30 second ambiguity.

If the known bit sequence is from the almanac, the time ambiguity can be increased to 12.5 minutes, because the known bit sequence will occur only in one of the 25 frames constituting the complete navigation message. However, it may take up to 12.5 minutes to detect the sequence.

Another bit sequence that can be known is the Time of Week (TOW) in the navigation message. The TOW consists of the first 17 bits of the second 30-bit word in each subframe. If approximate time is known to ±3 seconds, the 17-bit pattern can be determined and its occurrence detected. The result is unambiguous transmission time at any point on the received signal.

Time Ambiguity Resolution and Correction for Signal Propagation Time

As shown in FIGS. 1 and 6, the final step in obtaining sub-microsecond local time is resolution of the remaining time ambiguity and correcting for signal propagation delay which are performed by a propagation delay correction and a time ambiguity resolution section of the local time determination circuit 102.

1. Resolution of Time Ambiguity

The time ambiguity is resolved using knowledge of approximate time at the receiver, which can come from various sources.

For Example 1 of obtaining transmission time (by detecting the preamble), approximate time must be within ±3 seconds, and for Example 2 (by detecting a target segment from the externally supplied navigation data), it must be within ±15 seconds, which is easier to accomplish, when the target segment occurs once in every frame. If Example 2 uses a known bit sequence from the almanac, approximate time only needs to be known within ±6.25 minutes. These accuracies, especially the latter, are within the range of a low-cost clock, such as that found in quartz-controlled wristwatches that have been initially set with sufficient accuracy and maintained for periods of days or weeks (these clocks can also be calibrated for rate of error to permit the required accuracy over much longer periods). Approximate time to ±3 seconds might also be obtained via ADSL, or possibly over cellular telephone networks. The ±6.25 minute accuracy and perhaps the ±15 second accuracy can be obtained via the Internet. Another source of approximate time is the reception of atomically regulated low-frequency radio signals from stations such as WWVB in the United States or its counterparts in Japan and Europe. The time accuracy available from these sources is generally within the 0.01-0.1 second range if no attempt is made to correct for propagation delay.

Approximate time can also be established by tracking only two satellites if the receiver position is known, ephemeris data is available, and altitude as a function of latitude and longitude is known (for example, from a map database). The information of the receiver position (latitude, longitude, and altitude) and the ephemeris data may be automatically or manually obtained from the Internet, by connecting the receiver to the Internet via wireless or wired network, or other communication links. The position information may also be obtained using the GPS receiver itself. For example, if the receiver is in a house or building ("indoor") and thus is receiving a very weak GPS signal, the receiver may be moved outside or to a nearby location with good signal reception (within an acceptable position accuracy, for example, 100 meters) so as to record the current receiver position. As long as the receiver remains within a range of acceptable position accuracy, the transfer time detection and the time ambiguity resolution can be performed in the same manner.

The method of the time ambiguity resolution is similar to the method of obtaining time from 5 or more satellites when the receiver position is not initially known and the signals are too weak to recover navigation data, as described in Magellan Systems Japan, Inc. patent application Ser. No. 11/103,499, filed in the United States Patent and Trademark Office by Applicant on Apr. 12, 2005, now U.S. Pat. No. 7,362,265, issued Apr. 22, 2008. The method is based on the fact that with a known receiver position, the modulo-20 millisecond difference in transmission times of the two simultaneously observed signals is a known function of approximate time. Approximate time can be calculated by evaluating the inverse of this known function at the measured modulo-20 millisecond difference in transmission times. Expected accuracies will generally be within several seconds.

2. Correction for Propagation Delay

Although the above Examples 1 or 2, followed by time ambiguity resolution, can determine the unambiguous GPS transmission time of any point on the observed received signal with sub-microsecond accuracy, time at the receiver is the sum of the transmission time and the propagation time from the satellite to the receiver. The propagation time is easily calculated, since the position of the satellite at the transmission time is accurately known, and also the receiver position is assumed to be known. This enables the calculation of the satellite-to-receiver distance, which when divided by the speed of light, gives the signal propagation time. The accuracy in establishing local time depends on how accurately the position of the receiver is known (see next section).

Methods of Initially Establishing the Initial Receiver Position

The accuracy of the time transfer will depend on how accurately the position of the receiver is known. For sub-microsecond accuracy, the position uncertainty is preferably less than approximately 100 meters. For ±10 microsecond accuracy, a position uncertainty less than approximately 1000 meters is acceptable.

The receiver's fixed position can be obtained in various ways. One method is to use assisted indoor positioning technology such as that recently developed by Magellan Systems Japan, Inc., with a typical positioning accuracy of less than 100 meters, as mentioned above. Another method is to locate the receiver coordinates on a map provided by internet services such as Google Earth. If this method is used, the receiver coordinates must somehow be entered into the GPS receiver. Yet another method is the use of positioning technology for cellular telephones if its positioning accuracy is sufficient.

A fourth method of establishing the receiver's position with as few as 2 satellites can be used if enough time is available (perhaps an hour or more) and altitude as a function of latitude and longitude is available, in accordance with one embodiment of the present invention. For example, due to buildings or other structures, only 2 satellite signals may be available. FIG. 8 schematically illustrates the method for obtaining the receiver's position from two GPS signals, in accordance with one embodiment of the present invention. The steps of this method, assuming that 2 satellites are being tracked, are as follows:

1. Observing the two GPS signals from the two satellites 122 (A) and 124 (B) simultaneously, which defines a point on each signal structure, and obtain the two GPS transmission times $T_{A1}$ and $T_{B1}$ of the respective points using a technique such as Example 1 or Example 2 described above, including resolution of time ambiguity.
2. Using the two GPS transmission times $T_{A1}$ and $T_{B1}$ and the ephemeris data to accurately locate the positions $P_{A1}$ and $P_{B1}$ of the two satellites.
3. Computing the difference in the two transmission times ($\Delta_1 = T_{A1} - T_{M}$). This difference $\Delta_1$, together with the knowledge of altitude as a function of latitude and longitude, defines a line of position (LOP) $P_{C1}(\Delta_1)$ on the surface of the earth along which this time difference would be observed.
4. After a sufficiently long time (perhaps an hour or more), repeating steps 1 through 3 (the same two satellites at different positions $P_{A2}$ and $P_{B2}$ or a different pair of satellites may be used). The result is a second LOP $P_{C2}(\Delta_2)$ on the surface of the earth, where $\Delta_2 = T_{A2} - T_{B2}$, $T_{A2}$ and $T_{B2}$ are the two GPS transmission times of the two satellites in a different geometry after a certain time period, or of a different pair of two satellites that gives a different geometry. The second pair may include one satellite from the first pair.
5. Obtaining the receiver position at the intersection $P_C$ of the two LOP's.

The accuracy of this method depends on the satellite-receiver geometry. Dilution of Precision (DOP) calculations can be used to assess the positioning accuracy. Time for signal acquisition can be reduced by using low frequency atomically-controlled radio signals such as the 60 kHz signal from WWVB in Fort Collins, Colo., to accurately calibrate the TCXO reference oscillator in the receiver.

Total Loss of GPS Signals

If all GPS signals are lost, maintenance of local time accuracy will depend on the stability of the receiver's reference oscillator (usually a low-cost TCXO), unless an external source of timing information is available. During normal operation, the long term TCXO frequency drift can be very precisely calibrated, even using just one satellite, because the receiver knows time very accurately. The length of time the TCXO can "free-wheel" until a 1-microsecond time error develops is equal to the reciprocal of the calibration accuracy in parts per million (ppm). For example, if the TCXO has been calibrated to within 0.01 ppm, it can run autonomously for about 1/0.01=100 seconds before developing a ±1-microsecond error.

Another strategy for handling total signal losses is to use low-frequency atomically-controlled radio signals if they are available. For example, the 60 kHz signal from WWVB in Fort Collins, Colorado is transmitted with a stability of 1 part in $10^{12}$. A clock phase-locked to this received signal probably can maintain sub-microsecond time indefinitely once the clock has been set during normal operation when GPS signals are available. However, performance depends on the stability of the WWVB signal propagation paths.

The extreme sensitivity of the tracking methods described above, especially when the FLL error signal is derived as in Example 2, might well make total GPS signal dropouts quite rare in most applications.

Satellite-to-Satellite Handovers

Because the GPS satellites rise and set, the receiver must be able to seamlessly transfer its tracking from one satellite to another. This should not be a problem, because in normal operation even with only one satellite, the TXCO frequency is calibrated quite accurately, time is known at the sub-microsecond level, and the distance to any satellite can be accurately computed. This should permit acquiring a new satellite with essentially no searching in either frequency or code phase.

Figure 10:
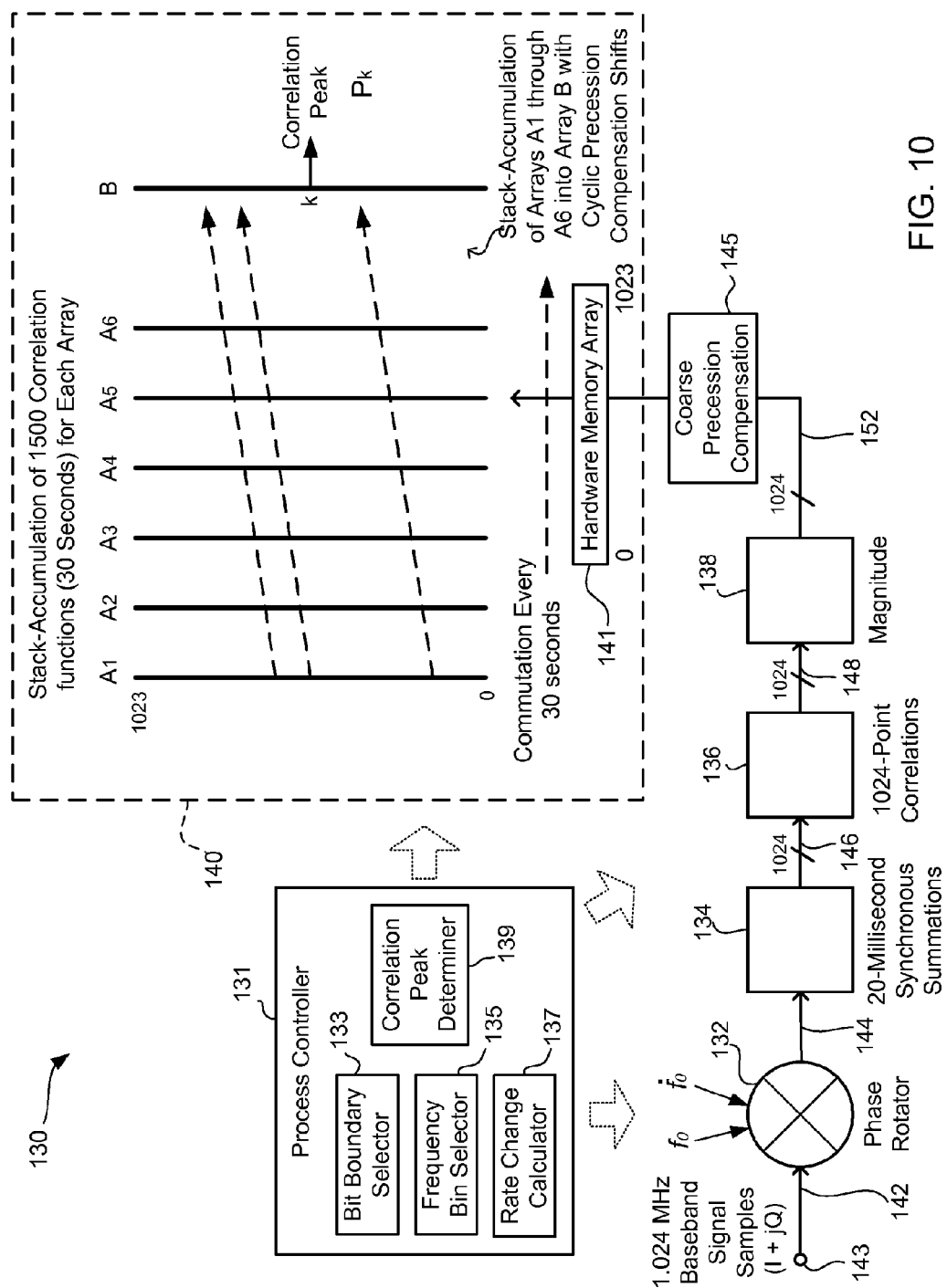
FIG. 10 is a block diagram schematically illustrating a method and corresponding circuitry for high-sensitivity GPS/

Embodiment 2: Process for High-Sensitivity Acquisition of Satellites Using Approximate Knowledge of Receiver Position FIG. 10 schematically illustrates a method and corresponding circuitry for high-sensitivity GPS signal acquisition in a GPS receiver in accordance with one embodiment of the present invention. As shown in FIG. 10, the GPS signal acquisition section 130 of the GPS receiver includes a phase rotator 132 for Doppler compensation, a 20-millisecond synchronous summer (adder) 134, a 1024-point correlator 136, a magnitude calculator 138, and a stack-accumulator 140. The signal acquisition section 130 may be realized as a combination of hardware and software. For example, the signal enters a hardware processor, such as a field-programmable gate array (FPGA) or an application-specific integrated circuit (ASIC), where partial processing of the signal takes place at high speed. The partially-processed signal is then sent to software for final processing at lower speed. As shown in FIG. 10, a process controller 131 includes, a bit boundary selector 133, a frequency bin selector 135, a rate change calculator 137, a correlation peak determiner 139, and other necessary control modules to control operations of the phase rotator 132, the 20-millisecond synchronous summer 134, the 1024-point correlator 136, the magnitude calculator 138, and the stack-accumulator 140, and also provide necessary calculations, as described below.

For concreteness, specific parameter values (such as sampling rates, FFT size, number of signal data bits processed, how many bits are used to represent various numbers, etc.) are used in the following description of the signal processing for illustrative purposes. However, the specific parameter values and numbers are not limiting, and it will be apparent to those of ordinary skill in the art that other parameter values can be used, depending on desired performance and cost factors.

The raw GPS signal to be processed is nominally at baseband, and consists of a continuous sequence of complex-valued digital samples (complex baseband signal 142) arriving from a GPS receiver front end (not shown) at the rate of 1.024 MHz. The complex baseband signal 142 may be received at an input terminal 143 of the signal acquisition section 130, as shown at the left of FIG. 10. Each sample consists of a 2-bit in-phase (I) component (real part) and a 2-bit quadrature (Q) component (imaginary part) of the signal. Filtering in the RF front end has restricted the complex baseband signal 142 to lie between −0.5 MHz and +0.5 MHz (narrowband). Although this is only about one-half of the full null-to-null bandwidth of the GPS C/A-coded signal, it reduces hardware cost and processing time by reducing the required sampling rate to 1.024 MHz without significant spectral aliasing, and produces a post-correlation signal-to-noise (SNR) loss of only about 0.7 dB compared to using the full null-to-null bandwidth of the signal.

It should be noted that the GPS signal 142 contains signals from multiple satellites. However, the phase rotator 132 compensates the Doppler shift for the signal from a specific satellite of interest, and the 1024-point correlator 136 uses a C/A-PN code for the specific satellite as a reference C/A-PN code for acquisition. Thus, the signal from the specific satellite is separated from those from other satellites which have different Doppler shifts and different C/A-PN codes. In this embodiment, it is assumed that the GPS receiver is stationary (not moving), and thus an estimated Doppler shift for a specific satellite (due to the satellite motion) is readily calculated from an approximate position of the GPS receiver (within a few to tens of kilometers, for example) and approximate time (within a few seconds, for example) based on the ephemeris data available from an external source, for example, the Internet or Asymmetric Subscriber Data Link (ASDL). The change in the Doppler frequency (typically less than 1 Hz per second and almost constant over the time for signal acquisition) is also predicted with a high accuracy from the approximate location, approximate time, and the ephemeris data.

FIG. 11 schematically illustrates a process flow of a method for high-sensitivity GPS/GNSS signal acquisition in accordance with this embodiment of the present invention. Although the GPS signal is nominally at baseband, it has an apparent Doppler shift due to satellite motion and frequency error of the receiver's TCXO. Therefore, a search in frequency and received C/A-PN code phase is required. To search in frequency, the span of Doppler uncertainty (a range of frequency centered on the estimated Doppler shift in the light of TCXO frequency error) is divided (partitioned) into contiguous Doppler bins of width 50 Hz (200), although other widths can be used. Each Doppler bin may be identified using its center frequency $f_0$. In the following description, C/A-PN code may also be referred to as C/A code or PN code.

The search for the GPS signal uses a sequence of received signal segments. Each segment of the received signal may last anywhere from a fraction of a second to as long as several minutes, depending on the desired tradeoff between acquisition sensitivity and how much signal duration is needed to achieve that sensitivity.

Since the navigation data bit boundaries are initially not known, the initial uncertainty of the positions of the navigation data bit boundaries may span an entire bit, i.e., 20 milliseconds of the received GPS signal. Thus, trial bit boundary locations are obtained by partitioning the uncertainty (i.e., 20 milliseconds of the complex baseband signal 142) into equally spaced locations that span a continuous 20-millisecond segment (202). Each trial bit boundary location corresponds to a start time of capturing the signal segment. The trial bit boundary location may be specified as (or defined by) a modulo-20 millisecond location. Three or four trial boundary values is usually sufficient. In the following description, each signal segment is used to search for a GPS signal of a specific (first) satellite within a specific 50 Hz wide Doppler bin and a specific trial data bit boundary location (start time).

The processing for a single Doppler bin/bit boundary combination is shown in FIG. 10. That is, the entire process in FIG. 10 is repeated for different bit boundary locations for each of the Doppler bins, such that eventually all of the Doppler bin/bit boundary combinations are searched. Depending on the frequency range that must be searched, the entire process may take from a few minutes to one hour or more. A modification is described later which uses parallel processing to allow multiple Doppler bins to be spanned with a single signal segment.

The first processing step is to select the Doppler bin center frequency $f_p$ to be searched (204). Also, a trial bit boundary is selected (206). The trial bit boundary location corresponds to a specific start time $t_0$. At the specified time $t_0$ on the receiver's clock, the capture of the received signal segment begins (208). Purely for convenience, it is assumed that the start time $t_0=0$, and that time $t$ is measured from this point. The sequence of complex baseband samples 142 from the RF front end are passed through the phase rotator 132 which multiplies the samples by the function $$\exp[-j\phi(t)] = \exp\left[-j\left(f_0 t + \frac{1}{2}\dot{f}_0 t^2\right)\right] \quad (1)$$

where $j=\sqrt{-1}$.

Since the receiver is assumed to be stationary, $\dot{f}_0$ represents a constant rate of change in frequency due to satellite motion which can be calculated (210) with sufficient accuracy using the available satellite ephemeris data, receiver clock time at the initiation of tracking (within ±1 second of GPS time), and approximate receiver position to within about 25 kilometers of true position. It is assumed that the ephemeris data has been made available from an outside source, such as the internet or an ADSL. In reality, $\dot{f}_0$ varies very slowly with both time and receiver position. However, the worst-case variation is so small that it can be assumed to have a constant value during capture of the received signal segment.

The baseband signal 142 (a continuous sequence of complex-valued digital signal samples) is received (210) from the RF receiver front end and input to the phase rotator 132 so as to compensate apparent Doppler shift (212). The complex multiplication by the phase rotator 132 mentioned above (in accordance with Equation (1)) removes essentially all of the frequency changes within the received signal segment 142 that are due to satellite motion, and brings the signal to within ±25 Hz of zero frequency, if the captured baseband carrier is within ±25 Hz of the center frequency $f_0$ of the Doppler bin, where the baseband GPS signal is expressed as $$c(t)\exp[j\phi(t)] = c(t)\exp\left[-j\left(f_0 t + \frac{1}{2}\dot{f}_0 t^2\right)\right] \quad (2)$$

In this expression, c(t) represents the C/A code and navigation data modulation on the signal. For the moment, apparent Doppler frequency variation due to TCXO temperature changes is being ignored. Methods of reducing degradation from this source will be described later.

After passing through the compensating phase rotator 132, the signal samples 144 are input to the 20-millisecond synchronous summer 134 so as to generate compressed sample blocks 146 (214). In the synchronous summation process, the signal samples 144 are partitioned into successive 20-millisecond long blocks of 20,480 samples each. This 20-millisecond partition is based on the selected trial bit boundary location. The samples within each 20-millisecond signal block are synchronously summed on-the-fly (i.e., as real time processing) as they arrive to produce a corresponding compressed block having 1024 samples. A new compressed 1024-sample block 146 is produced every 20 milliseconds. To define the synchronous summation process, let $x_0, x_1, \ldots x_{20478}, x_{20479}$ denote the complex samples within a particular signal block of 20,480 samples, and let $y_0, y_1, \ldots y_{1022}, y_{1023}$ denote the complex samples within the resulting compressed 1024-sample block after synchronous summation. In the synchronous summation process, the compressed 1024 sample block is expressed as:

$$y_0 = x_0 + x_{1024} + x_{2048} + \ldots + x_{18432} + x_{19456} \quad (3)$$

$$y_1 = x_1 + x_{1025} + x_{2049} + \ldots + x_{18433} + x_{19457}$$

$$\vdots$$

$$y_{1022} = x_{1022} + x_{2046} + x_{3070} + \ldots + x_{19454} + x_{20478}$$

$$y_{1023} = x_{1023} + x_{2047} + x_{3071} + \ldots + x_{19455} + x_{20479}$$

FIG. 12 schematically and conceptually illustrates an example of the synchronous summation for 20 milliseconds which contains the entire data bit (i.e., in the ideal case where the trial bit boundary location is perfectly aligned with the actual data bit boundary) without noise. It should be noted that the actual code signal may be burred in noise and may not be seen. As shown in FIG. 12, 20 samples (x) in the corresponding sample location (i.e., one of the sampling points 0 through 1023) of each 1 millisecond period (one code period) are summed into a value y. It should also be noted that each code period of 1 millisecond having 1023 chips is sampled at 1024 MHz, i.e., 1024 sampling points per code period, producing almost one sample per chip. The 20 values of the received code at corresponding sampling points are added up to produce a value 20 times larger, while the standard deviation of the random noise increases by only the square root of 20. In this manner, the synchronous summation process produces a processing gain of up to 10 log 20=13 dB, depending on the amount of residual Doppler shift and the degree of misalignment of the data bit boundaries. Misalignment of the data bit boundaries may cause polarity change in the code within the 20 milliseconds of synchronous summation, which reduces the processing gain.

Referring back to FIGS. 10 and 11, the compressed sample block (1024 samples) 146 is input to the 1024-point correlator 136 so as to generate a 1024-point correlation function 148 (216). FIG. 13 schematically and conceptually illustrates the 1024-point correlation operation in the 1024-point correlator 136. As shown in FIG. 13, a 1024-point FFT is performed on each compressed 1024-sample block as soon as it is produced by the synchronous summation process. Using 1024 samples has an advantage, since a FFT is fastest if the number of samples is a power of 2. At the completion of a 1024-point FFT, its 1024 complex outputs are pointwise multiplied by the corresponding outputs of the conjugate of a 1024-point FFT of a single period of reference C/A-PN code, the same code as that of the searched-for satellite. Since the 1024 conjugated outputs of the latter FFT never change during the search process, they may be computed and stored previous to the initiation of the search. The result of the pointwise multiplications is a block of 1024 complex numbers. A 1024-point correlation function is then computed by taking the inverse FFT (IFFT) of this block. Each 1024-point correlation function has a peak at the position corresponding to the delay of the received code, as shown in FIG. 13.

The magnitude of the correlation function 148 is computed (218) at the magnitude calculator 138, as shown in FIGS. 10 and 11, resulting in a block of 1024 real positive numbers 152 representing the magnitude of a correlation function.

All operations in the 1024-point correlator 136 and the magnitude calculator 138 (i.e., the FFT of the compressed 1024-sample block, the 1024 pointwise multiplications by the conjugated outputs of the reference FFT, the final IFFT and computation of its 1024 magnitude values) must take place in less than 20 milliseconds so that the same sequence of operations may be repeated on the next compressed 1024-sample block when it becomes available, if the signal acquisition process should be performed in real time (without using a memory). It is likely that the FFT would be implemented with integer arithmetic in hardware to achieve the needed computational speed. A rough analysis of the FFT computational requirements will be given later. Alternatively, a software FFT could be used if a microprocessor with sufficient speed is available.

A new 1024-point correlation magnitude function 152 is generated every 20 milliseconds. As each correlation magnitude function 152 is generated, it is synchronously stack-accumulated (220) by the stack-accumulator 140, in a 1024-point array of positive real numbers, denoted by $A_1$, to build up noncoherent processing gain for N×20-millisecond periods. FIG. 14A shows such a stack-accumulation for N=1500. After N×20-millisecond periods of signal have been processed, the stack accumulation shifts to a new 1024-point array, denoted by $A_2$, into which the next N correlation magnitude functions are stack-accumulated. A next 1024-point array $A_3$ contains the stack accumulation of the following N correlation magnitude functions, and so on, until M 1024-point arrays $A_1, A_2, \ldots, A_M$ have been formed. FIG. 14B schematically illustrates an example of the resulting M 1024-point arrays $A_1, A_2, \ldots, A_M$, without precession as described below. It should be noted that, as shown in FIG. 10, the stack-accumulator 140 may include a hardware array (memory) 141 for accumulating and holding 1024 positive numbers 152 of the correlation magnitude function for N×20-milliseconds, and then sequentially sending them to software memory arrays $A_1, A_2, \ldots, A_M$ in the stack-accumulator 140. Each time after the completed array is sent to the software memory, the hardware array 141 may be reset to zero. FIG. 10 illustrates an example where M is 6 and N is 1500.

As each 1024-point correlation magnitude function 152 is generated, it must by cyclically shifted to substantially compensate for precession caused by Doppler shift on the signal before it is added to the hardware array (memory) 141 in the process of forming array $A_k$. This is accomplished by the coarse precession compensation 145 (219). The amount of compensating cyclic shift in signal samples is the closest integer to $$\frac{f_0}{1540}t$$

where $f_0$ is the center frequency in Hertz of the Doppler bin being searched, and t is the time in seconds from the beginning of the 3-minute signal segment used in the search of the current Doppler frequency bin. This formula is based on the fact that the sample spacing at the 1.024 MHz sample rate is very close to the duration of one C/A code chip. The formula indicates that for positive (i.e., closing) Doppler, where $f_p$ is positive, the neutralizing cyclical shift must also be positive, which means that the majority of the 1024 samples (i.e., values) in each correlation magnitude function 152 are shifted to sample positions which are later in time, with samples sufficiently near the end of the correlation magnitude function "wrapping around" to the beginning of the function.

Assuming that frequency drift of the TCXO is sufficiently small (less than about 0.2 Hz/sec when multiplied up to the received carrier frequency), the maximum permissible value for N is determined by the maximum magnitude of residual apparent Doppler shift for the Doppler bin being searched, which is 25 Hz. The residual Doppler not only causes some loss of SNR during synchronous summation, but it also causes a residual time precession of the signal PN code, which induces a cyclic precession of the correlation magnitude functions across their 1024-point domains. During the stack-accumulation of N correlation magnitude functions into a 1024-point array $A_k$, this cyclic precession can cause unacceptable loss of noncoherent processing gain if N is too large. Since the maximum residual Doppler magnitude is within the Doppler bin is 25 Hz and there are 1540 carrier cycles per GPS C/A code chip, the maximum residual precession rate in either direction is $$\frac{25}{1540} \cong 0.0162 \text{ chips/sec,}$$

or about 0.5 chips every 30 seconds. Every 30 seconds, 1500 correlation magnitude functions are produced. If each array $A_k$ contains the result of stack-accumulating 1500 correlation magnitude functions, the maximum total precession during the creation of the array is about 0.5 C/A code chips, or about 0.5 microsecond. This is quite acceptable, since the width the of a correlation magnitude function peak is more than 2 microseconds and the function sample values have a spacing of approximately 1 microsecond. Thus, it is acceptable for N to be as large as 1500.

Once N has been selected, the number M of arrays $A_k$ generated depends on the length of the signal segment used for processing. For purposes of illustration, we will use a 3-minute long signal segment to achieve high acquisition sensitivity. Assuming N=1500, each 1024-point array $A_k$ takes 1500×0.02=30 seconds to generate, so there will be a total of 6 arrays needed to cover the 3-minute period, as shown in FIG. 10.

Since the rate of production of the arrays $A_k$ is one array every 30 seconds, the arrays $A_k$ can easily be sent to software for further processing as they are generated. Assuming 2 bytes per number in an array, the average transfer data rate of the arrays is only 1024×2/30≅68.3 bytes/sec.

Additional noncoherent processing gain is now performed by stack-accumulating the 6 arrays $A_k$ in software into an array B in computer memory as shown in FIG. 10. However, using the maximum of 0.5 chips of precession every 30 seconds as computed above, the maximum total precession across the six arrays $A_k$, starting at the initiation of array $A_1$ construction and ending at the initiation of array $A_6$ construction, would be 0.5×(6−1)=2.5 chips in either direction, for example, as shown in FIG. 14C. Some form of further compensation is definitely necessary to prevent loss of the additional noncoherent processing gain. Thus, the 6 arrays are stack-accumulated into the array B with additional precession compensation (222).

FIG. 15 schematically illustrates how the additional precession compensation is provided by performing circular shifts on arrays $A_1$ through $A_6$. The 6 arrays are represented by vertical lines, each containing 1024 positive real numbers. The dashed lines indicate the amount (exaggerated for clarity) and direction of the circular shifts applied to element number 512 of each array for 7 different total precession compensation values of −2.5−1.67, −0.83, 0, 0.83, 1.67, and 2.5 chips, it being understood that all elements of an array are circularly shifted by the same amount. These 7 values span the maximum range of residual precession due to residual Doppler, and are spaced closely enough to prevent excessive losses due to quantization of the compensation values. For simplicity, FIG. 15 only shows the actual shift numerical values to compensate for the maximum total precession of −2.5 chips due to a closing residual Doppler of 25 Hz. These shift numerical values are the closest integer values to the desired compensation in chips, keeping in mind that the spacing of the samples in the arrays is almost exactly 1 chip.

For each of the 7 precession compensation values, the arrays $A_1$ through $A_6$ are circularly shifted as determined by the precession compensation value selected, the 1024-point array B is initialized to zero, the 6 arrays are stack-accumulated into the array B, and the maximum value in the array B and its sample number index (0-1023) are stored. The largest of the 7 maximum values thus obtained and its index is denoted by $P_k$, where k is one of the integers from 0 to 1023 (224), as shown in FIGS. 10 and 11.

In a full search, as shown in FIG. 11, all of the processing described above needs to be repeated for the different 50-Hz frequency bins (228) searched in combination with several modulo-20 millisecond trial data bit boundary locations (usually 4 equally spaced trial locations is sufficient) (226). For each combination of Doppler bin (with center frequency $f_{On}$) and trial bit boundary location ($T_{Om}$), a value of $P_k$ results, where the index k may be different for different combinations of $f_{On}$ and $T_{Om}$. The largest of all of the values $P_k$ for the full search, its associated index k, and the associated frequency bin are found (230). Let the integer p be an index which identifies this frequency bin ($f_{Op}$). The index k gives an estimate of the received code phase at the middle of summing process used to form array $A_6$ when processing frequency bin p. The apparent Doppler of the signal at that same time is within ±25 Hz of the center frequency $f_{Op}$ of frequency bin p.

It can be seen that processing one frequency bin at a time can result in a very long time to accomplish a full acquisition search, especially considering that the search is not only in Doppler, but also in navigation data bit alignment. As an illustration, consider that a typical ±1 ppm error in the receiver's TCXO frequency corresponds to an apparent Doppler error of about ±1575 Hz, requiring 63 50-Hz frequency bins to be processed if they are all searched. Assuming the parameters used above and 4 trial data bit alignment values per frequency bin, each frequency bin would take 4×3=12 minutes to process, for a worst-case total time of 12×63=756 minutes, or about 12.6 hours, just for one satellite. However, it only takes a moderate amount of hardware to greatly reduce the processing time by using parallel processing, as will be described next.

Acquisition Using Parallel Processing

It would be very advantageous to process P frequency bins at the same time, using parallelism of the following pieces of hardware, assuming a 65.536 MHz hardware clock:

Phase Rotators

Each frequency bin requires a different rate of phase rotation. A phase rotator (such as the phase rotator 132) complex-multiplies the 2-bit I and 2-bit Q signal samples by a rotating complex phasor of fixed magnitude. The real (I) and imaginary (Q) components of the phasor do not require very many bits (perhaps 3 bits each), and 8 discrete angles of the phasor produce little loss in the phase rotation. Furthermore, the 8 complex values of the phasor never change and can easily be stored in ROM. Since the sample rate of the incoming signal is only 1.024 MHz, only one complex multiplication is required for every 65 clock cycles. Thus, one phase rotator can be time-shared to service perhaps 5 Doppler frequency bins, for example. Additionally, the amount of hardware for one phase rotator is not very large, since the arithmetic has very few bits. Thus, additional paralleling of this hardware (for example, 10 rotators) could cover up to perhaps 50 Doppler frequency bins.

Synchronous Summing

For one frequency bin, the synchronous summation process is quite simple, requiring a 1024-point array whose address index is incremented and a complex number summed into that indexed address at a 1.024 MHz rate. The address incrementing is common to all frequency bins, and because the summer operates at only 1.024 MHz, it could easily be time-shared. Thus, one synchronous summer (such as the 20-millisecond synchronous summer 134) may be time-shared to service perhaps 5 Doppler frequency bins, for example. Additionally, because a synchronous summer doesn't take a large amount of hardware, a reasonable number of synchronous summers (for example, 10), could operate in parallel to service perhaps 50 Doppler frequency bins.

Correlation Using an FFT and IFFT

A 1024-point FFT or IFFT in a 1024-point correlator (such as the 1024-point correlator 136) is normally computed in 10 stages, each stage consisting of 1024/2=512 "butterfly" operations, here assumed to include some overhead to place the result of each butterfly in memory, as is well understood by those of ordinary skill in the art. Assume that the butterflies are performed sequentially by the same hardware (i.e., the FFT is not pipelined to save hardware) and that a butterfly takes 10 hardware clock cycles, the complete FFT takes 10×512×10=51,200 clock cycles. For an FFT followed by 1024 pointwise complex multiplications (assume 10 clock cycles each), followed by an IFFT, the required number of clock cycles would be 51,200+10,240+51,200=112,640. Assuming a 65.536 MHz hardware clock, the number of correlation functions per second would be $(65.536 \times 10^6)/112,600 \cong 582$ per second, or more than 11 every 20 milliseconds. Thus, one piece of FFT hardware (which also does the IFFT) would be able to process 11 Doppler frequency bins spanning 11×50=550 Hz within one captured signal segment.

The speed of the correlation function computation could be further approximately multiplied by the factor M by paralleling the butterfly operations and the pointwise complex multiplications by a factor of P. For M=3, 3×11=33 Doppler bins could be processed within one captured signal segment, enough to span more than 1650 Hz of apparent Doppler uncertainty within one 3-minute captured signal segment.

Stack-Accumulated Arrays

Since each of the stack-accumulated arrays $A_1$–$A_6$ previously described for processing one Doppler frequency bin are sequentially sent to software as soon as each is generated, only one hardware array (such as the hardware memory array 141) per Doppler frequency bin is required for simultaneously processing P Doppler frequency bins. For P=33, 33 hardware arrays would be needed, each containing 1024 positive numbers. At 2 bytes per number, the total required hardware memory would by 33×1024×2≅68 kilobytes, a reasonable amount. Of course, the software memory would then need to be 6 times larger, or about 406 kilobytes. This is probably reducible by a factor of 2 by using bit recoding.

For P=33 frequency bins processed per 3-minute signal segment, the worst-case processing time for a complete search could be reduced to about (756 minutes)/33=22.9 minutes for the first satellite. Acquisition of additional satellites would take far less time, because after the frequency bin is identified in which the first satellite is found and compared with the Doppler shift computed from approximate time (within a few seconds), approximate receiver position (within 25 kilometers, for example), and ephemeris data, the TCXO frequency can be calibrated to within roughly 50 Hz. Subsequent satellite searches can then be accomplished using at most a few frequency bins. In fact, the hardware time-sharing and parallelism previously discussed could permit parallel searching for multiple satellites using the same 3-minute signal segment.

It should be noted that the above-mentioned parallel processing may be fully or partially implemented in respective processing stages in accordance with application, such as required processing peed, accuracy, restriction on the hardware, cost, and the like. The parallel processing is also applied in other embodiments as well, although it may not be explained in detail. FIG. 16A schematically illustrates a signal processing section 150 for processing a plurality of Doppler frequency bins in parallel, in accordance with one embodiment of the present invention. In this example, each of the phase rotators 132 and each of the synchronous summers 134 services 5 Doppler frequency bins by time-sharing, as described above. Each of the cross-correlators 136 and the corresponding magnitude calculator 138 services 10 Doppler frequency bins, i.e., it processes outputs from two of the synchronous summers 134. The accumulator arrays (hardware memory arrays) 141 are provided one for each Doppler frequency bin, but the software accumulator (software memory) may handle all of the stack-accumulated arrays sent from each of the accumulator arrays 141, as shown in FIG. 16A.

A Search Method for Dealing With TCXO Drift

Up until now it has been assumed that the TCXO has very little frequency drift (perhaps less than 10 Hz while receiving a 3-minute signal segment). This assumption is probably valid if the receiver uses a more expensive oven-controlled crystal oscillator (OCXO), but it is unrealistic for a low-cost TCXO designed for consumer applications when the ambient temperature is changing, even at slow rates on the order of 1° C. per minute.

FIG. 16B schematically illustrates a method for searching in frequency, which accommodates TCXO frequency drift, in accordance with one embodiment of the present invention. It is assumed that P contiguous Doppler frequency bins are simultaneously being processed as previously described, which allows the received signal to migrate across P Doppler frequency bins as the 3-minute signal segment is being collected. Let n be an integer index which identifies the 50-Hz wide Doppler frequency bins. With 6 stack-accumulated arrays spanning a total of 3 minutes of signal for each frequency bin, the total number of arrays stored in software memory is 6P. These arrays are denoted by $A_k^n$, where k runs from 1 to 6 (or more generally, M), and the frequency bin index n runs from 1 to P.

In FIG. 16B, the horizontal dotted lines are the boundaries of the contiguous Doppler frequency bins, and the 6 vertical lines respectively indicate the midpoints in time of the stack-accumulating processes (30 seconds each) that created arrays with subscripts 1 through 6.

Once the arrays $A_k^n$ have been completed and stored in software memory, the software searches over different combinations of apparent initial Doppler shift and linear Doppler frequency rate of change. Each of these combinations is a linear frequency-vs-time search trajectory f(t), one of which is represented in FIG. 16B by the solid line with positive slope (some trajectories will have negative slope). Mathematically, the search frequency as a function of time is expressed as:

$$f(t) = a + bt \quad (4)$$

where a is the frequency 15 seconds into the 3-minute signal segment, and b is the rate of change of frequency.

Observing the search frequency trajectory in FIG. 16B, at the time 15 seconds into the 3-minute signal segment when the stack accumulation process for all arrays with subscript 1 is halfway complete (i.e., at a point "a" on the frequency axis at 15 seconds), the search frequency f(t) is within Doppler frequency bin n. At 45 seconds, when the construction of arrays with subscript 2 is halfway complete, the search frequency f(t) is still within the same Doppler frequency bin n. However, at 75 seconds, when the construction of arrays with subscript 3 is halfway complete, the search frequency f(t) has moved into Doppler frequency bin n+1. The Doppler frequency bins occupied by the signal of the search frequency f(t) at the time points 15, 45, 75, 105, 135, and 165 seconds have respective indices n, n, n+1, n+1, n+2, and n+2.

The final processing for the given search frequency trajectory f(t) is the stack-accumulation of 6 arrays along the search frequency trajectory f(t). However, the search frequency trajectory f(t) shown in FIG. 16B is associated not with a single Doppler frequency bin as in previous discussion, but instead with 3 different Doppler frequency bins across the 6 arrays. Thus, the 6 arrays that are stack-accumulated for the search trajectory f(t) shown in FIG. 16B are $A_1^n, A_2^n, A_3^{n+1}, W_4^{n+1}, A_5^{n+2}$, and $A_6^{n+2}$. The result of their stack-accumulation is an array B of 1024 positive numbers indexed from 0 to 1023 representing a correlation function associated with the search trajectory f(t). Of interest is the peak value of the 1024 values in the array B, similarly to the correlation peak $P_k$ shown in FIG. 10.

While searching sequentially over all trajectories, the index (0-1023) of the largest peak value in an array encountered thus far and the parameters a and b of the associated search frequency trajectory f(t) are retained. After all trajectories have been searched (i.e., for different chosen search values of the parameters a and b), the index that remains is taken as the location of the correlation function peak at the receiver clock time of the midpoint of the creation of the arrays (i.e., 165 seconds into the 3-minute signal segment). Additionally, the retained parameters a and b are used to form an estimate of the frequency trajectory of the signal, with a being the estimated frequency at 15 seconds into the 3-minute captured signal segment, and b being the estimated rate of change of apparent Doppler frequency. Thus, the apparent Doppler shift at any time during the received signal segment can be estimated through use of the formula f(t)=a+bt, using the retained parameters a and b. This formula also allows the projection of the location of the correlation function peak to different points in time. Thus, the satellite signal is acquired both in frequency to within approximately ±½ frequency bin width and in code phase resolution to within approximately ½ of the correlation function resolution.

It should be noted that, at the completion of the search, a+165b is the estimated apparent Doppler frequency 165 seconds into the 3-minute signal segment, which has much less latency than the estimate a near the beginning of the segment.

When processing a given search frequency trajectory, the arrays used along the trajectory (for example, the arrays $A_1^n, A_2^n, A_3^{n+1}, A_4^{n+1}, A_5^{n+2}, A_6^{n+2}$ for the frequency search trajectory in FIG. 16B) must be cyclically shifted to compensate for time precession of the received signal, as shown by the dashed curve in FIG. 16B. For a specific array, the cyclic shift in array samples is the closest integer to $$g(t) = \frac{at + 0.5bt^2}{1540} \quad (5)$$

where t is the time when the stack-accumulation process in constructing the array is half completed. For example, for the array $A_3^{n+1}$ would be 75 seconds in expression (5). The cyclic shift is a quadratic function of time, as illustrated by the dashed curve in FIG. 16B.

Embodiment 3: Process for Both Acquisition and Tracking of A Weak GPS Signal, and Sub-Microsecond Time Transfer After Tracking Has Been Initiated FIG. 17 schematically illustrates a method and corresponding circuitry for high-sensitivity acquisition and tracking of weak GPS/GNSS signals in a GPS/GNSS receiver in accordance with one embodiment of the present invention. As shown in FIG. 17, the GPS/GNSS signal processing section 160 of the GPS receiver includes a phase rotator 162 for Doppler compensation, a 20-millisecond synchronous summer (adder) 164, a N-point correlator 166, a correlation matrix (correlator memory) 168, a pointwise multiplier 170, a fast Fourier Transformer (FFT) 172, a magnitude calculator 174, a maximum value determiner (correlation peak determiner) 176, and a memory 178 for holding the current maximum magnitude and associated parameters. In addition, similarly to the previous embodiment, a process controller 161 includes a bit boundary selector 163, a frequency bin selector 165, and a rate change calculator 167, and other necessary control modules (not shown) to control operations of the signal processing section 160.

The components shown in FIG. 17 can be implemented various mixtures of hardware and software. For example, the phase rotator 162, synchronous summer 164, and N-point correlator 166 could be implemented in hardware, such as a field-programmable gate array (FPGA) or an application-specific integrated circuit (ASIC) for high speed, while the remaining components could be implemented in software, typically at a lower speed. It will be apparent to those of ordinary skill in the art that other hardware and software mixtures can be used.

A major advantage of this embodiment is that a single structure is used for both acquiring and tracking multiple satellites. In a seamless operation, a plurality of satellites may be tracked while new satellites are being acquired. The embodiment employs a very high amount of coherent integration for highest sensitivity.

For concreteness, specific parameter values (such as, but not limited to, initial time uncertainty, clock and sampling rates, FFT size, number of signal data bits processed, how many bits are used to represent various numbers, etc.) are stated in the following description of the signal processing. However, it will be apparent to those of ordinary skill in the art that other parameter values can be used, depending on desired performance and cost factors.

When the GPS/GNSS receiver is first turned on, it is assumed that GPS time is known to within ±1 second, although larger or smaller uncertainties can be used.

The GPS signal from a satellite contains 50 bps BPSK (binary phase shift keying) navigation data organized into 5 frames, each 6 seconds long and containing 300 data bits, as shown in FIG. 4. The subframes are numbered 1-5 and are repeatedly transmitted by the satellite in the sequence 1, 2, 3, 4, 5, 1, 2, 3, 4, 5, etc. Regardless of receiver location, subframes with the same number arriving from different satellites are time-aligned to within about 12 milliseconds of each other due to differing signal propagation delays. For example, the reception of subframe k from one satellite is displaced by no more than about 12 milliseconds from the reception of subframe k from any other satellite.

Unlike the hardware in typical GPS receivers, the hardware of the present embodiment both acquires and tracks satellites by sequentially capturing blocks of GPS signal ("signal blocks"). For purposes of description, it is assumed that each signal block is known to be contained within a known 6-second long subframe of navigation data received from a specified satellite, although this assumption is not necessary. Also for purposes of description, it is assumed that each signal block of captured data is 2.56 seconds long, that is, each signal block has the length of 128 bits of 50 bps navigation data, although the locations of the bit boundaries are initially unknown. Each signal block may have a different length other than 2.56 second, or more generally, M bits long. Each signal block can be assigned to any satellite and for either acquisition or tracking. For example, Signal Block 1: From subframe #2, Satellite #5, Acquisition,
Signal Block 2: From subframe #3, Satellite #3, Acquisition,
Signal Block 3: From subframe #4, Satellite #5, Tracking,
Signal Block 4: From subframe #5, Satellite #1, Acquisition,
Signal Block 5: From subframe #1, Satellite #3, Tracking,
Signal Block 6: From subframe #2, Satellite #5, Tracking,
Etc.

Alternatively, each signal block of 2.56 seconds may be stored in a memory, and repeatedly used for acquisition and/or tracking of different satellites. In that case, the processes described below may not necessarily performed "on-the-fly." An advantage of this alternative is that it reduces the number of signal blocks that need to be processed. However, it requires additional memory to store the captured signal instead of processing the signal "on the fly."

It is possible to know that each block of received signal lies within a received subframe because corresponding subframes from all satellites are transmitted at almost exactly the same known GPS time, signal propagation time for each satellite is known to within about 12 milliseconds regardless of receiver location, and the time of signal capture using the GPS receiver's clock can be chosen to place the boundaries of the 2.56-second block at least 1 second away from the boundaries of the subframe to account for the worst-case ±1 second uncertainty in knowledge of GPS time.

The signal block (2.56 seconds, 128 bit long) that the GPS/GNSS receiver captures is also known to lie within a longer sequence of 50+128+50=228 known bits contained completely within the subframe. More generally, the signal block of M bits may be contained in a middle part of a longer known sequence of B bits. Since navigation data can be obtained from the Internet or an ADSL, and thus the bit sequence of the navigation data is known, the receiver may have previously stored this longer sequence of known bits contained in the navigation data. Since the location of the 228 bits within the subframe is known, the GPS transmission time of any bit in that sequence is also known, and its GPS reception time is no more than 86 milliseconds later due to propagation time. The receiver starts its 2.56-second capture interval at the time on its clock which would place the central point of the captured signal at the center of the 228 received bits if the receiver clock had no error. Since the clock error is within ±1 second of GPS time, the 128 bits the receiver captures is guaranteed to lie within the known 228-bit sequence, which has a 1-second (50 bit) pad around its central 128 bits.

The starting time according to the receiver's clock for capture of 128 bits of the signal is determined by first computing:

(GPS transmission time of the start of the $51^{st}$ bit of the 228-bit sequence in seconds)−1 second The raw GPS signal to be processed is at baseband, and consists of a continuous sequence of complex-valued digital samples (complex baseband signal 182) arriving from the RF front end of the GPS receiver (not shown) at the rate of 1.024 MHz. The complex baseband signal 182 may be received at an input terminal 181 of the signal processing section 160, as shown at the upper left of FIG. 17, similarly to the second embodiment. Each sample consists of a 2-bit in-phase (I) component (real part) and a 2-bit quadrature (Q) component (imaginary part) of the signal. Filtering in the RF front end has restricted the complex baseband signal 182 to lie between −0.5 MHz and +0.5 MHz (narrowband). Although this is only about one-half of the full null-to-null bandwidth of the GPS C/A-coded signal, it reduces hardware cost and processing time by reducing the required sampling rate to 1.024 MHz without significant spectral aliasing, and produces a post-correlation loss of only about 0.7 dB as compared to using the larger null-to-null bandwidth of the received signal.

Signal Processing for Acquisition

FIGS. 18A and 18B schematically illustrate a process flow of a method for high-sensitivity GPS/GNSS signal acquisition in accordance with this embodiment of the present invention. First, as described above, a known data bit sequence (data block having P successive data bits, for example, 228 bits) of the navigation data is selected from a subframe such that it contains a signal block (of 128 data bits, for example)

to be captured as its central part with pad portions in the both sides (300). Similarly to the second embodiment described above, in order to search for the satellite in the frequency dimension, the uncertainty of the apparent Doppler shift is partitioned into a number of contiguous 50-Hz wide Doppler frequency bins (302), the number of bins being sufficient to span the entire apparent Doppler uncertainty of the signal. It should be noted that the width of the frequency bins is not limited to 50 Hz, and other widths can be used.

In addition, similarly to the second embodiment, the uncertainty of the positions of the navigation data bit boundaries is partitioned into equally spaced trial bit boundary locations that span over a continuous 20-millisecond segment (304). Each trial bit boundary location corresponds to a start time of capturing the signal block. The trial bit boundary location may be specified as (or defined by) a modulo-20 millisecond location. Three or four trial boundary values are usually sufficient. In this example, four 2.56-second blocks of captured signal are processed for each Doppler frequency bin in order to find reasonably good alignment with data bit boundaries so that coherent processing performance is not unduly compromised. Alternatively, a certain period of the raw complex baseband signal 182 may be stored in a memory, and the same 2.56-second signal block may be repeatedly used for different Doppler frequency bin/bit boundary combinations.

Processing of One 2.56-Second Block of Signal

The processing of each 2.56-second signal block is similar for acquisition or tracking, but for concreteness, processing for acquisition of the first satellite after receiver turn-on will be described. The relatively small modifications for tracking, as well as subsequent acquisition or reacquisition of satellites, will be described later.

Assuming that the satellite to be acquired has been determined, a first frequency bin to be searched is selected (306), and a point in time $t_0$ (trial bit boundary) according to the receiver's clock is determined (308), where the capture of the 2.56-second signal block is to begin. The start time $t_0$, as well as the selected frequency bin, is recorded. As previously mentioned, the start time $t_0$ is chosen so that the signal block is completely within a known subframe received from the chosen satellite.

The sequence of complex baseband samples 182 from the RF front end is received (312) at the phase rotator 162, and passes continuously through the phase rotator 162 so as to compensate the apparent Doppler shift (314). The phase rotator 162 complex-multiplies the samples by the function $$\exp[-j\phi(t)] = \exp\left[-j\left(f_0 t + \frac{1}{2}\dot{f}_0 t^2\right)\right] \quad (6)$$

where $j=\sqrt{-1}$, and where t is a local time within the captured signal block equal to the receiver's clock time minus $t_0$ (i.e., t=0 at the beginning of signal capture), $f_0$ is the a-priori estimate of apparent signal Doppler shift, and $\dot{f}_0$ is a computed Doppler frequency rate of change (second derivative of phase) at t=0. The value of $f_0$ is the center of a Doppler bin that spans 50 Hz.

Since the receiver is assumed to be stationary, the quantity $\dot{f}_0$ represents a constant rate of change in frequency due to satellite motion, which is calculated (310) with sufficient accuracy using the available satellite ephemeris data, receiver clock time at the initiation of tracking (within ±1 second of GPS time), and approximate receiver position to within about 25 kilometers of true position. It is assumed that the ephemeris data has been made available from an outside source, such as the Internet or an ADSL. In reality $\ddot{\phi}_0 (=\dot{f}_0)$ varies very slowly with both time and receiver position. However, the worst-case variation is so small that it can be assumed to have a constant value during signal capture.

The inclusion of the quadratic phase term $-\frac{1}{2}\dot{f}_0 t^2$ in the phase rotator complex multiplication causes the signal 184 emerging from the phase rotator 162 to have a constant frequency, except for any frequency variation in the receiver's reference TCXO. It also brings the signal 184 to within ±25 Hz of zero frequency if the captured baseband carrier is within ±25 Hz of the center frequency $f_0$.

Ideally, the start time $t_0$ of signal capture should coincide with the beginning of a received 20-millisecond navigation data bit, that is, at the correct bit boundary. However, the timing of the received data bits is not initially known with such accuracy. Therefore, in acquiring the first satellite, several subsequent 2.56-second blocks of signal will need to be captured using staggered values of $t_0$, i.e., using different trial bit boundaries. This process will be explained in more detail later.

During the capture of the 2.56-second signal block, which has the same length as 128 bits of navigation data, the signal samples are partitioned on-the-fly into successive 20-millisecond long blocks of 20,480 samples each, each 20,480-sample block having the length of a navigation data bit. After passing through the compensating phase rotator 162, the signal samples 184 are input to the 20-millisecond synchronous summer 164. The samples within each 20,480-sample block are synchronously summed on-the-fly as they arrive to produce a corresponding compressed block of 1024 samples 186 (316). A new compressed 1024-sample block 186 is produced every 20 milliseconds, for a total of 128 compressed blocks corresponding to the 128 bits of captured signal. To define the synchronous summation process, let $x_0, x_1, \ldots X_{20478}, X_{20479}$ denote the complex samples within a particular block of 20,480 samples, and let $y_0, y_1, \ldots y_{1022}, y_{1023}$ denote the complex samples within the resulting compressed 1024-sample block 186 after synchronous summation. In the synchronous summation process, similarly to the second embodiment, the compressed 1024 sample blocks are expressed as:

$$y_0 = x_0 + x_{1024} + x_{2048} + \ldots + x_{18432} + x_{19456} \quad (7)$$
$$y_1 = x_1 + x_{1025} + x_{2049} + \ldots + x_{18433} + x_{19457}$$
$$\vdots$$
$$y_{1022} = x_{1022} + x_{2046} + x_{3070} + \ldots + x_{19454} + x_{20478}$$
$$y_{1023} = x_{1023} + x_{2047} + x_{3071} + \ldots + x_{19455} + x_{20479}$$

This process produces a processing gain of up to 10 log 20=13 dB, depending on the degree of alignment of the received navigation data bit boundaries with the boundaries of the 20,480-sample blocks.

As each 1024-sample block 186 is produced by synchronous summation, it is bit recoded to 2 bits I and 2 bits Q, and correlated with one period of C/A-PN reference code for the chosen satellite at the N-point correlator 166 (318). The resulting correlation function 188 has N complex values, where N=1024 for acquisition of the first satellite. It should be noted that the number N can be much smaller when re-acquiring or tracking satellites, as will be discussed in more detail later. The single period of PN reference code (for each satellite of interest) only needs to be computed once and can be prestored in the receiver. For optimum performance, the PN reference code should be filtered to match the filtering of the received code in the receiver. For this purpose, at least a 4-bit representation of the reference C/A code samples should be used.

For acquisition of the first satellite, computation of each of the N=1024 complex correlation function values at the N-point correlator 166 includes pointwise multiplication of 1024 complex values by corresponding 1024 real C/A reference code sample values produced by one of N cyclic shifts, and summing the resulting products. FIG. 19 schematically and conceptually illustrates the N-point correlation process in the N-point correlator 166 in accordance with one embodiment of the present invention. For example, the 1024 complex values $y_0, y_1, \ldots y_{1022}, y_{1023}$ of the compressed sample block of the first bit of the 128 bits are pointwise multiplied by the corresponding 1024 real values $Y^0, Y^1, \ldots Y^{1022}, Y^{1023}$ (with 0-cyclic shift) of the reference C/A code to produce 1024 complex values. The 1024 complex values are summed into a complex correlation function value, $C_1^0$. The subscript indicates the bit number (sample block number) and the superscript the number of cyclic shifts. The same 1024 complex values $y_0, y_1, \ldots y_{1022}, y_{1023}$ are then pointwise multiplied by the next cyclic shift of the 1024 real values $Y^1, Y^2, \ldots Y^{1022}, Y^{1023}, Y^0$ (with 1-cyclic shift) of the reference C/A code to produce 1024 complex values, which are summed into a next complex correlation function value $C_1^1$. The process continues until a set of 1024 correlation function values $C_1^0, C_1^1, \ldots C_1^{1023}$ are produced. The basic operation for this process is a (2-bit I, 2-bit Q)×(4-bit real reference value) and an addition. The correlation function values are stored in the first column of a complex-valued correlation function matrix 168, as shown in FIG. 19. The same operations are repeated for each of the subsequent 127 compressed sample blocks to produce 127 additional columns in the same way that the first column was produced, resulting in a complete (1024×128) correlation function matrix $C_I^K$ 168 (320), where K=0 to 1023, I=1 to 128. Alternatively, an FFT-based method of computing the correlation functions can be used, similarly to that of the 1024-point correlator 136 in the second embodiment.

A complete correlation function is produced on-the-fly as each of the 128 1024-sample blocks is produced by the synchronous summer 164. Thus, a complete correlation function must be computed every 20 milliseconds. To assure that this does not present an infeasible amount of computation, assume that the basic operation described above takes 10 hardware clock cycles (a conservative assumption). There are 1024 basic operations (multiply and add) per correlation value, and 1024 correlation values produced per correlation function (by cyclic shifts), requiring a total of 1024×1024×10=10,485,760 clock cycles. By performing 10 basic operations in parallel, all of this can be done in 1,048,576 clock cycles. Using a 64 MHz clock, this would take 1,048,576/(64×10⁶)=0.0164 seconds to produce a complete correlation function, well within 20 milliseconds. The parallelism of the 10 basic operations should require only a moderate amount of hardware.

The N=1024 cyclic shifts of the reference C/A code used in calculating one correlation function are in steps of 1 sample, very close to 1 C/A code chip. If exactly the same set of cyclic shifts is used for each of the 128 correlation functions, apparent signal Doppler causes the correlation functions to precess, or drift, across the 2.56 seconds of captured signal. For example, an apparent Doppler shift of 1540 Hz causes a drift rate of about 1 chip (or sample) per second, or about 2.56 chips (or samples) over the duration of the captured signal. This is sufficient to cause a large loss in the further coherent processing gain to be described shortly. For this reason, the entire reference C/A code is cyclically shifted before use in generating each correlation function (pre-shift) to compensate for the precession that would be present at the current a-priori Doppler frequency shift $f_0$, in Hertz, being searched. For the $k^{th}$ of the 128 correlation functions, the amount of this reference code pre-shift in reference code samples is given by the closest integer to $-2.56\times(f_0/1540)\times k/128$, with a negative value indicating a left shift due to a positive (closing) Doppler shift $f_0$.

After the compensation for precession described above, the maximum residual apparent Doppler shift within the current frequency bin is within ±25 Hz, and therefore the residual drift between the phases of the received and reference codes during the 2.56 seconds of signal capture is only $\pm(25/1540)\times 2.56=\pm 0.042$ chips, or about ±12 meters. Thus, no further correction for code precession is required.

As each correlation function is produced, it is bit recoded to 2 bits I and 2 bits Q (½ byte for both) to conserve memory in storing the function. The bit recoding can be based on the root-mean-square (RMS) value of the N=1024 values of the correlation function. Although this can cause saturation of correlation peaks produced by a strong satellite signal, thus reducing its SNR, is the SNR will still be strong enough for reliable acquisition because of the gain inherent in subsequent processing.

As each of the complex N=1024 correlation values of each of the resulting 128 correlation functions is produced, it is stored as an entry in the correlation matrix 168. The required memory size for the complete correlation matrix 168 is 128× 1024×½=65,536 bytes for acquisition of the first satellite, and much smaller for reacquisition and tracking of satellites. However, methods for reducing the memory size for the first satellite acquisition will be presented later.

Referring back to FIG. 18A, after the correlation matrix is generated (320), 128-point multiplications of each row of the correlation matrix and 128-bit subsequences of the known navigation data bit sequence are performed (322). To describe this processing step in more detail, it is convenient to arrange the 128N stored complex correlation values in the correlation matrix as $$\begin{array}{cccc} C_1^0 & C_2^0 & \ldots & C_{128}^0 \\ C_1^1 & C_2^1 & \ldots & C_{128}^1 \\ & & \vdots & \\ C_1^{N-1} & C_2^{N-1} & \ldots & C_{128}^{N-1} \end{array} \qquad (8)$$

where the subscript indicates which of the 128 N-sample blocks is used in the correlation, and the superscript identifies which of the N=1024 reference code cyclic shifts was used (pre-shifts to compensate for Doppler, which have already been applied, are not involved here, or in the subsequent discussion).

Also, the previously-stored 228 known navigation data bits (±1) known to contain the captured 128 bits of the signal will be denoted by:

$$B_1 B_2 \ldots B_{228} \qquad (9)$$

In the following processing, each row of the correlation matrix is pointwise multiplied by each of 101 blocks of 128 contiguous data bits extracted from the 228 known data bit sequence 194, as shown in FIG. 17. The first block of contiguous data bits contains bits 1-128 of the known data bits, the second block contains bits 2-129, the third block contains bits 3-130, . . . , and finally the $101^{st}$ block contains bits 101-228. It is convenient to think of these blocks as being selected by a 128-bit wide "window" that shifts across the known data bit sequence 194 with an initial shift of 0 bits and a final shift of 100 bits. That is, as shown in FIG. 17, a row selector 190 selects one of the rows of the correlation matrix, and the selected row is pointwise multiplied by blocks of contiguous 128 bits of the known data bit sequence 194 by shifting the contiguous 128 bits from the first 128 bits to the last 128 bits.

The 128-pointwise multiplier 170 first pointwise multiplies the first 128 bits in this 228-bit sequence by the first row of the correlation matrix to obtain the block $$B_1C_1^0 B_2C_2^0 \ldots B_{128}C_{128}^0 \qquad (10)$$

As shown in FIGS. 17 and 18B, a 128-point FFT is performed (324) on this block in the FFT 172, and the magnitude of each of its 128 output samples is computed (326) at the magnitude calculator 174. The maximum FFT output magnitude $MAG_{MAX}$ is determined (328) at the maximum value determiner 176, and the maximum FFT output magnitude $MAG_{MAX}$, as well as the associated FFT output index $I_{MAX}$, reference code cyclic shift index $K_{MAX}$ (0 in this case), and amount of shift $J_{MAX}$ of the 128-bit wide window which selects the contiguous 128 bits ($J_{MAX}=0$ in this case) are retained in the memory 178. Also retained in the memory 178 is the current Doppler search frequency $f_0$, here denoted by $f_{0MAX}$, and the start time $t_0$ of signal capture (i.e., the trial bit boundary), here denoted by $t_{0MAX}$. All of these values form a sextuple ($f_{0MAX}$, $t_{0MAX}$, $MAG_{MAX}$, $I_{MAX}$, $K_{MAX}$, $J_{MAX}$) retained in the memory 178 (332).

Next, an identical calculation is performed, after a segment selector 192 performs a right-shift of the 128-bit window by one bit (334) to select the next block of 128 contiguous bits from the known bit sequence 194, so that the pointwise multiplication produces the block $$B_2C_1^0 B_3C_2^0 \ldots B_{129}C_{128}^0 \qquad (11)$$

as the FFT input. The row selector 190, the segment selector 192, the 128-pointwise multiplier 170, and the 128-point FFT 172 may be referred to as a data-shift correlator since it calculates correlations between the rows of the correlation matrix and the selected data bit sequence by shifting the data bit sequence.

If the maximum FFT output magnitude at the magnitude determiner 176 exceeds that of the sextuple ($f_{0MAX}$, $t_{0MAX}$, $MAG_{MAX}$, $I_{MAX}$, $K_{MAX}$, $J_{MAX}$) previously stored in the memory 178 (330), all of the six entries in the sextuple are updated with their current values (332).

The above process is repeated over and over using 1-sample right-shifts of the 128-bit selecting window each time (334), and by updating the sextuple ($f_{0MAX}$, $t_{0MAX}$, $MAG_{MAX}$, $I_{MAX}$, $K_{MAX}$, $J_{MAX}$) if a current FFT output magnitude $MAG_{MAX}$ is larger than any previous value retained in the memory 178.

The last repetition of this process using the first row of the correlation matrix occurs when the 128-bit selecting window has been shifted as far as possible to the right (thus obtaining the last 128 bits of the known bit sequence 194), where the pointwise multiplication gives the block $$B_{101}C_1^0 B_{102}C_2^0 \ldots B_{228}C_{128}^0 \qquad (12)$$

as the input to the 128-point FFT.

At this point a total of 101 128-point FFT's have been performed, and the sextuple ($f_{0MAX}$, $t_{0MAX}$, $MAG_{MAX}$, $I_{MAX}$, $K_{MAX}$, $J_{MAX}$) contains the maximum FFT magnitude found so far, as well as the parameter values associated with it. This completes the processing of the first row of the correlation matrix.

Each of the subsequent rows of the correlation matrix is processed exactly as described above (336), each row producing 101 128-point FFT's, with the sextuple ($f_{0MAX}$, $t_{0MAX}$, $MAG_{MAX}$, $I_{MAX}$, $K_{MAX}$, $J_{MAX}$) containing the maximum FFT magnitude found thus far over the current and previous rows of the correlation matrix, as well as the parameter values associated with it.

At this point, reliable acquisition is not necessarily complete, because significant degradation in processing gain may have occurred due to misalignment of the navigation data bit boundaries with the trial bit boundaries of the successive 20-millisecond long blocks of 20,480 samples into which the captured 2.56 seconds of signal was partitioned.

Further Processing to Mitigate Navigation Data Bit Boundary Misalignment

To find sufficient alignment of the data bit boundaries for reliable detection, several more 2.56-second signal blocks are now processed in the same manner as above, but with the start of capture time (i.e., the trial bit boundary) staggered by fractions of 20 milliseconds (338). Assuming that 3 additional blocks are processed for a total of 4 trial bit boundaries, the stagger interval will be ¼×20=5 milliseconds. To obtain the start time $t_0$ (next) on the receiver's clock for the capture of the second 2.56-second signal block, the following set of times is considered:

$$t_0(\text{first 2.56-second block})+0.020k+0.005 \text{ seconds},$$
$$k=1,2, \qquad (13)$$

Then, the start time for the second signal block is initially calculated in the same way as for the first signal block, and is adjusted to the closest time in the above set. This will stagger the start time for the second signal block relative to that of the first signal block by 5 milliseconds modulo 20 milliseconds. A similar procedure is used in starting the capture of the third signal block, but the 5 modulo 20 millisecond stagger will be relative to the start time of the second signal block, and so on.

Using this procedure for starting the capture of the 3 additional signal blocks, one of the 4 signal blocks will be aligned to within ±2.5 milliseconds of the actual navigation data bit boundaries, giving at most about 1.2 dB of loss due to misalignment.

It should be noted that time drift due to frequency error in the receiver TCXO is negligible in this process of searching over data bit boundaries. For example, a typical ±1 ppm maximum frequency error causes a time drift of only 1 microsecond per second, or 60 microseconds per minute. Since it normally would take (4 captured blocks)×(1 subframe per block)×(6 seconds per subframe)=24 seconds to find a signal block with good alignment, TCXO drift is no problem.

It should also be noted that in processing the 3 additional repeated captures of 2.56-second signal blocks, the sextuple ($f_{0max}$, $t_{0MAX}$, $MAG_{MAX}$, $I_{MAX}$, $K_{MAX}$, $J_{MAX}$) continues to be updated each time the value of $MAG_{MAX}$ exceeds all of the previous values, including those from previous signal blocks.

At this point a complete search of a 50-Hz wide frequency bin centered at $f_o$ has been completed.

Completing the Acquisition Search

To complete the search for the satellite signal, all of the above processing (in FIG. 17) is repeated for values of the center frequency $f_o$ of the Doppler frequency bin spaced 50 Hz apart which span the total apparent Doppler frequency uncertainty of the signal (340). When acquiring the first satellite, this uncertainty is almost entirely that of the receiver's TCXO, since true signal Doppler is known much more accurately from the approximate receiver position, approximate time, and ephemeris data. Assuming a typical low-cost TCXO frequency uncertainty of ±1 ppm, the corresponding apparent Doppler uncertainty when receiving the GPS $L_1$ signal at 1575.42 MHz is $(1575.42\times10^6)\times(\pm1\times10^{-6})\cong\pm1575$ Hz, which spans about 63 50-Hz wide frequency bins. At four 6-second subframes per bin, the complete search for the first satellite at full sensitivity would take a maximum of about 4×6×63=1512 seconds, or about 25.2 minutes.

At all times during the search, the sextuple ($f_{0MAX}$, $t_{0MAX}$, $MAG_{MAX}$, $I_{MAX}$, $K_{MAX}$, $J_{MAX}$) continues to be updated every time an FFT magnitude exceeds one found at any previous time during the full search. At the end of the search, the last updated sextuple ($f_{0MAX}$, $t_{0MAX}$, $MAG_{MAX}$, $I_{MAX}$, $K_{MAX}$, $J_{MAX}$) is retained in the memory 178 and contains all acquisition data.

Due to the time required for the search, the acquisition data in the sextuple has a latency of up to 25.2 minutes. For this reason, it is preferable to repeat the search over a smaller Doppler frequency range to account for TCXO frequency drift during the search process due to temperature changes (342). A typical reduced search range might be over 3 50-Hz wide Doppler bins, which would take an additional 4×6×3=72 seconds, or 1.2 minutes, with a maximum latency of the same 1.2 minutes. In this search the center frequency of the central frequency bin of the 3 bins would be the frequency $f_{0MAX}$ found in the first search. If desired, a third search over just one frequency bin would take an additional 4×6=24 seconds with a latency no more than the same 24 seconds. During the additional smaller-range searches, the sextuple ($f_{0MAX}$, $t_{0MAX}$, $MAG_{MAX}$, $I_{MAX}$, $K_{MAX}$, $J_{MAX}$) would continue to be updated every time $MAG_{MAX}$ is larger than what has previously been stored. An additional benefit of the smaller-range searches is verification that the original acquisition parameters were valid.

At this point it can be determined if the value of $MAG_{MAX}$ is sufficient to imply a reliable detection of the signal (344).

Initial Estimates of Signal and TCXO Parameters

Assuming a valid detection of the signal, at this point a good estimate of the following parameters is available:
1. The value of the reference C/A code cyclic shift $K_{MAX}$ identifies the received code phase to within about ±½ chip at receiver time $t_{0MAX}$
2. The value $I_{MAX}$ of the FFT output index in combination with the Doppler bin center frequency $f_{0MAX}$ provides a very accurate estimate of apparent Doppler shift at receiver time $t_{0MAX}$ with a resolution of 1/(2.56 seconds)≅0.39 Hz by using the formula $$\text{Apparent Doppler shift, Hz} = f_{0MAX} + \frac{I_{MAX}}{2.56} \quad (14)$$

where it is assumed that the central FFT bin index corresponds to $I_{MAX}$=0. The possible value of $I_{MAX}$ ranges from −63 to 64.

3. The bit number within the known 228-bit sequence of the first bit received at $t_{0MAX}$ is simply $J_{MAX}$+1, where the bit number range is 1-101. Thus, the 128 bits captured by the receiver are known, and the GPS time of transmission of the leading edge of the first bit received is known. Using this time and ephemeris data, the location of the satellite at the transmission time is known. Thus, the propagation time of the signal can be computed using the receiver's approximate location. The accuracy of the computed propagation time is within about 3.3 microseconds for each kilometer of position uncertainty. For example, if the receiver location were known to within 25 kilometers, the propagation time could be computed to within 3.3×25≅83 microseconds. Therefore, taking into account the propagation delay, the actual GPS time of reception of the bit edge is known to within about 83 microseconds, and the time of arrival according to the receiver's clock is known within about 2.5 milliseconds due to possible data bit boundary misalignment. Thus, the receiver's clock can be calibrated to within about 2.5+milliseconds of GPS time. Note that after the above calibration, the arrival time on the receiver's clock of any known sequence of bits in any subframe from any satellite can now be computed to within about 2.5+milliseconds.

4. By comparing the measured apparent Doppler shift (item 2 above) and the Doppler shift computed from ephemeris data, calibrated GPS time from the receiver's clock (item 3 above), and approximate position, the TCXO frequency error can be determined with an uncertainty that depends almost entirely on the position uncertainty of the receiver, at most about 1 Hz per kilometer of position uncertainty. For example, if the receiver position is known to within 25 kilometers, the TCXO frequency can be calibrated to within about 25 Hz.

An Alternate Method of Terminating the Acquisition Search

Instead of searching through all Doppler frequency bins to find the largest FFT magnitude, the search can be terminated when an FFT magnitude exceeds a given threshold. This has the advantage that the expected search time is reduced to at least ½ of its former value.

Satellite Tracking

Once a satellite signal has been acquired, the signal can be tracked with essentially the same processes as those used for acquisition using the same circuitry shown in FIG. 17, although some processes can be omitted/reduced in tracking as explained below. As in acquisition, tracking includes processing a 2.56-second blocks of signal, each signal block assumed to be within a subframe. The major difference is that none of the following is required: (a) a search over a large number of frequency bins, (b) the full 1024 reference C/A code cyclic shifts, (c) the 101 blocks of consecutive 128 bits in the known 228-bit sequence each pointwise multiplied by each row of the correlation matrix. Throughout tracking, time is measured using the receiver's calibrated clock, which at this point is within about 2.5 milliseconds of GPS time just after acquisition of the first satellite.

FIG. 20 schematically illustrates a process flow diagram for method for tracking satellites after acquisition of GPS/GNSS signals, in accordance with one embodiment of the present invention. Tracking is initiated by first computing the accurate estimate of apparent Doppler shift (400), obtained from the acquisition process by means of the formula in item 2 above using the value $f_{0MAX}$. This will be the value assigned to the center frequency $f_o$ of the Doppler frequency bin used by the phase rotator 162 in capturing the first 2.56-second signal block used for tracking. As tracking proceeds, the center frequency $f_o$ is updated from FFT frequency measurements (by the 128-point FFT 172 and the magnitude determiner 174), and $\hat{f}_0$ is updated by computations using ephemeris data, calibrated receiver time, and approximate receiver position.

The start time $t_0$ (trial bit boundary) on the receiver's clock for signal capture is the GPS time of reception of the leading edge of the first bit in a known sequence of 128 bits in the subframe selected to start the tracking. As previously mentioned in item 3 above, this GPS time of reception (i.e., the start time $t_0$ for tracking) can be calculated to within about 83 microseconds (402), assuming a receiver position uncertainty of 25 kilometers. For the process of bit synchronization which will be performed subsequently, it is helpful to use the reference code cyclic shift $K_{MAX}$ obtained from acquisition to adjust the start time $t_0$ so that it coincides with the beginning of the nearest received C/A code period (known as a PN code epoch) (402). This is easily done by adjusting the start time $t_0$ backward by $K_{MAX} \times 0.97656$ microseconds if $K_{MAX}$ is less than 512 and otherwise forward by $(1024-K_{MAX}) \times 0.97656$ microseconds (0.97656 microseconds is the sample spacing of the received signal, which is very nearly the length of 1 C/A code chip). After the adjustment, there will be a received data bit boundary within k milliseconds of the start time $t_0$, where k is an integer from −3 to 3 (k will be an integer because a data bit boundary always coincides with a PN code epoch).

Similarly to acquisition, a sequence of complex baseband samples 182 is received (404) from the RF front end, and the phase rotator 162 compensates the apparent Doppler shift using the calculated/estimated Doppler frequency bin ($f_0$) and the rate of change ($\dot{f}_0$) (406).

Bit Synchronization

To obtain the best tracking performance and to calibrate the receiver's clock to the sub-microsecond level, bit synchronization is necessary. Here it is assumed that it begins at the initiation of tracking, but in some cases can occur later.

In bit synchronization, the 20-millisecond synchronous summer 164 performs the same type of synchronous summation process described above for acquisition using signal blocks of 20,480 samples (408). However, in the 20-millisecond synchronous summation, there are 7 versions of the process operating in parallel, in which the boundaries of the signal blocks (the partition points, i.e., bit boundary locations) are respectively offset by −3, −2, −1, 0, 1, 2, and 3 milliseconds from the estimated start time $t_0$. That is, the 7 offsets are apart from each other by one period of C/A code centering on the bit boundary corresponding to the start time $t_0$. That is, the 7 offsets correspond to 7 code epochs. The offsets may be generated by the process controller 161 (an offset generator 169) by partitioning the signal block into 20-millisecond-long sub blocks using the offset bit boundaries. The first signal block of the zero-offset is processed so as to synchronously sum the 20,480 samples starting at $t_0$ (which is the same as in acquisition).

For each of the 7 offset values, each synchronous summation produces a set of 1024 compressed samples which is correlated, in the N-point correlator 166, with one period of reference C/A code to produce a complex correlation value (410). FIG. 21 schematically illustrates an example of the correlation operation for bit synchronization. Unlike the many cyclic shifts required for acquisition as shown in FIG. 19, only one cyclic shift value of the reference code C/A is needed for bit synchronization, because the proper value for alignment with the received C/A code can be computed from knowledge of the cyclic shift (using the final value $K_{MAX}$) and accurate apparent Doppler shift obtained from the signal acquisition process. Thus, 7 complex correlation values are produced every 20 milliseconds, one value for each of the 7 offset synchronous summation processes so as to generate a bit synchronization correlation matrix 171 (412). For convenience, these values are arranged in 7 rows as $$C_1^{-3} \quad C_2^{-3} \quad \ldots \quad C_{128}^{-3} \tag{15}$$

$$C_1^{-2} \quad C_2^{-2} \quad \ldots \quad C_{128}^{-2}$$

-continued $$\vdots$$

$$C_1^{3} \quad C_2^{3} \quad \ldots \quad C_{128}^{3}$$

where the superscript indicates the synchronous summation offset and the subscript indicates which of the 1024-sample blocks was used in the correlation. It should be noted that the period of reference C/A code may be cyclically pre-shifted, prior to the 1024-point correlation, as time progresses to compensate for signal time precession due to apparent Doppler shift corresponding to the Doppler frequency $f_0$.

Each of the 7 rows of the bit synchronization correlation matrix is pointwise multiplied (414), at the pointwise multiplier 170 (see FIG. 17), by the known 128-bit sequence $$B_1 B_2 \ldots B_{128} \tag{16}$$

that the receiver is known to have captured, to produce the blocks $$B_1 C_1^k B_2 C_2^k \ldots B_{128} C_{128}^k, k=-3,-2,-1,0,1,2,3 \tag{17}$$

It should be noted that in bit synchronization, there is no need to shift the 128-bit sequence within the known 228-bit sequence 194. Thus, the segment selector 192 may be disabled to provide the same 128-bit sequence without shifting. In bit synchronization, the row selector 190 and the pointwise multiplier 170 (with the disabled segment selector 192) may be referred to as a bit sync correlator.

On each of the 7 blocks, a 128-point FFT is performed at the 128-point FFT 172 (416), and the magnitude L is calculated at the magnitude calculator 174 (418) so as to find the largest FFT output magnitude $L_k$. The result is 7 largest magnitudes $L_{-3}, L_{-2}, \ldots L_3$. The maximum value determiner 176, which operates as a bit sync correlation peak determiner, determines the largest magnitude $L_{MAX}$ with the index $k_{MAX}$ (420). The index $k_{MAX}$ associated with the largest of these 7 magnitudes is the displacement in milliseconds of the nearest received data bit boundary from the capture start time $t_0$. Bit synchronization has now been achieved (422), because it is known that bit boundaries occur at $$t_0 + 0.001 k_{MAX} + 0.02n, n=0,1,2, \tag{18}$$

on the receiver's clock.

If needed, improvement in the reliability of bit synchronization can be achieved by sequentially capturing a number M of 2.56-second blocks to get M vectors $$L_{-3}^j, L_{-2}^j, \ldots L_3^j, j=1,2,\ldots,M \tag{19}$$

of largest FFT magnitudes, forming their vector sum, and finding the index k of the component of the vector sum which has the largest value.

Refinement of Receiver Clock Calibration

As a result of bit synchronization, the point the time of reception on the receiver's clock of the leading edge of the first bit in the known captured 128-bit sequence is now known to be $t_0+0.001 k_{MAX}$. Since the GPS time of transmission of this leading edge is known and the propagation time is known to within 83 microseconds, the receiver clock can now be calibrated to within 83 microseconds of GPS time, assuming a 25 kilometer uncertainty in receiver position.

Continuation and Refinement of Tracking

Once bit synchronization has been achieved, it can be maintained by further tracking using 2.56-second blocks of received signal. For each signal block, the start time $t_0$ of signal capture on the receiver's clock can be calculated to take place at a data bit boundary by using previous estimates of received code phase and accurate apparent Doppler shift.

For further tracking, only one partition of the received signal samples into 20,480-sample blocks is necessary (similar to acquisition) and each of the compressed 1024-sample blocks resulting from synchronous summation only need to be correlated with 1 period of reference code having only one cyclic shift value. However, for increased accuracy in estimating the phase of the received code, a small number of cyclic shifts at higher resolution can be employed. This is accomplished by increasing the number of samples in the stored reference C/A code to an integer multiple of 1024. For example, if the stored period of reference C/A code consists of 16×1024=16,384 samples, it can be shifted in increments of 1 sample out of 16,384, or approximately 1/16 chip. This results in a range resolution of approximately 18 meters. In this case, for each cyclic shift value of the reference C/A code, it can be correlated with a compressed 1024 sample block by using every $16^{th}$ reference sample. No other change in the hardware is required for the correlation. As in the case of acquisition, additional precession in the cyclic shifts of the reference C/A code is introduced in accordance with accurately measured apparent Doppler shift.

The remainder of processing the captured 2.56-second block of signal is the same as for acquisition, except that the correlation matrix has a relatively small number of rows, and the sequence of 128 captured bits is known, so each row of the correlation matrix is simply pointwise multiplied by it and input to a 128-point FFT.

Inputs and Outputs for Each 2.56-Second Dwell During Tracking

The index k indicates the current dwell (signal block), and k−1 indicates the previous dwell on the same satellite.

Inputs:
1. Signal capture start time on receiver's clock:

$$t_0(k) = t_{GPS}(k) + (9.7656 \times 10^{-7})K_{MAX}(k-1) - [t_{GPS}(k) - t_0(k-1)]\frac{f(k-1)}{1575.42 \times 10^6} \text{ sec}$$

where $t_{GPS}$ (k) denotes the computed GPS reception time of the leading edge of the first bit in the 128-bits of signal to be captured, and f(k) denotes the estimated apparent Doppler frequency in Hertz for the phase rotator determined from the $k^{th}$ dwell.

2. Estimated apparent Doppler frequency for phase rotator:

$$f(k) = \left[f(k-1) + \frac{I_{MAX}(k-1)}{2.56}\right] + \frac{1}{2}\dot{f}(k-1)[t_{GPS}(k) - t_0(k-1)]^2 \text{ Hz}$$

where $\dot{f}(k)$ denotes the rate of frequency change in Hz/sec² due to satellite motion determined from the $k^{th}$ dwell.

3. Rate of frequency change due to satellite motion for phase rotator:

$\dot{f}(k)$ in Hz/sec² computed from ephemeris, approximate location, and $t_{GPS}(k)$ Outputs:
1. Estimated apparent Doppler at time $t_0$ (k):

$$f(k) = f(k-1) + \frac{I_{MAX}(k)}{2.56} \text{ Hz}$$

2. Estimate of offset of received code epoch at time $t_0$ (k):

$$\Delta_{CODE}(k) = (9.7656 \times 10^{-7})K_{MAX}(k)\text{sec}$$

Estimate of TCXO Frequency Error

The estimate of TCXO frequency error in parts per million at receiver clock time $t_0$ (k) is given by $$\frac{f(k) - f_{CALC}(k)}{1575.42} \text{ ppm}$$

where $f_{CALC}$ (k) is the calculated Doppler shift at time $t_{GPS}$ (k) using ephemeris data and approximate user position. The accuracy of this estimate depends primarily on the uncertainty of the receiver position, and is within approximately 0.635 parts per billion (ppb) per kilometer of receiver position uncertainty.

Estimate of Receiver Clock Error

The receiver clock is assumed to be governed by the receiver's TCXO. The estimated receiver clock error at receiver clock time $t_0$ (k) is given by $$CLKERR(k) = t_0(k) - [t_{GPS}(k) + \Delta_{CODE}(k)]\text{sec}$$

The accuracy of this estimate depends primarily on the uncertainty of the receiver position, and is within approximately 3 microseconds per kilometer of receiver position uncertainty.

The receiver clock error at any given time on the receiver's clock can be computed by using the latest estimate of receiver clock error obtained from tracking and the estimate of TCXO frequency error.

Acquisition of Additional Satellites

After acquiring and continuing to track the first satellite, the acquisition of additional satellites is much faster, because the receiver clock error and TCXO frequency error are known very accurately. As a result, additional satellites can be acquired by directly entering the tracking mode without the time uncertainty that would otherwise require bit synchronization.

Position Fixes

When enough satellites are available to obtain a position fix, the position uncertainty will typically be reduced to 100 meters or less, a level that permits calibration of the receiver's clock to the sub-microsecond level. That is, using pseudo-range measurements from a plurality of satellites acquired by the method of embodiments of the present invention described above, receiver position within approximately 100 meters may be obtained, thereby reducing the time uncertainty to the sub-microsecond level to achieve sub-microsecond time transfer.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method for high-sensitivity GPS/GNSS signal acquisition in a stationary GPS/GNSS receiver including a front end section and a signal processing section, the front end section receiving GPS/GNSS signals from satellites and producing a digitized complex baseband signal, the method comprising:

partitioning a range of uncertainty in frequency of the received signal due to apparent Doppler shift into a plurality (P) of contiguous frequency bins having a center frequency $f_{Op}$;

partitioning a range of uncertainty in location of navigation data bit boundaries of the received signal to obtain equally spaced trial bit boundary locations $t_{Os}$; and for each combination of the trial bit boundary location and the frequency bin, performing a search process including:

capturing a segment of the baseband signal including navigation data using start time corresponding to the selected trial bit boundary location;

Doppler-compensating the captured baseband signal segment using a phase rotator;

partitioning the segment of the baseband signal into successive sub-segments, each having a length of one navigation data bit;

synchronously summing samples of each sub-segment with a periodicity of one period of C/A code, so as to produce a compressed sample block having N samples, each compressed sample block having the length of one period of C/A code;

cross-correlating each compressed sample block with one period of reference C/A code for a selected satellite to produce an N-value correlation function per compressed sample block;

calculating a magnitude of each value of the N-value correlation function to produce a correlation magnitude function for each N-value correlation function, the correlation magnitude function having N values; and stack-accumulating a number of the N-value correlation magnitude functions into an array with precession compensation so as to determine a correlation peak having a largest value in the array.

2. The method of claim 1, wherein said Doppler-compensating the captured baseband signal segment includes:

calculating a rate of change in the frequency of the received signal based on approximate receiver location, approximate time, and satellite ephemeris data obtained from an external source, wherein a phase rotation in the phase rotator being calculated as a function of time based on the center frequency of the frequency bin and the rate of change in the frequency.

3. The method of claim 2, further comprising:

after performing said search process for each combination of the frequency bins and the trial bit boundary locations, determining a largest correlation peak having a largest value among all of the correlation peaks, so as to obtain signal acquisition parameters from the center frequency of the frequency bin, the trial bit boundary location, the calculated rate of change in the frequency, and the location in the array associated with the largest correlation peak.

4. The method of claim 1, further comprising:

compensating precession in the N-value correlation magnitude function due to the apparent Doppler shift by cyclically shifting positions of the N values in the N-value correlation magnitude function, prior to said stack-accumulating.

5. The method of claim 1, wherein said stack-accumulating includes:

stack-accumulating a predetermined number (R) of the N-value correlation magnitude functions into an N-accumulator array;

creating a plurality (M) of arrays of the accumulated correlation magnitude functions in software memory by transferring contents of the N-accumulator array to the software memory and resetting the N-accumulator array each time R correlation magnitude functions are accumulated in the N-accumulator array;

stack-accumulating the M arrays of the accumulated correlation magnitude functions into a final array with precession compensation by cyclically shifting the accumulated values in each of the M arrays; and determining the correlation peak having the largest value in the final array.

6. The method of claim 4, wherein said search process is performed in parallel for the plurality (P) of frequency bins so as to create P ×M arrays, said stack-accumulating the M arrays comprising:

arranging the P ×M arrays into a P by M matrix, an array in the matrix being denoted by $A_k^n$, where k runs from 1 to M in time sequence, and frequency bin index n runs from 1 to P;

calculating a plurality of frequency trajectories each of which varies linearly with time according to an expression $f(t) = a + bt$, where a is a frequency at the time where the arrays $A_1^n$ are halfway through the accumulation, and b is the rate of change of frequency; and stack-accumulating, along each of the plurality of frequency trajectories, M arrays $A_1^{n_1}, A_2^{n_2}, A_3^{n_3}, \ldots, A_M^{n_M}$ from the array matrix to form an array B, where a superscript $n_k$ identifies the frequency bin intercepted by the frequency trajectory at the time of midpoint of the accumulation in the corresponding arrays having a subscript value k, wherein, in all arrays $A_k^n$ having the same subscript, the accumulated values are cyclically shifted by a same amount to compensate for time precession of the received signal, and wherein said final array is the array B for each frequency trajectory, said determining the correlation peak including:

determining a largest correlation peak having a largest value among all of the correlation peaks in the B arrays obtained for the plurality of frequency trajectories.

7. The method of claim 6, further comprising:

obtaining signal acquisition parameters from the frequency trajectory, the center frequency of the frequency bin, the trial bit boundary location, the calculated rate of change in the frequency, and the location in the array B which are associated with the largest correlation peak.

8. The method of claim 1, wherein said cross-correlating includes:

fast-Fourier transforming N samples of each compressed sample block to produce N complex outputs;

obtaining N reference outputs by calculating complex-conjugate of fast-Fourier transformed N samples of the one period of reference C/A code;

pointwise-multiplying the N complex outputs with the N reference outputs to produce N complex values; and inverse fast-Fourier transforming the N complex values to generate the N-point correlation function.

9. The method of claim 1, wherein each navigation data bit spans 20 milliseconds, each sub-segment is 20-milliseond long and contains 20×N samples, one period of C/A code is 1 millisecond, and each compressed sample block is 1 millisecond in length.

10. The method of claim 9, wherein the number N is 1024.

11. The method of claim 1, wherein said Doppler-compensating, said synchronously summing, said cross-correlating, and said stack-accumulating are performed as real time processing.

12. A method for high-sensitivity GPS/GNSS signal acquisition and tracking in a stationary GPS/GNSS receiver including a front end section and a signal processing section, the front end section receiving GPS/GNSS signals from satellites and producing a digitized complex baseband signal, the method comprising:

selecting a known B-bit sequence from a selected subframe of navigation data, the known B-bit sequence containing an entire M-bit sequence to be captured as part thereof;

partitioning a range of uncertainty in frequency of the received signal due to apparent Doppler shift into a plurality (P) of contiguous frequency bins having a center frequency $f_{Op}$;

partitioning a range of uncertainty in location of navigation data bit boundaries of the received signal to obtain equally spaced trial bit boundary locations $t_{Os}$;

for each combination of the trial bit boundary location and the frequency bin, performing a search process including:

capturing an M-bit block of the baseband signal ("signal block") from the selected subframe of the received signal using start time corresponding to the selected trial bit boundary location, the signal block including M bits of the navigation data;

Doppler-compensating the captured signal block using a phase rotator;

partitioning the signal block into M successive sub-blocks having a length of one navigation data bit;

synchronously summing the samples of each sub-block with a periodicity of one period of C/A code, so as to produce a compressed sample block having N-samples, each compressed sample block having a length of one period of C/A code;

cross-correlating each compressed sample block with N cyclic shifts of one period of reference C/A code for a selected satellite to produce an N-value correlation function per compressed sample block so as to produce M N-value correlation functions for M compressed sample blocks, forming an N-by-M correlation matrix, $k^{th}$ column of the correlation matrix consisting of the N complex values of the N-value correlation function of the $k^{th}$ compressed sample block; and data-shift correlating each row of the correlation matrix with a selected M-bit sequence of the known B-bit sequence by shifting the selected M-bit sequence from one end to the other within the known B-bit sequence so as to produce M data-shift correlation values for each of row/shift combinations, and finding a maximum-magnitude data-shift correlation value and associated parameters, wherein the associate parameters includes:

the center frequency $f_{Op}$ of the selected frequency bin;
the selected trial bit boundary location $t_{Os}$;
an index $I_{MAX}$ of the maximum-magnitude data-shift correlation value within the M data-shift correlation values per row/shift combination;

a row index $K_{MAX}$ of the correlation matrix producing the maximum-magnitude data-shift correlation value, corresponding to the $K^{th}$ cyclic shift in the reference C/A code samples, indicating a location of a code epoch of the received signal; and an amount of shift $J_{MAX}$ of the selected contiguous M-bit sequence within the known B-bit sequence, corresponding to a location of a start bit of the contiguous M-bit sequence in the known B-bit sequence.

13. The method of claim 12, wherein said Doppler-compensating the captured signal block includes:

calculating a rate of change in the frequency of the received signal based on approximate receiver location, approximate time, and satellite ephemeris data obtained from an external source, wherein a phase rotation in the phase rotator being calculated as a function of time based on the center frequency of the frequency bin and the rate of change in the frequency.

14. The method of claim 12, wherein said cross-correlating each compressed sample block includes:

obtaining N real-value samples of the one period of reference C/A code;

pointwise-multiplying the N real-value samples of the reference C/A code with the N samples of the compressed sample block to produce N complex values;

summing the N complex values into a correlation function value;

cyclically shifting the N real-value samples of the reference C/A code by one sample; and repeating said pointwise-multiplying, said summing, and said cyclic shifting for N times so as to produce N correlation function values for the N-value correlation function of the compressed sample block.

15. The method of claim 12, wherein said cross-correlating each compressed sample block includes:

cyclically pre-shifting the N real-value samples of the one period of reference C/A code as time progresses so as to compensate for signal time precession due to apparent Doppler shift corresponding to the selected frequency bin.

16. The method of claim 12, wherein said data-shift correlating includes:

selecting the contiguous M-bit sequence from the known B-bit sequence;

pointwise-multiplying a selected row of the correlation matrix with the selected contiguous M-bit sequence to produce M complex values;

performing M-point FFT on the M complex values to produce M FFT outputs, the M-FFT outputs being the M data-shift correlation values;

calculating magnitude of each of the M FFT outputs to determine a current maximum FFT output value;

updating the current maximum FFT value and associated parameters by retaining the current maximum FFT value and associated parameters if there is no previous maximum FFT value retained, or by replacing previous maximum FFT value and associated parameters with the current maximum FFT value and associated parameters if the current maximum FFT value is greater than the previous maximum FFT value retained;

shifting the selected contiguous M-bit sequence by one bit within the known B-bit sequence;

repeating said pointwise multiplying, said performing M-point FFT, said updating, and said shifting for B−M+1 times until the selected contiguous M-bit sequence moves from one end of the known B-bit sequence to another end thereof; and obtaining a greatest maximum FFT value and associated parameters by repeating said pointwise multiplying, said performing M-point FFT, said updating, said shifting, and said repeating for all rows of the correlation matrix.

17. The method of claim 12, further comprising:
repeating said search process for all of the frequency bin/trial bit boundary location combinations so as to find the greatest maximum data-shift correlation value and final parameters associated with the greatest maximum data-shift correlation value.

18. The method of claim 17, further comprising:
determining, based on the final parameters and known GPS time of transmission of the known B-bit sequence, a C/A code phase of the received signal, accurate apparent Doppler shift in the received signal, and time to within a few milliseconds.

19. The method of claim 12, wherein each navigation data bit spans 20 milliseconds, each sub-block is 20-milliseond long and contains 20×N samples, one period of C/A code is 1 millisecond, and each compressed sample block is 1 millisecond in length.

20. The method of claim 12, wherein the number N is 1024, the number of bits B is 228, and the number of bits M is 128.

21. The method of claim 12, wherein said Doppler-compensating, said synchronously summing, said cross-correlating, and said data-shift correlating are performed as real time processing.

22. A method for obtaining bit synchronization after acquisition of GPS/GNSS signals in a stationary GPS/GNSS receiver including a front end section and a signal processing section, the front end section receiving GPS/GNSS signals from satellites and producing a digitized complex baseband signal of acquired GPS/GNSS signals, the method comprising:

capturing an M-bit block of the baseband signal ("signal block") from a predetermined subframe of the acquired signal, the signal block including a known M-bit sequence of the navigation data, using an estimated bit boundary location obtained in signal acquisition, the estimated bit boundary corresponding to start time of the known M-bit sequence;

Doppler-compensating the captured signal block using a phase rotator, a phase rotation thereof being calculated as a function of time based on the center frequency of an estimated frequency bin and a calculated rate of change in the frequency obtained in the signal acquisition;

partitioning the signal block into M successive sub-blocks having a length of one navigation data bit, using the estimated bit boundary location and Q−1 offset bit boundary locations, so as to create Q sets of M successive sub-blocks, the estimated bit boundary location and the offset bit boundary locations being apart from each other by one period of C/A code with the estimated bit boundary location as a center;

synchronously summing the samples within each sub-block with a periodicity of one period of C/A code, so as to produce Q sets of M compressed sample blocks each having N-samples, each compressed sample block having a length of one period of C/A code;

cross-correlating each compressed sample block with one period of reference C/A code for a selected satellite to produce M correlation values per set of M compressed sample blocks so as to produce Q ×M correlation values, forming a Q-by-M bit synchronization correlation matrix, the $j^{th}$ row of the bit synchronization correlation matrix consisting of the M complex correlation values obtained from the $j^{th}$ of the Q sets of M compressed sample values;

pointwise-multiplying a selected row of the bit synchronization correlation matrix with the known M-bit sequence to produce M complex values;

performing M-point FFT on the M complex values to produce M FFT outputs;

calculating magnitude of each of the M FFT outputs to determine a current maximum FFT output value;

updating the current maximum FFT value and associated parameters by retaining the current maximum FFT value and associated parameters if there is no previous maximum FFT value retained, or by replacing previous maximum FFT value and associated parameters with the current maximum FFT value and associated parameters if the current maximum FFT value is greater than the previous maximum FFT value retained; and obtaining a greatest maximum FFT value and associated parameters by repeating said pointwise multiplying, said performing M-point FFT, and said updating for all rows of the bit synchronization correlation matrix, so as to find a row index $K_{MAX}$ of the correlation matrix producing the greatest maximum FFT value as an offset of a nearest bit boundary to the starting time of signal capture.

23. The method of claim 22, wherein the method further comprising;
determining time within approximately 3.3 microseconds per kilometer of position uncertainty.

24. The method of claim 22, wherein said cross-correlating each compressed sample block includes:
obtaining N real-value samples of the one period of reference C/A code;
pointwise-multiplying the N real-value samples of the reference C/A code with the N samples of the compressed sample block to produce N complex values;
summing the N complex values into a bit synchronization correlation value.

25. The method of claim 22, wherein said cross-correlating each compressed sample block includes:
cyclically shifting the N real-value samples of the one period of reference C/A code as time progresses so as to compensate for signal time precession due to apparent Doppler shift corresponding to the selected frequency bin.

26. The method of claim 22, wherein each navigation data bit spans 20 milliseconds, each sub-block is 20-milliseond long and contains 20×N samples, one period of C/A code is 1 millisecond, and each compressed sample block is 1 millisecond in length.

27. The method of claim 22, wherein the number N is 1024, the number of bits M is 128, and number Q of sets is 7.

28. A method for tracking satellites following bit synchronization in accordance with claim 22, the method comprising:
continually updating GPS code phase, accurate apparent signal Doppler shift, and time to within approximately 3.3 microseconds per kilometer of receiver position uncertainty.

29. A method for obtaining sub-microsecond time transfer by using pseudorange measurements from a plurality of satellites acquired by the method of claim 22, to obtain position within approximately 100 meters, thereby reducing the time uncertainty to the sub-microsecond level.

30. A GPS/GNSS receiver circuit for high-sensitivity GPS/GNSS signal acquisition, including a front end section and a signal processing section, the front end section receiving GPS/GNSS signals from satellites and producing a digitized complex baseband signal, the signal processing section comprising:

an input terminal for receiving a segment of the baseband signal including navigation data, a process controller including:
- a frequency bin selector for setting a plurality (P) of contiguous frequency bins by partitioning a range of uncertainty in frequency of the received signal due to apparent Doppler shift, and for selecting one of the frequency bins to be searched, each frequency bin having a center frequency $f_{Op}$; and
- a bit boundary selector for setting a plurality of equally spaced trial bit boundary locations $t_{Os}$ by partitioning a range of uncertainty in location of navigation data bit boundaries of the received signal, and for selecting one of the trial bit boundary locations as start time for capturing the received signal;

a phase rotator for Doppler-compensating the baseband signal segment based on a phase rotation function calculated from the center frequency of the frequency bin and a rate of change in the frequency;

a synchronous summer for partitioning the segment of the baseband signal into successive sub-segments, and for synchronously summing the samples within each sub-segment with a periodicity of one period of C/A code, so as to produce a compressed sample block having N samples, each compressed sample block having a length of one period of C/A code;

a cross correlator for cross-correlating each compressed sample block with one period of reference C/A code for a selected satellite to produce an N-value correlation function per compressed sample block;

a magnitude calculator for calculating a magnitude of each value of the N-value correlation function to produce a correlation magnitude function for each N-value correlation function, the correlation magnitude function having N values;

a stack accumulator for stack-accumulating a predetermined number (R) of the N-value correlation magnitude functions so as to create a plurality (M) of arrays of the accumulated magnitudes, and for stack-accumulating the M arrays of the accumulated magnitudes into a final array with precession compensation by cyclically shifting the accumulated values in each of the M arrays; and a correlation peak determiner for determining a correlation peak having a largest value in the final array.

31. The GPS/GNSS receiver circuit of claim 30, wherein said process controller further includes:
a rate change calculator for calculating the rate of change in the frequency of the received signal based on approximate receiver location, approximate time, and satellite ephemeris data obtained from an external source.

32. The GPS/GNSS receiver circuit of claim 30, wherein said correlation peak determiner includes a memory for storing information of the correlation peak and a location thereof in the final array for each combination of the frequency bins and the trial bit boundary location,
and wherein the correlation peak determiner determines a largest correlation peak having a largest value among all of the correlation peaks, so as to obtain signal acquisition parameters from the center frequency of the frequency bin, the trial bit boundary location, the calculated rate of change in the frequency, and the location in the final array associated with the largest correlation peak.

33. The GPS/GNSS receiver circuit of claim 30, wherein said signal processing section further comprises:
a coarse precession compensator coupled to said magnitude calculator, for compensating precession in the N-value correlation magnitude function due to the apparent Doppler shift by cyclically shifting positions of the N values in the N-value correlation magnitude function, and for sending the coarse precession compensated correlation magnitude functions to said stack accumulator.

34. The GPS/GNSS receiver circuit of claim 30, wherein said stack accumulator includes:
an N-accumulator array for stack-accumulating the magnitude of each N-value correlation function, and for outputting contents thereof each time R magnitudes are accumulated; and
a software accumulator for holding the contents of the N-accumulator arrays so as to stack-accumulate the M arrays of the accumulated magnitudes into the final array with precession compensation by cyclically shifting the accumulated values in each of the M arrays.

35. The GPS/GNSS receiver circuit of claim 34, wherein said phase rotator includes a plurality of phase rotators, said synchronous summer includes a plurality of synchronous summers, said cross correlator includes a plurality of cross correlators, said magnitude calculator includes a plurality of magnitude calculators, and said stack accumulator includes a plurality of N-accumulator arrays, such that a plurality (P) of frequency bins are searched in parallel.

36. The GPS/GNSS receiver circuit of claim 35, wherein each phase rotator, each synchronous summer, each cross correlator, and each magnitude calculator are capable of processing signals in a plurality of frequency bins by time sharing, respectively, while each frequency bin is provided with a respective N-accumulator array.

37. The GPS/GNSS receiver circuit of claim 34, wherein said stack accumulator creates P ×M arrays in the software accumulator, arranges the P ×M arrays into a P by M array matrix, an array in the matrix being denoted by $A_k^n$, where k runs from 1 to M in time sequence, and frequency bin index n runs from 1 to P, calculates a plurality of frequency trajectories each of which varies linearly with time according to an expression $f(t) = a + bt$, where a is a frequency at the time where the arrays $A_1^n$ are halfway through the accumulation, and b is the rate of change of frequency, and stack-accumulates, along each of the plurality of frequency trajectories, M arrays $A_1^{n_1}, A_2^{n_2}, A_3^{n_3}, \ldots, A_M^{n_M}$; from the array matrix to form an array B, where a superscript $n_k$ identifies the frequency bin intercepted by the frequency trajectory at the time of midpoint of the accumulation in the corresponding arrays having a subscript value k, wherein, the stack accumulator cyclically shifts, in all arrays $A_k^n$ having the same subscript, the accumulated values by a same amount to compensate for time precession of the received signal, and wherein said correlation peak determiner determines a largest correlation peak having a largest value among all of the correlation peaks in the B arrays obtained for the plurality of frequency trajectories, signal acquisition parameters being obtained from the frequency trajectory, the enter frequency of the frequency bin, the trial bit boundary location, the calculated rate of change in the frequency, and the location in the array B which are associated with the largest correlation peak.

38. The GPS/GNSS receiver circuit of claim 30, wherein said cross-correlator includes:
- a first fast-Fourier transformer for transforming N samples of each compressed sample block to produce N complex outputs;
- a second fast-Fourier transformer for fast-Fourier transforming N samples of the one period of reference C/A code;
- a complex-conjugator for obtaining N reference outputs by calculating complex-conjugate of the fast-Fourier transformed N samples of the one period of reference C/A code;
- a pointwise multiplier for pointwise-multiplying the N complex outputs with the N reference outputs to produce N complex values; and
- an inverse fast-Fourier transformer for inverse fast-Fourier transforming the N complex values to generate the N-point correlation function.

39. The GPS/GNSS receiver circuit of claim 30, wherein each navigation data bit spans 20 milliseconds, each sub-segment is 20-milliseond long and contains 20×N samples, one period of C/A code is 1 millisecond, and each compressed sample block is 1 millisecond in length.

40. The GPS/GNSS receiver circuit of claim 30, wherein the number N is 1024, the number M of arrays is 6, and the number R of correlation magnitude functions is 1500.

41. A GPS/GNSS receiver circuit for high-sensitivity GPS/GNSS signal acquisition and tracking, including a front end section and a signal processing section, the front end section receiving GPS/GNSS signals from satellites and producing a digitized complex baseband signal, the signal processing section comprising:
- an input terminal for receiving an M-bit block of the baseband signal ("signal block") from the selected subframe of the received signal, the signal block including M bits of the navigation data;
- a process controller including:
  - a frequency bin selector for partitioning a range of uncertainty in frequency of the received signal due to apparent Doppler shift into a plurality (P) of contiguous frequency bins having a center frequency $f_{0p}$, and for selecting a frequency bin to be searched; and
  - a bit boundary selector for partitioning a range of uncertainty in location of navigation data bit boundaries of the received signal to obtain equally spaced trial bit boundary locations $t_{0s}$, and for selecting a trial bit boundary location as start time for capturing the received signal;
- a phase rotator for Doppler-compensating the captured signal block based on a phase rotation function calculated from the center frequency of the frequency bin and the rate of change in the frequency;
- a synchronous summer for partitioning the signal block into M successive sub-blocks, and synchronously summing the samples within each sub-block with a periodicity of one period of C/A code, so as to produce a compressed sample block having N-samples, each compressed sample block having a length of one period of C/A code;
- a cross correlator for cross-correlating each compressed sample block with N cyclic shifts of one period of reference C/A code for a selected satellite to produce an N-value correlation function per compressed sample block so as to produce M N-value correlation functions for M compressed sample blocks;
- a correlator memory for holding an N-by-M correlation matrix, $k^{th}$ column of the correlation matrix consisting of the N complex values of the N-value correlation function of the $k^{th}$ compressed sample block;
- a data-shift correlator coupled to said correlator memory, for data-shift correlating each row of the correlation matrix with a selected M-bit sequence of the known B-bit sequence by shifting the selected M-bit sequence from one end to the other within the known B-bit sequence so as to produce M data-shift correlation values for each row/shift combination;
- a magnitude calculator for calculating magnitude of each of the M data-shift correlation values and outputting a current maximum data-shift correlation value; and
- a maximum value determiner for retaining the current maximum data-shift correlation value and associated parameters, and determining a greatest maximum data-shift correlation value from among maximum data-shift correlation values output from the magnitude calculator for all row/shift combinations and all frequency bin/trial bit boundary location combinations so as to obtain final parameters associated with the greatest maximum data-shift correlation value, the final parameters including:
  - the center frequency $f_{0p}$ of the selected frequency bin;
  - the selected trial bit boundary location $t_{0s}$;
  - an index $I_{MAX}$ of the greatest maximum data-shift correlation value within the M data-shift correlation values per row/shift combination;
  - a row index $K_{MAX}$ of the correlation matrix producing the maximum FFT value, corresponding to the $K^{th}$ cyclic shift in the reference C/A code samples, indicating a location of a code epoch of the received signal; and
  - an amount of shift $J_{MAX}$ of the selected contiguous M-bit sequence within the known B-bit sequence, corresponding to a location of a start bit of the contiguous M-bit sequence in the known B-bit sequence.

42. The GPS/GNSS receiver circuit of claim 41, said process controller further includes:
- a rate change calculator for calculating the rate of change in the frequency of the received signal based on approximate receiver location, approximate time, and satellite ephemeris data obtained from an external source.

43. The GPS/GNSS receiver circuit of claim 41, wherein said process controller further includes:
- a signal acquisition parameter determiner for calculating, based on the final parameters and known GPS time of transmission of the known B-bit sequence, a C/A code phase of the received signal, accurate apparent Doppler shift in the received signal, and time to within a few milliseconds.

44. The GPS/GNSS receiver circuit of claim 41, wherein said cross-correlator includes:
- a pointwise multiplier for pointwise-multiplying N real-value samples of the one period of the reference C/A code with the N samples of the compressed sample block to produce N complex values;
- a summer for summing the N complex values into a correlation function value; and
- a cyclic shifter for cyclically shifting the N real-value samples of the reference C/A code by one sample for each pointwise multiplication.

45. The GPS/GNSS receiver circuit of claim 44, wherein said cross-correlator further includes:
- a cyclic pre-shifter for cyclically shifting the N real-value samples of the one period of reference C/A code as time progresses so as to compensate for signal time precession due to apparent Doppler shift corresponding to the selected frequency bin.

46. The GPS/GNSS receiver circuit of claim 41, wherein said data-shift correlator includes:

a row selector for selecting one of the rows of the correlation matrix for each pointwise multiplication;

a segment selector for selecting a contiguous M-bit sequence from a known B-bit sequence and shifting the selected contiguous M-bit sequence by one bit within the known B-bit sequence for each pointwise multiplication, the known B-bit sequence being selected from a predetermined subframe of navigation data, the known B-bit sequence containing the entire M-bit sequence therein;

a pointwise multiplier for pointwise-multiplying the selected row of the correlation matrix with the selected contiguous M-bit sequence to produce M complex values; and a fast-Fourier transformer for performing M-point FFT on the M complex values to produce M FFT outputs, the M-FFT outputs being the M data-shift correlation values.

47. The GPS/GNSS receiver circuit of claim 46, wherein said maximum value determiner includes:

an acquisition parameter memory coupled with said magnitude calculator, for holding the current maximum data-shift correlation value and associated parameters, the current maximum data-shift correlation value being the current maximum FFT value, wherein the maximum value determiner updates the current maximum FFT value and associated parameters in the acquisition parameter memory by storing the current maximum FFT value and associated parameters if there is no previous maximum FFT value retained, and by replacing previous maximum FFT value and associated parameters with the current maximum FFT value and associated parameters if the current maximum FFT value is greater than the previous maximum FFT value retained, the maximum value determiner obtaining a greatest maximum FFT value and associated parameters after searching through all rows of the correlation matrix and all of the frequency bin/trial bit boundary location combinations so as to obtain the final parameters associated with the greatest maximum FFT value.

48. The GPS/GNSS receiver circuit of claim 41, wherein each navigation data bit spans 20 milliseconds, each sub-block is 20-milliseond long and contains 20×N samples, one period of C/A code is 1 millisecond, and each compressed sample block is 1 millisecond in length.

49. The GPS/GNSS receiver circuit of claim 41, wherein the number N is 1024, the number of bits B is 228, and the number of bits M is 128.

50. A GPS/GNSS receiver circuit for high-sensitivity GPS/GNSS signal acquisition and bit synchronization after acquisition of GPS/GNSS signals, the GPS/GNSS receiver including a front end section and a signal processing section, the front end section receiving GPS/GNSS signals from satellites and producing a digitized complex baseband signal of acquired GPS/GNSS signals, the signal processing section comprising:

an input terminal for receiving an M-bit block of the baseband signal ("signal block") from a predetermined subframe of the acquired signal, the signal block including known M-bit sequence of the navigation data, using an estimated bit boundary location obtained in signal acquisition, the estimated bit boundary corresponding to start time of the known M-bit sequence;

a phase rotator for Doppler-compensating the captured signal block, a phase rotation being calculated as a function of time based on the center frequency of an estimated frequency bin and a calculated rate of change in the frequency obtained in the signal acquisition;

an offset sub-block generator for partitioning the signal block into M successive sub-blocks using the estimated bit boundary location and Q−1 offset bit boundary locations, so as to create Q sets of M successive sub-blocks, the estimated bit boundary location and the offset bit boundary locations being apart from each other by one period of C/A code with the estimated bit boundary location as a center;

a synchronous summer for synchronously summing the samples within each sub-block with a periodicity of one period of C/A code, so as to produce Q sets of M compressed sample blocks each having N-samples, each compressed sample block having a length of one period of C/A code;

a cross correlator for cross-correlating each compressed sample block with one period of reference C/A code for a selected satellite to produce Q ×M correlation values;

a correlator memory for holding a Q-by-M bit synchronization correlation matrix, the $j^{th}$ row of the bit synchronization correlation matrix consisting of the M complex correlation values obtained from the $j^{th}$ of the Q sets of M compressed sample blocks;

a bit sync correlator coupled to said correlator memory, including:

a row selector for selecting one of the rows of the bit synchronization correlation matrix for each pointwise multiplication;

a pointwise multiplier for pointwise-multiplying the selected row of the bit synchronization correlation matrix with the known M-bit sequence to produce M complex values; and a fast-Fourier transformer for performing M-point FFT on the M complex values to produce M FFT outputs;

a magnitude calculator for calculate magnitude of each of the M FFT outputs to determine a current maximum FFT output value;

an acquisition parameter memory for holding the current maximum FFT output value and associated parameters; and a bit sync correlation peak determiner for updating the current maximum FFT output value and associated parameters by retaining the current maximum FFT output value and associated parameters if there is no previous maximum FFT output value retained, and by replacing previous maximum FFT output value and associated parameters with the current maximum FFT output value and associated parameters if the current maximum FFT output value is greater than the previous maximum FFT output value retained, so as to obtain a greatest maximum FFT output value and associated parameters after searching through all rows of the bit synchronization correlation matrix, and find a row index $K_{MAX}$ of the correlation matrix producing the greatest maximum FFT value as an offset of a nearest bit boundary to the starting time of signal capture.

51. The GPS/GNSS receiver circuit of claim 50, further comprising:

a time transfer circuit coupled to said bit sync correlation peak determiner, for determining time within approximately 3.3 microseconds per kilometer of position uncertainty.

52. The GPS/GNSS receiver circuit of claim 50, wherein said cross correlator includes:

a pointwise multiplier for pointwise-multiplying, for each of the Q ×M compressed sample blocks, N real-value samples of the one period of the reference C/A code with the N samples of the compressed sample block to produce N complex values; and a summer for summing the N complex values into a bit synchronization correlation value for each of the Q ×M compressed sample blocks, so as to produce Q ×M correlation values.

53. The GPS/GNSS receiver circuit of claim 50, wherein said cross correlator further includes:

a cyclic shifter for cyclically shifting the N real-value samples of the one period of reference C/A code as time progresses so as to compensate for signal time precession due to apparent Doppler shift corresponding to the selected frequency bin.

54. The GPS/GNSS receiver circuit of claim 50, wherein each navigation data bit spans 20 milliseconds, each sub-block is 20-milliseond long and contains 20×N samples, one period of C/A code is 1 millisecond, and each compressed sample block is 1 millisecond in length.

55. The GPS/GNSS receiver circuit of claim 50, wherein the number N is 1024, the number of bits M is 128, and number Q of sets is 7.

* * * * *